(12) United States Patent
He et al.

(10) Patent No.: US 11,527,587 B2
(45) Date of Patent: Dec. 13, 2022

(54) OLED DISPLAY HAVING TFT INTEGRATED WITH PHOTODETECTORS

(71) Applicant: Shenzhen Goodix Technology Co., Ltd., Shenzhen (CN)

(72) Inventors: Yi He, San Diego, CA (US); Bo Pi, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 228 days.

(21) Appl. No.: 16/789,359

(22) Filed: Feb. 12, 2020

(65) Prior Publication Data

US 2020/0395421 A1  Dec. 17, 2020

Related U.S. Application Data

(60) Provisional application No. 62/862,675, filed on Jun. 17, 2019.

(51) Int. Cl.
*H01L 27/32* (2006.01)
*G06F 21/32* (2013.01)
*G06V 40/13* (2022.01)

(52) U.S. Cl.
CPC .......... *H01L 27/3234* (2013.01); *G06F 21/32* (2013.01); *G06V 40/1306* (2022.01); *H01L 27/323* (2013.01); *H01L 27/3262* (2013.01)

(58) Field of Classification Search
CPC ............... H01L 27/3234; H01L 27/323; H01L 27/3262; G06F 21/32; G06V 40/1306; G06V 40/1318
See application file for complete search history.

(56) References Cited

U.S. PATENT DOCUMENTS

2008/0025579 A1*  1/2008  Sidlauskas ........... G06K 9/6234
                                                    382/192
2009/0028396 A1*  1/2009  Kishima ............ G06V 40/1318
                                                    382/124
(Continued)

FOREIGN PATENT DOCUMENTS

CN          201654745 U      11/2010
CN          101943973 A       1/2011
(Continued)

*Primary Examiner* — S M Sohel Imtiaz
(74) *Attorney, Agent, or Firm* — Kilpatrick Townsend & Stockton, LLP

(57) ABSTRACT

An electronic device includes a display screen that includes a cover glass, and a display illumination layer. The display illumination layer includes an array of light-emitting elements that forms an array of pixels of the display screen. The electronic device further includes a light source disposed adjacent the cover glass and configured to emit a light beam to be coupled into the cover glass. A portion of the light beam may be transmitted through the top surface of the cover glass to illuminate a hand of a user. The electronic device further includes an optical ID sensing module that includes an array of photodetectors disposed under the array of light-emitting elements and spatially distributed across the array of pixels of the display screen, and electronic circuitry coupled to the array of photodetectors and configured to capture a fingerprint image or a palmprint image of the hand.

33 Claims, 27 Drawing Sheets

(56) References Cited

U.S. PATENT DOCUMENTS

| | | | |
|---|---|---|---|
| 2017/0091506 A1* | 3/2017 | Sinha | G06V 40/1335 |
| 2018/0005005 A1* | 1/2018 | He | G06F 3/0418 |
| 2018/0032778 A1* | 2/2018 | Lång | H01L 27/288 |
| 2018/0129798 A1* | 5/2018 | He | G06V 10/141 |
| 2018/0149800 A1* | 5/2018 | Kim | G02B 6/0055 |
| 2019/0080138 A1* | 3/2019 | Gao | G02B 3/0031 |
| 2019/0180071 A1* | 6/2019 | Kim | G06V 40/1359 |
| 2020/0311368 A1* | 10/2020 | Koda | G06T 1/00 |
| 2021/0326618 A1* | 10/2021 | Li | G06F 3/04164 |

FOREIGN PATENT DOCUMENTS

| | | |
|---|---|---|
| CN | 108133174 A | 6/2018 |
| CN | 108877492 A | 11/2018 |
| CN | 109154961 A | 1/2019 |
| JP | 2000305715 A | 11/2000 |

* cited by examiner

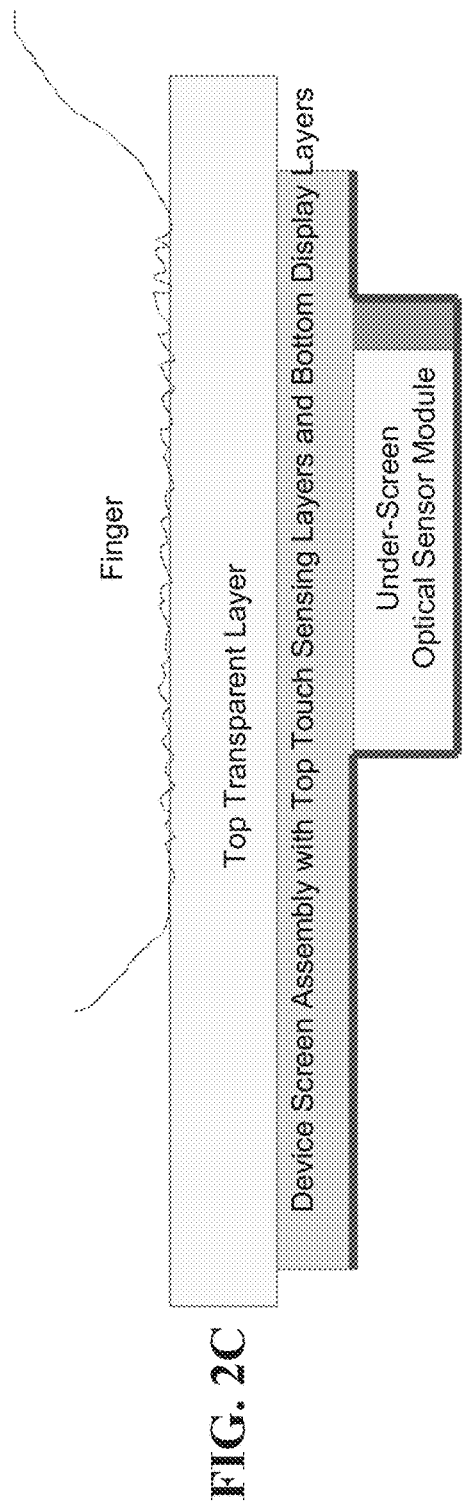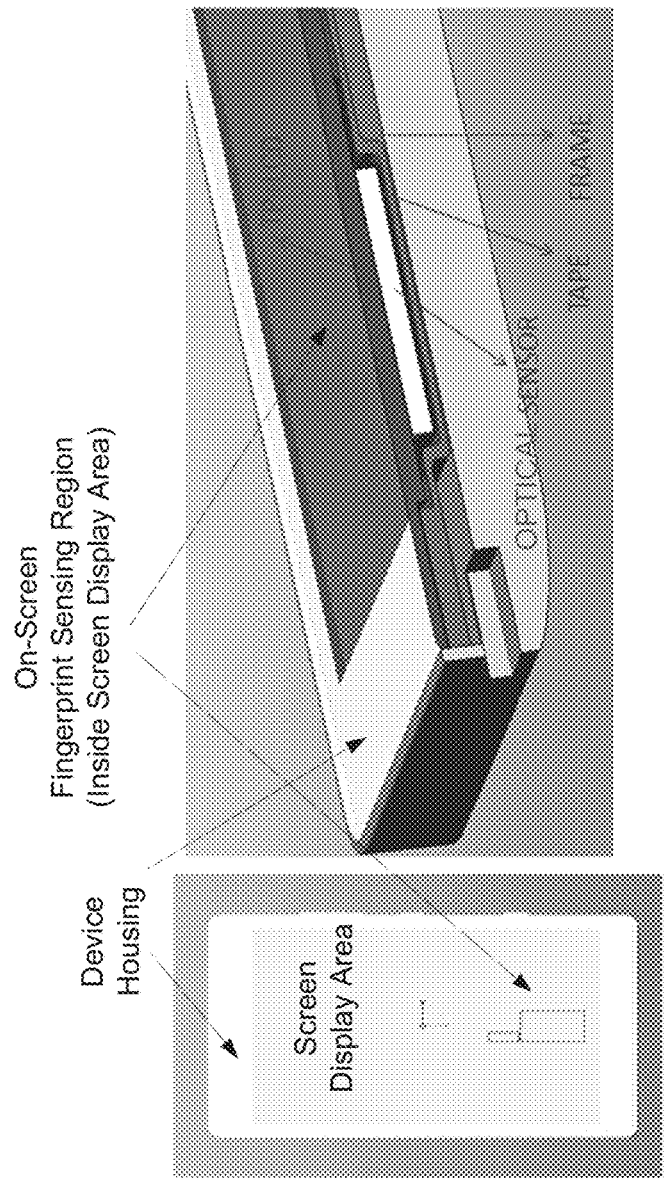
FIG. 2C
FIG. 2D

423- Display assembly
431- Enhanced cover glass
433- OLED display module
445, 447- Touching finger
613- Viewing zone
615- Effective Fingerprint sensing zone 524- Bottom layers
431- Cover glass
433- Display module
60- Finger tissues
61- Finger skin ridge
63- Finger skin valley
73- Display OLED
181- Cover glass reflected light
82, 201, 202, 211, 212- Light beams from an OLEDs group
185, 205, 206- Cover glass reflected light
187- Finger skin reflected light
189, 203, 204- Light coupled into finger tissues
191- Light scattered into the bottom layers
213, 214- Cover glass total reflected light (side view-layers)**

401 - Top layers such as sealing layer
403 - Photodetector and OLEDs
407 - Thin film transistor (TFT) layer
409 - One pixel group of OLED
409R - Red light emitter
409G - Green light emitter
409B - Blue light emitter
411 - One photodetector assembly
411P - Photodiode
411C - Collimation structure
413 - Power driver and programed controller
415 - Memory (side view-pixel detail)**

(top view)**

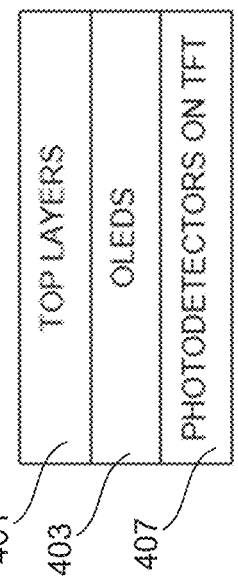

FIG. 9A
(side view-layers)

| TOP LAYERS |
| OLEDS |
| PHOTODETECTORS ON TFT |

401
403
407

401- Top layers such as sealing layer
403- Photodetector and OLEDs
407- Thin film transistor (TFT) layer
409- One pixel group of OLED
409R- Red light emitter
409G- Green light emitter
409B- Blue light emitter
417- One photodetector assembly
417P- Photodiode
417C- Collimation structure
413- Power driver and programed controller
415- Memory

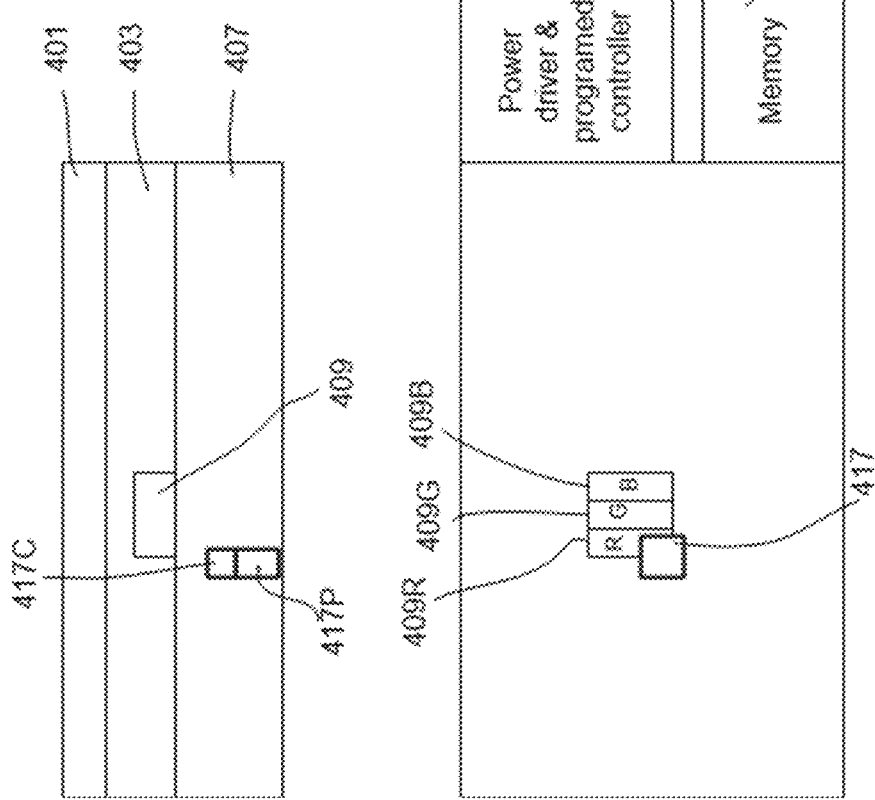

FIG. 9B
(side view-pixel detail)

FIG. 9C
(top view)

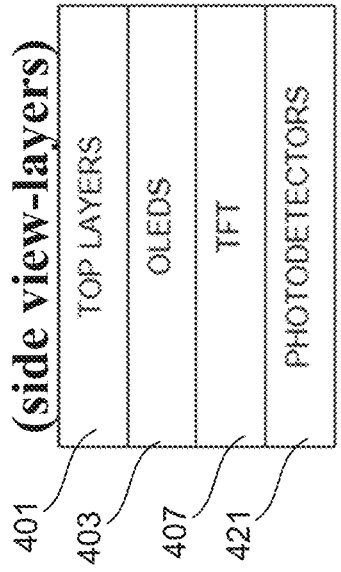

FIG. 10A (side view-layers)

401- Top layers such as sealing layer
403- Photodetector and OLEDs
407- Thin film transistor (TFT) layer
409- One pixel group of OLED
409R- Red light emitter
409G- Green light emitter
409B- Blue light emitter
419- One photodetector assembly
419P- Photodiode
419C- Collimation structure
413- Power driver and programed controller
415- Memory
421- Photodetectors layer

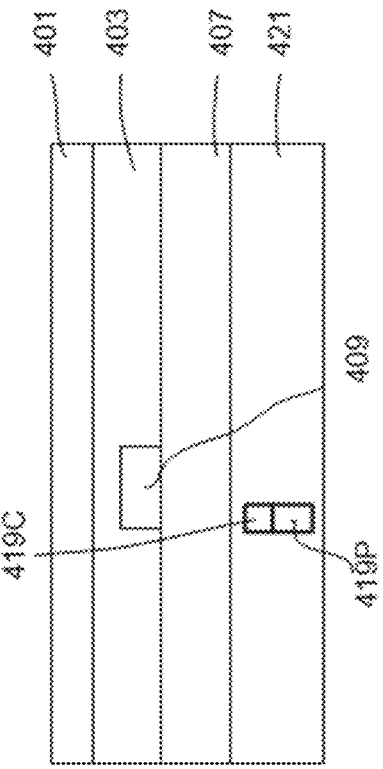

FIG. 10B (side view-pixel detail)

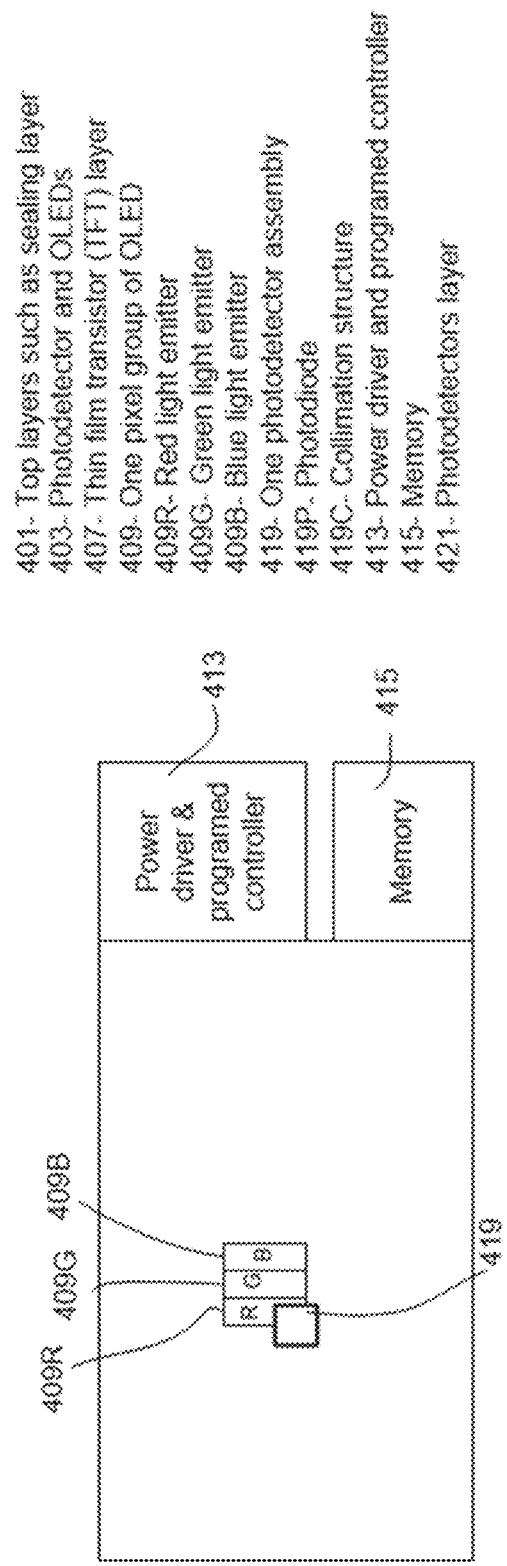

FIG. 10C (top view)

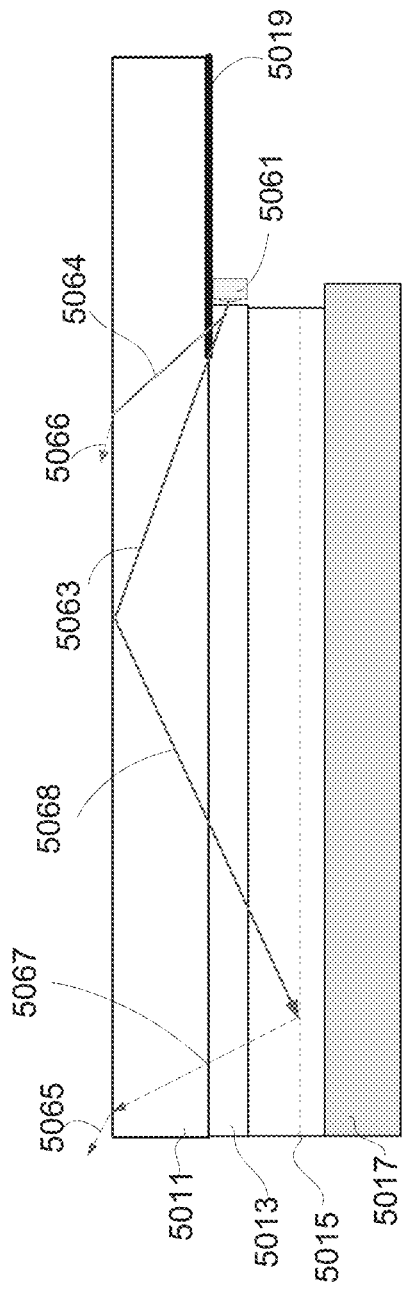
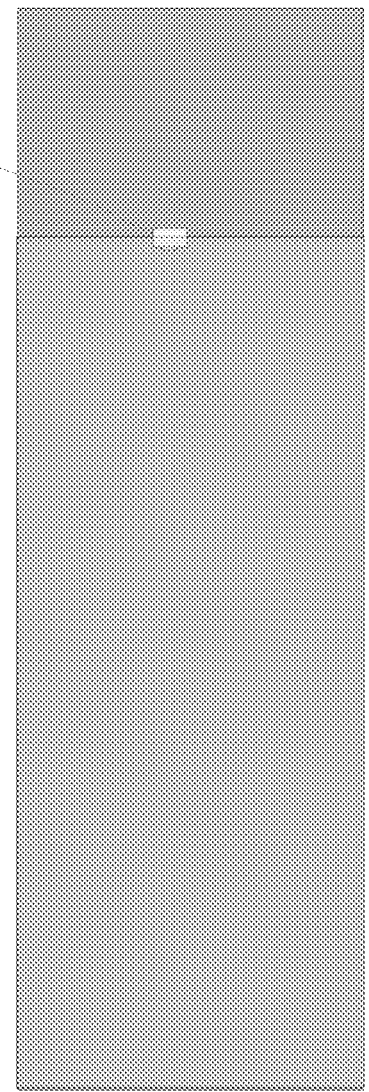
FIG. 15A
FIG. 15B

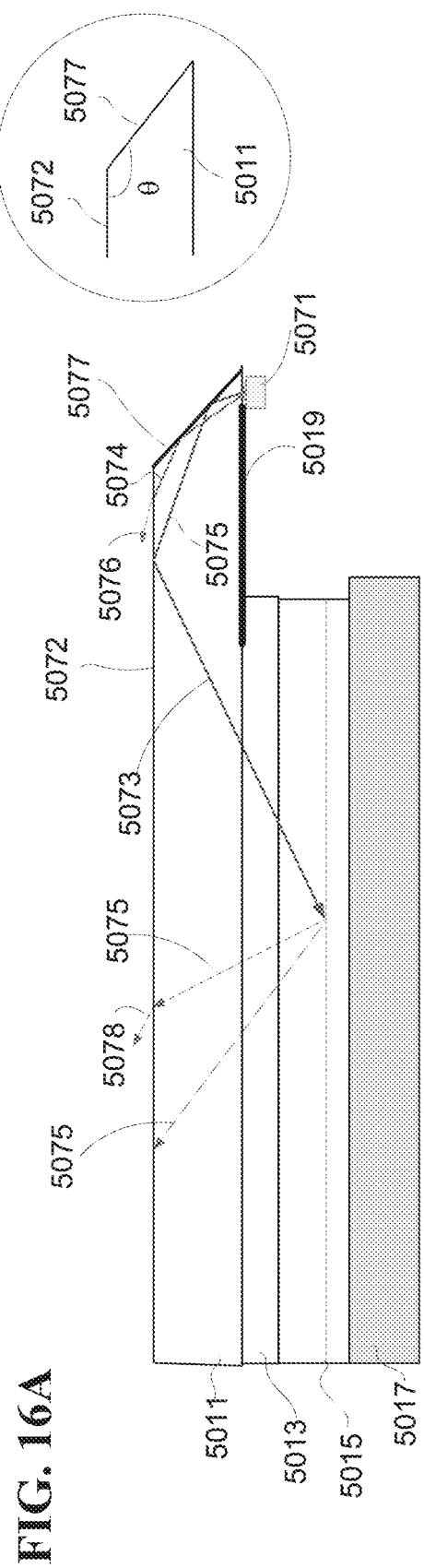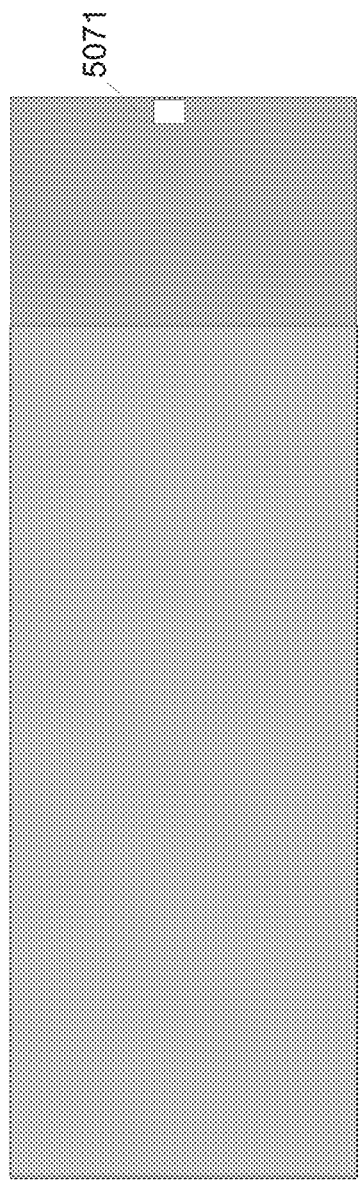
FIG. 16A
FIG. 16B

OLED DISPLAY HAVING TFT INTEGRATED WITH PHOTODETECTORS

CROSS-REFERENCES TO RELATED APPLICATIONS

The present application is a non-provisional application of and claims the benefit and priority under 35 U.S.C. 119(e) of U.S. Provisional Application No. 62/862,675, filed Jun. 17, 2019 entitled "OLED DISPLAY HAVING TFT INTEGRATED WITH PHOTODETECTORS," the entire content of which is incorporated herein by reference for all purposes.

TECHNICAL FIELD

This patent document relates to optical sensing of patterns such as fingerprints and faces, and to performing one or more sensing operations of other parameter measurements in electronic devices or systems, including portable devices such as a mobile device or a wearable device and larger systems.

BACKGROUND

Various sensors can be implemented in electronic devices or systems to provide certain desired functions. There is an increasing need for securing access to computers and computer-controlled devices or systems where only authorized users be identified and be distinguished from non-authorized users.

For example, mobile phones, digital cameras, tablet PCs, notebook computers and other portable electronic devices have become more and more popular in personal, commercial and governmental uses. Portable electronic devices for personal use may be equipped with one or more security mechanisms to protect the user's privacy.

For another example, a computer or a computer-controlled device or system for an organization or enterprise may be secured to allow only authorized personnel to access to protect the information or the use of the device or system for the organization or enterprise.

The information stored in portable devices and computer-controlled databases, devices or systems, may be of certain characteristics that should be secured. For example, the stored information may be personal in nature, such as personal contacts or phonebook, personal photos, personal health information or other personal information, or confidential information for proprietary use by an organization or enterprise, such as business financial information, employee data, trade secrets and other proprietary information. If the security of the access to the electronic device or system is compromised, the data may be accessed by others that are not authorized to gain the access, causing loss of privacy of individuals or loss of valuable confidential information. Beyond security of information, securing access to computers and computer-controlled devices or systems also allow safeguard of the use of devices or systems that are controlled by computers or computer processors such as computer-controlled automobiles and other systems such as ATMs.

Secured access to a device such as a mobile device or a system such as an electronic database and a computer-controlled system can be achieved in different ways such as using user passwords. A password, however, may be easily to be spread or obtained and this nature of passwords can reduce the level of the security. Moreover, a user needs to remember a password to use password-protected electronic devices or systems, and, if the user forgets the password, the user needs to undertake certain password recovery procedures to get authenticated or otherwise regain the access to the device. Unfortunately, in various circumstances, such password recovery processes may be burdensome to users and have various practical limitations and inconveniences.

The personal fingerprint identification can be utilized to achieve the user authentication for enhancing the data security while mitigating certain undesired effects associated with passwords.

Electronic devices or systems, including portable or mobile computing devices, may employ user authentication mechanisms to protect personal or other confidential data and prevent unauthorized access. User authentication on an electronic device or system may be carried out through one or multiple forms of biometric identifiers, which can be used alone or in addition to conventional password authentication methods. One form of biometric identifiers is a person's fingerprint pattern. A fingerprint sensor can be built into an electronic device or system to read a user's fingerprint pattern as part of the authentication process so that the device or system can only be unlocked by an authorized user through authentication of the authorized user's fingerprint pattern.

SUMMARY

The sensor technology and examples of implementations of the sensor technology described in this patent document provide designs for an optical sensor module that is either separated from a display panel as a separate module but is placed under the display panel for using a portion of the display surface for optical sensing of fingerprints and additional optical sensing functions, or integrated to the display panel to utilize the entire display surface as an optical sensing surface for sensing a fingerprint or other patterns (e.g., palm patterns or facial patterns). Implementations of the disclosed optical sensing can be used to obtain optical transmissive patterns in probe light that transmits through the internal finger tissues associated with the external fingerprint pattern formed on the outer finger skin to provide 3-dimensional topographical information for improved optical fingerprint sensing.

In one aspect, the disclosed technology can be implemented to provide an electronic device capable of detecting a fingerprint by optical sensing to include a display panel that includes light emitting display pixels operable to emit light for displaying images; a top transparent layer formed over the display panel as an interface for user touch operations and for transmitting the light from the display panel to display images, the top transparent layer including a designated fingerprint sensing area for a user to place a finger for fingerprint sensing; an optical sensor module including an optical sensor array of optical detectors that are spatially distributed across the light emitting display pixels and are spatially interleaved with the light emitting display pixels to provide optical sensing across the display panel, each optical detector operable to convert the received light that carries a fingerprint pattern of the user into a detector signal representing the fingerprint pattern; and optical collimation structures that are spatially distributed so that each optical collimation structure is coupled to a corresponding optical detector to spatially select incident light to be detected by the optical detector.

In one aspect, the disclosed technology can be implemented to provide an electronic device capable of detecting a fingerprint by optical sensing. This device includes a display panel that displays images; a top transparent layer formed over the display panel as an interface for user touch operations and for transmitting the light from the display panel to display images, the top transparent layer including a designated fingerprint sensing area for a user to place a finger for fingerprint sensing; and an optical sensor module located below the display panel and underneath the designated fingerprint sensing area on the top transparent layer to receive light from the top transparent layer to detect a fingerprint, wherein the optical sensor module includes an optical sensor array of optical detectors to convert the received light that carries a fingerprint pattern of the user into detector signals representing the fingerprint pattern.

This device further includes extra illumination light sources located outside the optical sensor module at different locations to produce different illumination probe beams to illuminate the designated fingerprint sensing area on the top transparent layer in different illumination directions, each extra illumination light source structured to produce probe light in an optical spectral range with respect to which tissues of a human finger exhibit optical transmission to allow probe light in each illumination probe beam to enter a user finger over the designated fingerprint sensing area on the top transparent layer to produce scattered probe light by scattering of tissues inside the finger that propagates towards and passes the top transparent layer to carry both (1) fingerprint pattern information and (2) different fingerprint topographical information associated with the different illumination directions, respectively, caused by transmission through internal tissues of ridges and valleys of the finger; and a probe illumination control circuit coupled to control the extra illumination light sources to sequentially turn on and off in generating the different illumination probe beams at different times, one beam at a time, so that the optical sensor module located below the display panel is operable to sequentially detect the scattered probe light from the different illumination probe beams to capture both (1) the fingerprint pattern information and (2) the different fingerprint topographical information associated with the different illumination directions, respectively.

In another aspect, the disclosed technology can be implemented to provide a method for operating an electronic device to detect a fingerprint by optical sensing, wherein the electronic device includes a display panel that displays images, a top transparent layer formed over the display panel as an interface for user touch operations and for transmitting the light from the display panel to display images, and an optical sensor array of optical detectors located under the display panel. This the method includes directing a first illumination probe beam to illuminate a designated fingerprint sensing area over the top transparent layer in a first illumination direction and to enter a user finger over the designated fingerprint sensing area to produce first scattered probe light by scattering of tissues inside the finger that propagates towards and passes the top transparent layer by transmission through internal tissues of ridges and valleys of the finger to carry both (1) a first 2-dimensional transmissive pattern representing a fingerprint pattern formed by bridges and valleys of the finger, and (2) a first fingerprint topographical pattern that is associated with the illumination of internal tissues of ridges and valleys of the finger in the first illumination direction and is embedded within the first 2-dimensional transmissive pattern. This further also includes operating the optical sensor array to detect transmitted part of the first scattered probe light that passes through the top transparent layer and the display panel to reach the optical sensor array so as to capture both (1) the first 2-dimensional transmissive pattern, and (2) the first fingerprint topographical pattern.

In addition, this method includes directing a second illumination probe beam, while turning off the first illumination light source, to illuminate the designated fingerprint sensing area over the top transparent layer in a second, different illumination direction and to enter the user finger to produce second scattered probe light by scattering of tissues inside the finger that propagates towards and passes the top transparent layer by transmission through internal tissues of ridges and valleys of the finger to carry both (1) a second 2-dimensional transmissive pattern representing the fingerprint pattern, and (2) a second fingerprint topographical pattern that is associated with the illumination of the internal tissues of ridges and valleys of the finger in the second illumination direction and that is embedded within the second 2-dimensional transmissive pattern, wherein the second topographical pattern is different from the first topographical pattern due to different beam directions of the first and second illumination probe beams. The optical sensor array is operated to detect transmitted part of the second scattered probe light that passes through the top transparent layer and the display panel to reach the optical sensor array so as to capture both (1) the second 2-dimensional transmissive pattern, and (2) the second fingerprint topographical pattern. Next, a detected fingerprint pattern is constructed from the first and second transmissive patterns and the first and second fingerprint topographical patterns are processed to determine whether the detected fingerprint pattern is from a natural finger.

According to some embodiments, an electronic device includes a display screen. The display screen includes a cover glass having a top surface and a bottom surface, and a display illumination layer disposed under the cover glass. The display illumination layer includes an array of light-emitting elements that forms an array of pixels of the display screen. The electronic device further includes a light source disposed adjacent the cover glass. The light source is configured to emit a light beam to be coupled into the cover glass. A portion of the light beam may be transmitted through the top surface of the cover glass to illuminate a hand of a user placed adjacent the top surface of the cover glass. The electronic device further includes an optical ID sensing module. The optical ID sensing module includes an array of photodetectors disposed under the array of light-emitting elements and spatially distributed across the array of pixels of the display screen. The array of photodetectors is configured to detect light reflected or scattered by the hand illuminated by the light source. The optical ID sensing module further includes electronic circuitry coupled to the array of photodetectors and configured to capture a fingerprint image or a palmprint image of the hand.

According to some embodiments, an electronic device includes a display screen. The display screen includes a cover glass, and a transparent layer disposed under the cover glass and having an edge side, and an array of light-emitting elements disposed under the transparent layer. The array of light-emitting elements forms an array of pixels of the display screen. The electronic device further includes a light source disposed at the edge side of the transparent layer. The light source is configured to emit a light beam to be coupled into the transparent layer through the edge side. A portion of the light beam may be transmitted through the cover glass to illuminate a hand of a user placed adjacent the cover glass. The electronic device further includes an optical ID sensing module. The optical ID sensing module includes an array of photodetectors disposed under the array of light-emitting elements and spatially distributed across the array of pixels of the display screen. The array of photodetectors is configured to detect light reflected or scattered by the hand illuminated by the light source. The optical ID sensing module further includes electronic circuitry coupled to the array of photodetectors and configured to capture a fingerprint image or a palmprint image of the hand.

According to some embodiments, an electronic device includes a display screen. The display screen includes a cover glass, a touch sensing layer disposed under the cover glass and having an edge side, and a display illumination layer disposed under the touch sensing layer. The display illumination layer includes an array of light-emitting elements that forms an array of pixels of the display screen. The electronic device further includes a light source disposed at the edge side of the touch sensing layer. The light source is configured to emit a light beam to be coupled into the touch sensing layer through the edge side. A portion of the light beam may be transmitted through the cover glass to illuminate a hand of a user placed adjacent the cover glass. The electronic device further includes an optical ID sensing module. The optical ID sensing module includes an array of photodetectors disposed under the array of light-emitting elements and spatially distributed across the array of pixels of the display screen. The array of photodetectors is configured to detect light reflected or scattered by the hand illuminated by the light source. The optical ID sensing module further includes electronic circuitry coupled to the array of photodetectors and configured to capture a fingerprint image or a palmprint image of the hand.

Those and other aspects and their implementations are described in greater detail in the drawings, the description and the claims.

BRIEF DESCRIPTION OF THE DRAWINGS

FIGS. 2C and 2D illustrate an example of a device that implements the optical sensor module in FIGS. 2A and 2B.

FIGS. 9A-9C illustrate an example that implements the OLED-PD structure shown in FIG. 2F according to some embodiments.

FIGS. 10A-10C illustrate an example that implements the OLED-PD structure in which photodetectors of the optical sensor array are formed in a separate layer outside the OLED pixel layer and the TFT layer according to some embodiments.

FIG. 15A shows a partial schematic cross-sectional view of a display screen of an electronic device according to some embodiments.

FIG. 15B shows a partial schematic plan view of the electronic device shown in FIG. 15A according to some embodiments.

FIG. 16A shows a partial schematic cross-sectional view of a display screen of an electronic device according to some embodiments.

FIG. 16B shows a partial schematic plan view of the electronic device shown in FIG. 16A according to some embodiments.

DETAILED DESCRIPTION

Figure 1:
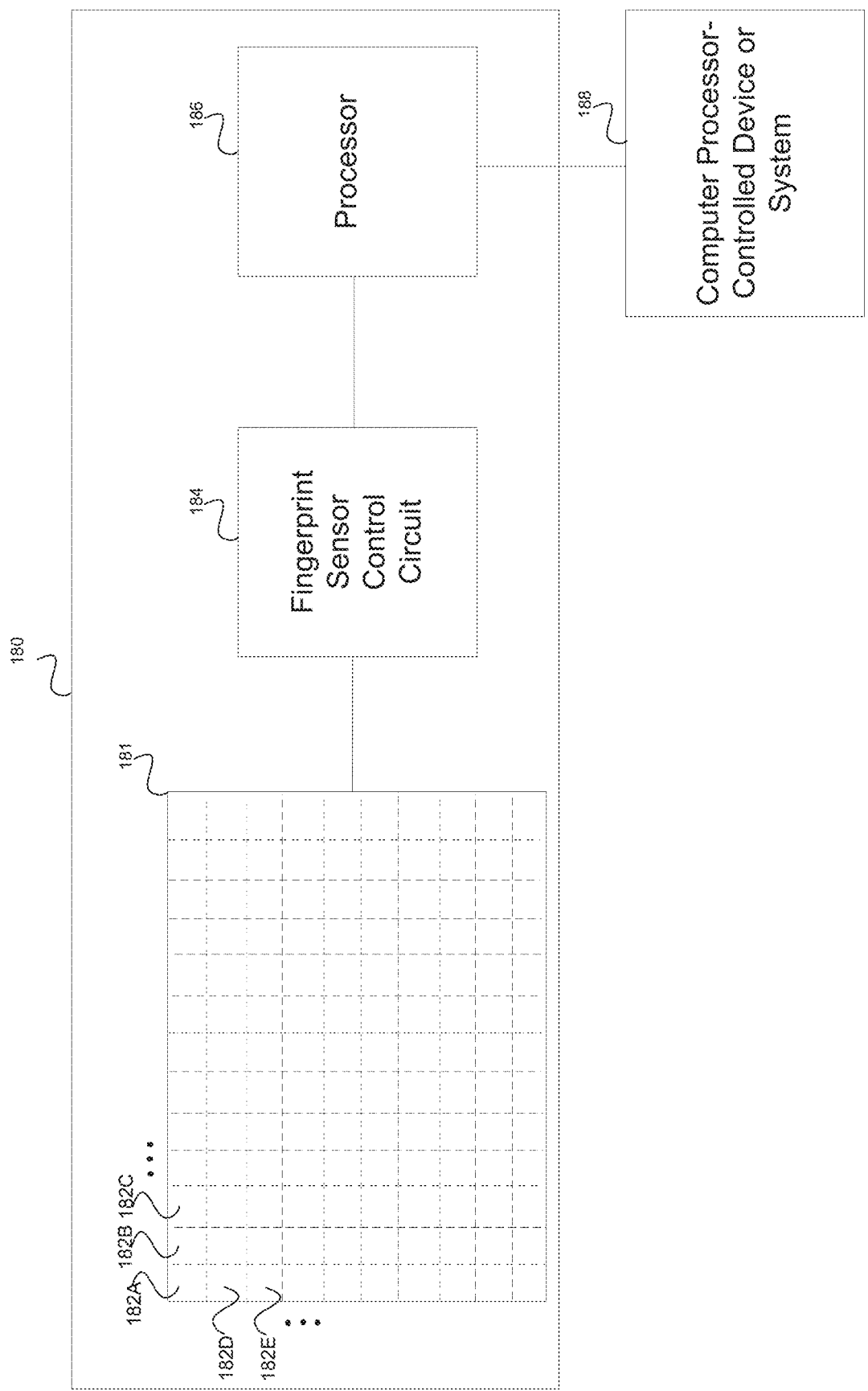
FIG. 1 is a block diagram of an example of a system with a fingerprint sensing module which can be implemented to include an optical fingerprint sensor disclosed in this document.

The sensor technology and examples of implementations of the sensor technology described in this patent document provide optical sensing mechanisms to use a portion or the entirety of a device display panel surface as an optical sensing surface for optically sensing an object in contact with or near the device display panel surface. The disclosed optical sensing can be used to detect structural patterns (e.g., fingerprints, palm prints, palm vein prints, facial patterns and other patterns) that are either formed on surfaces as external surface patterns or formed below the external skin surface as under-skin internal tissue structures (e.g., topographical patterns inside a finger under the finger skin). Optical sensors are provided and configured an optical sensor array for implementing the disclosed optical sensing.

In some implementations, such an optical sensor array can be implemented as an array much smaller than the display panel area and is included as part of an optical sensor module which is separated from the optical display panel and is placed underneath the optical display panel to use a portion of the entire display panel area as an optical sensing area for optically sensing an object in contact with or above the optical sensing surface.

In other implementations of the disclosed optical sensing technology, the optical sensors of the optical sensor array are integrated to the display panel to spatially interleave with the display pixels of the display panel so that the entire display surface can be used as an optical sensing surface for sensing a fingerprint or other patterns (e.g., palm patterns or facial patterns) while also serving as a display panel for displaying images, graphics, text and video contents. For example, the optical sensors or photodetectors of the optical sensor array can be integrated with the light emitting pixels of an organic light emitting diode display (OLED) panel so that a unit color pixel having OLED pixels of different emitting colors includes at least one optical sensor. For another example, the optical sensors or photodetectors of the optical sensor array can be formed outside the OLED pixel layer of the OLED display panel but are directly formed in a thin film transistor (TFT) layer on the same substrate for forming the OLED display pixel layer as a display size photodetector array to use the entire OLED display panel surface as an optical sensing surface. For yet another example, the optical sensors or photodetectors of the optical sensor array can be formed in a separate substrate from the OLED substrate for forming the OLED pixels as a display size photodetector array to use the entire OLED display panel surface as an optical sensing surface.

The following sections use optical sensing of fingerprints as a specific example for the more general optical sensing of an object in contact with on near the optical display panel surface to describe example designs for the disclosed optical sensing technology.

Electronic devices or systems may be equipped with fingerprint authentication mechanisms to improve the security for accessing the devices. Such electronic devices or system may include, portable or mobile computing devices, e.g., smartphones, tablet computers, wrist-worn devices and other wearable or portable devices, larger electronic devices or systems, e.g., personal computers in portable forms or desktop forms, ATMs, various terminals to various electronic systems, databases, or information systems for commercial or governmental uses, motorized transportation systems including automobiles, boats, trains, aircraft and others.

Fingerprint sensing is useful in mobile applications and other applications that use or require secure access. For example, fingerprint sensing can be used to provide secure access to a mobile device and secure financial transactions including online purchases. It is desirable to include robust and reliable fingerprint sensing suitable for mobile devices and other applications. In mobile, portable or wearable devices, it is desirable for fingerprint sensors to minimize or eliminate the footprint for fingerprint sensing given the limited space on those devices, especially considering the demands for a maximum display area on a given device.

The disclosed devices or systems in this patent document use optical sensing techniques to perform optical fingerprint sensing and other optical sensing operations. Notably, the optical sensing disclosed in this patent document can be used to optically capture a 2-dimensional spatial pattern of external ridges and valleys of a fingerprint or the internal fingerprint pattern and the topographical information of the internal fingerprint pattern that are associated with the external ridges and valleys of a finger under the finger skin. The internal fingerprint pattern and the topographical information of the internal fingerprint pattern are not just 2-dimensional pattern but also contain spatial information are 3-dimensional in nature due to the spatial variations in the internal tissues below the skin that support and give rise to the external ridges and valleys.

Overview of Optical Sensing

The light produced by a display screen for displaying images can pass through the top surface of the display screen in order to be viewed by a user. A finger can touch the top surface and thus interacts with the light at the top surface to cause the reflected or scattered light at the surface area of the touch to carry spatial image information of the finger to return to the display panel underneath the top surface. In touch sensing display devices, the top surface is the touch sensing interface with the user and this interaction between the light for displaying images and the user finger or hand constantly occurs but such information-carrying light returning back to the display panel is largely wasted and is not used in most touch sensing devices. In various mobile or portable devices with touch sensing displays and fingerprint sensing functions, a fingerprint sensor tends to be a separate device from the display screen, either placed on the same surface of the display screen at a location outside the display screen area such as in the popular Apple iPhones and Samsung Galaxy smartphones, or placed on the backside of a smartphone, such as some new models of smart phones by Huawei, Lenovo, Xiaomi or Google, to avoid taking up valuable space for placing a large display screen on the front side. Those fingerprint sensors are separate devices from the display screens and thus need to be compact to save space for display and other functions while still providing reliable and fast fingerprint sensing with a spatial image resolution above a certain acceptable level. However, the need to be compact and small and the need to provide a high spatial image resolution in capturing a fingerprint pattern are in direct conflict with each other in many fingerprint sensors because a high spatial image resolution in capturing a fingerprint pattern in based on various suitable fingerprint sensing technologies (e.g., capacitive touch sensing or optical imaging) requires a large sensor area with a large number of sensing pixels.

The optical sensor technology disclosed herein uses the light for displaying images in a display screen that is returned from the top surface of the device display assembly for fingerprint sensing and other sensing operations. The returned light carries information of an object in touch with the top surface (e.g., a finger) and the capturing and detecting this returned light constitute part of the design considerations in implementing a particular optical sensor module located underneath the display screen. Because the top surface of the touch screen assembly is used as a fingerprint sensing area, the optical image of this touched area should be captured by an optical imaging sensor array inside the optical sensor module with a high image fidelity to the original fingerprint for robust fingerprint sensing. The optical sensor module can be designed to achieve this desired optical imaging by properly configuring optical elements for capturing and detecting the returned light.

The disclosed technology can be implemented to provide devices, systems, and techniques that perform optical sensing of human fingerprints and authentication for authenticating an access attempt to a locked computer-controlled device such as a mobile device or a computer-controlled system, that is equipped with a fingerprint detection module. The disclosed technology can be used for securing access to various electronic devices and systems, including portable or mobile computing devices such as laptops, tablets, smartphones, and gaming devices, and other electronic devices or systems such as electronic databases, automobiles, bank ATMs, etc.

The optical sensor technology disclosed here can be implemented to detect a portion of the light that is used for displaying images in a display screen where such a portion of the light for the display screen may be the scattered light, reflected light or some stray light. For example, in some implementations of the disclosed optical sensor technology for an OLED display screen or another display screen having light emitting display pixels without using backlight, the image light produced by the OLED display screen, at or near the OLED display screen's top surface, may be reflected or scattered back into the OLED display screen as returned light when encountering an object such as a user finger or palm, or a user pointer device like a stylus. Such returned light can be captured for performing one or more optical sensing operations using the disclosed optical sensor technology. Due to the use of the light from OLED display screen's own OLED pixels for optical sensing, an optical sensor module based on the disclosed optical sensor technology can be, in some implementations, specially designed to be integrated to the OLED display screen in a way that maintains the display operations and functions of the OLED display screen without interference while providing optical sensing operations and functions to enhance overall functionality, device integration and user experience of the electronic device such as a smart phone or other mobile/wearable device or other forms of electronic devices or systems.

For example, an optical sensor module based on the disclosed optical sensor technology can be coupled to a display screen having light emitting display pixels without using backlight (e.g., an OLED display screen) to sense a fingerprint of a person by using the above described returned light from the light produced by OLED display screen. In operation, a person's finger, either in direct touch with the OLED display screen or in a near proximity of the OLED display screen, can produce the returned light back into the OLED display screen while carrying information of a portion of the finger illuminated by the light output by the OLED display screen. Such information may include, e.g., the spatial pattern and locations of the ridges and valleys of the illuminated portion of the finger. Accordingly, the optical sensor module can be integrated to capture at least a portion of such returned light to detect the spatial pattern and locations of the ridges and valleys of the illuminated portion of the finger by optical imaging and optical detection operations. The detected spatial pattern and locations of the ridges and valleys of the illuminated portion of the finger can then be processed to construct a fingerprint pattern and to perform fingerprint identification, e.g., comparing with a stored authorized user fingerprint pattern to determine whether the detected fingerprint is a match as part of a user authentication and device access process. This optical sensing based fingerprint detection by using the disclosed optical sensor technology uses the OLED display screens as an optical sensing platform and can be used to replace existing capacitive fingerprint sensors or other fingerprint sensors that are basically self-contained sensors as "add-on" components without using light from display screens or using the display screens for fingerprint sensing for mobile phones, tablets and other electronic devices.

The disclosed optical sensor technology can be implemented in ways that use a display screen having light emitting display pixels (e.g., an OLED display screen) as an optical sensing platform by using the light emitted from the display pixels of the OLED display screens for performing fingerprint sensing or other optical sensing functions after such emitted light interacts with an area on the top touch surface touched by a finger. This intimate relationship between the disclosed optical sensor technology and the OLED display screen provides a unique opportunity for using an optical sensor module to provide both (1) additional optical sensing functions and (2) useful operations or control features in connection with the touch sensing aspect of the OLED display screen.

Notably, in some implementations, an optical sensor module based on the disclosed optical sensor technology can be coupled to the backside of the OLED display screen without requiring a designated area on the display surface side of the OLED display screen that would occupy a valuable device surface real estate in some electronic devices such as a smartphone, a tablet or a wearable device where the exterior surface area is limited. Such an optical sensor module can be placed under the OLED display screen that vertically overlaps with the display screen area, and, from the user's perspective, the optical sensor module is hidden behind the display screen area. In addition, because the optical sensing of such an optical sensor module is by detecting the light that is emitted by the OLED display screen and is returned from the top surface of the display area, the disclosed optical sensor module does not require a special sensing port or sensing area that is separate from the display screen area. Accordingly, different from fingerprint sensors in other designs, including, e.g., Apple's iPhone/iPad devices or Samsung Galaxy smartphone models where the fingerprint sensor is located at a particular fingerprint sensor area or port (e.g., the home button) on the same surface of the display screen but located in a designated non-displaying zone that is outside the display screen area, the optical sensor module based on the disclosed optical sensor technology can be implemented in ways that would allow fingerprint sensing to be performed at a location on the OLED display screen by using unique optical sensing designs to route the returned light from the finger into an optical sensor and by providing proper optical imaging mechanism to achieve high resolution optical imaging sensing. In this regard, the disclosed optical sensor technology can be implemented to provide a unique on-screen fingerprint sensing configuration by using the same top touch sensing surface that displays images and provides the touch sensing operations without a separate fingerprint sensing area or port outside the display screen area.

Regarding the additional optical sensing functions beyond fingerprint detection, the optical sensing may be used to measure other parameters. For example, the disclosed optical sensor technology can measure a pattern of a palm of a person given the large touch area available over the entire OLED display screen (in contrast, some designated fingerprint sensors such as the fingerprint sensor in the home button of Apple's iPhone/iPad devices have a rather small and designated off-screen fingerprint sensing area that is highly limited in the sensing area size that may not be suitable for sensing large patterns). For yet another example, the disclosed optical sensor technology can be used not only to use optical sensing to capture and detect a pattern of a finger or palm that is associated with a person, but also to use optical sensing or other sensing mechanisms to detect whether the captured or detected pattern of a fingerprint or palm is from a live person's hand by a "live finger" detection mechanism, which may be based on, for example, the different optical absorption behaviors of the blood at different optical wavelengths, the fact that a live person's finger tends to be moving or stretching due to the person's natural movement or motion (either intended or unintended) or pulsing when the blood flows through the person's body in connection with the heartbeat. In one implementation, the optical sensor module can detect a change in the returned light from a finger or palm due to the heartbeat/blood flow change and thus to detect whether there is a live heartbeat in the object presented as a finger or palm. The user authentication can be based on the combination of the both the optical sensing of the fingerprint/palm pattern and the positive determination of the presence of a live person to enhance the access control. For yet another example, the optical sensor module may include a sensing function for measuring a glucose level or a degree of oxygen saturation based on optical sensing in the returned light from a finger or palm. As yet another example, as a person touches the OLED display screen, a change in the touching force can be reflected in one or more ways, including fingerprint pattern deforming, a change in the contacting area between the finger and the screen surface, fingerprint ridge widening, or a blood flow dynamics change. Those and other changes can be measured by optical sensing based on the disclosed optical sensor technology and can be used to calculate the touch force. This touch force sensing can be used to add more functions to the optical sensor module beyond the fingerprint sensing.

With respect to useful operations or control features in connection with the touch sensing aspect of the OLED display screen, the disclosed optical sensor technology can provide triggering functions or additional functions based on one or more sensing results from the optical sensor module to perform certain operations in connection with the touch sensing control over the OLED display screen. For example, the optical property of a finger skin (e.g., the index of refraction) tends to be different from other artificial objects. Based on this, the optical sensor module may be designed to selectively receive and detect returned light that is caused by a finger in touch with the surface of the OLED display screen while returned light caused by other objects would not be detected by the optical sensor module. This object-selective optical detection can be used to provide useful user controls by touch sensing, such as waking up the smartphone or device only by a touch via a person's finger or palm while touches by other objects would not cause the device to wake up for energy efficient operations and to prolong the battery use. This operation can be implemented by a control based on the output of the optical sensor module to control the waking up circuitry operation of the OLED display screen which, most of the OLED pixels are put in a "sleep" mode by being turned off without emitting light while part of the OLED pixels in the OLED display screen are turned on in a flash mode to intermittently emit flash light to the screen surface for sensing any touch by a person's finger or palm. Another "sleep" mode configuration can be achieved by using one or more extra LED light sources built into the optical sensor module to produce the "sleep" mode wake-up sensing light flashes where all the OLED pixels are turned off during the sleep mode so that the optical sensor module can detect returned light of such wake-up sensing light caused by the finger touch on the OLED display screen and, upon a positive detection, the OLED pixels on the OLED display screen are turned on or "woken up". In some implementations, the wake-up sensing light can be in the infrared invisible spectral range so a user will not experience any visual of a flash light. For another example, the fingerprint sensing by the optical sensor module is based on sensing of the returned light from the surface of the OLED display screen in the course of the normal OLED display screen operation, the OLED display screen operation can be controlled to provide an improved fingerprint sensing by eliminating background light for optical sensing of the fingerprint. In one implementation, for example, each display scan frame generates a frame of fingerprint signals. If, two frames of fingerprint signals with the display are generated in one frame when the OLED display screen is turned on and in the other frame when the OLED display screen is turned off, the subtraction between those two frames of signals can be used to reduce the ambient background light influence. By operating the fingerprint sensing frame rate is at one half of the display frame rate in some implementations, the background light noise in fingerprint sensing can be reduced.

As discussed above, an optical sensor module based on the disclosed optical sensor technology can be coupled to the backside of the OLED display screen without requiring creation of a designated area on the surface side of the OLED display screen that would occupy a valuable device surface real estate in some electronic devices such as a smartphone, a tablet or a wearable device. This aspect of the disclosed technology can be used to provide certain advantages or benefits in both device designs and product integration or manufacturing.

In some implementations, an optical sensor module based on the disclosed optical sensor technology can be configured as a non-invasive module that can be easily integrated to a display screen having light emitting display pixels (e.g., an OLED display screen) without requiring changing the design of the OLED display screen for providing a desired optical sensing function such as fingerprint sensing. In this regard, an optical sensor module based on the disclosed optical sensor technology can be independent from the design of a particular OLED display screen design due to the nature of the optical sensor module: the optical sensing of such an optical sensor module is by detecting the light that is emitted by the OLED display screen and is returned from the top surface of the display area, and the disclosed optical sensor module is coupled to the backside of the OLED display screen as a under-screen optical sensor module for receiving the returned light from the top surface of the display area and thus does not require a special sensing port or sensing area that is separate from the display screen area. Accordingly, such a under-screen optical sensor module can be used to combine with OLED display screens to provide optical fingerprint sensing and other sensor functions on an OLED display screen without using a specially designed OLED display screen with hardware especially designed for providing such optical sensing. This aspect of the disclosed optical sensor technology enables a wide range of OLED display screens in smartphones, tablets or other electronic devices with enhanced functions from the optical sensing of the disclosed optical sensor technology.

For example, for an existing phone assembly design that does not provide a separate fingerprint sensor as in certain Apple iPhones or Samsung Galaxy models, such an existing phone assembly design can integrate the under-screen optical sensor module as disclosed herein without changing the touch sensing-display screen assembly to provide an added on-screen fingerprint sensing function. Because the disclosed optical sensing does not require a separate designated sensing area or port as in the case of certain Apple iPhones/Samsung Galaxy phones with a front fingerprint sensor outside the display screen area, or some smartphones with a designated rear fingerprint sensor on the backside like in some models by Huawei, Xiaomi, Google or Lenovo, the integration of the on-screen fingerprint sensing disclosed herein does not require a substantial change to the existing phone assembly design or the touch sensing display module that has both the touch sensing layers and the display layers. Based on the disclosed optical sensing technology in this document, no external sensing port and no extern hardware button are needed on the exterior of a device are needed for adding the disclosed optical sensor module for fingerprint sensing. The added optical sensor module and the related circuitry are under the display screen inside the phone housing and the fingerprint sensing can be conveniently performed on the same touch sensing surface for the touch screen.

For another example, due to the above described nature of the optical sensor module for fingerprint sensing, a smartphone that integrates such an optical sensor module can be updated with improved designs, functions and integration mechanism without affecting or burdening the design or manufacturing of the OLED display screens to provide desired flexibility to device manufacturing and improvements/upgrades in product cycles while maintaining the availability of newer versions of optical sensing functions to smartphones, tablets or other electronic devices using OLED display screens. Specifically, the touch sensing layers or the OLED display layers may be updated in the next product release without adding any significant hardware change for the fingerprint sensing feature using the disclosed under-screen optical sensor module. Also, improved on-screen optical sensing for fingerprint sensing or other optical sensing functions by such an optical sensor module can be added to a new product release by using a new version of the under-screen optical sensor module without requiring significant changes to the phone assembly designs, including adding additional optical sensing functions.

The above and other features of the disclosed optical sensor technology can be implemented to provide a new generation of electronic devices with improved fingerprint sensing and other sensing functions, especially for smartphones, tablets and other electronic devices with display screens having light emitting display pixels without using backlight (e.g., an OLED display screen) to provide various touch sensing operations and functions and to enhance the user experience in such devices.

In practical applications, the performance of optical sensing for fingerprint sensing and other sensing functions in an electronic device equipped with optical fingerprint sensing may be degraded by the presence of undesired background light from the environment where a portion of the background light may enter the optical sensor module. Such background light causes the optical detectors in the optical sensor module to produce a noise signal that undesirable reduces the signal to noise ratio of the optical fingerprint sensing detection. In some conditions, such background noise can be high to a degree that may overwhelm the signal level of the useful signal that carries the optical fingerprint information or other useful information (e.g., biometric information) and could potentially cause unreliable optical sensing operation or even malfunction of the optical sensing. For example, one of sources for the undesired background light at the optical sensor module may be from the daylight from the sun and the impact of the sunlight can be particularly problematic for outdoor operations or in a sheltered environment with strong sunlight. For another example, other light sources present at locations at or near the location of the device with the disclosed optical fingerprint sensing may also lead to the undesired background light at the optical sensor module.

The undesired impact of the background light at the optical sensor module may be mitigated by reducing the amount of the undesired background light that can enter the optical sensor module, enhancing the optical signal level of the optical sensing signal carrying the fingerprint or other useful information beyond the signal level by using the returned OLED display light, or a combination of both background reduction and enhancing optical sensing signal level. In implementations, the background reduction can be achieved by using one or more optical filtering mechanisms in connection with the under-screen optical sensor module. In enhancing the optical signal level of the optical sensing signal carrying the fingerprint or other useful information, one or more extra illumination light sources may be added to the device to provide additional optical illumination light beyond the signal level caused by the returned OLED display light.

Using extra illumination light sources for optical fingerprint sensing and other optical sensing functions can also provide independent control over various features in providing illumination light for optical sensing, e.g., the selection of the illumination light wavelengths separate from the OLED display light in terms of the optical transmission property of human tissues, providing illumination for optical sensing operations beyond the spectral range in the OLED display light, controlling the mode of the illumination for optical sensing such as the timing or/and duration of illumination separate from the OLED display light, achieving a sufficiently high illumination level while maintaining an efficient use of power to prolong the battery operating time (an important factor for mobile computing or communication devices), and strategic placing the extra illumination light sources at certain locations to achieve illumination configurations that are difficult or impossible when using the OLED display light for illumination for optical sensing.

In addition, unlike many fingerprint sensing technologies that detect 2-dimensional spatial pattern of a fingerprint, the disclosed optical fingerprint sensing technology can be implemented to capture not only a 2-dimensional spatial pattern of external ridges and valleys of a fingerprint but also internal fingerprint pattern associated with the external ridges and valleys of a finger under the finger skin. The disclosed optical fingerprint sensing by capturing information on the internal fingerprint pattern associated with the external ridges and valleys of a finger under the finger skin is substantially immune from the contact conditions between the finger and the top touch surface of the device (e.g., dirty contact surface) and the conditions of the external finger skin condition (e.g., dirty, dry or wet fingers, or reduced external variations between ridges and valleys in fingers of certain users such as aged users), In implementations of the disclosed technical features, additional sensing functions or sensing modules, such as a biomedical sensor, e.g., a heartbeat sensor in wearable devices like wrist band devices or watches, may be provided. In general, different sensors can be provided in electronic devices or systems to achieve different sensing operations and functions.

General Architecture of Optical Sensing Modules

FIG. 1 is a block diagram of an example of a system 180 with a fingerprint sensing module 180 including a fingerprint sensor 181 which can be implemented to include an optical fingerprint sensor based on the optical sensing of fingerprints as disclosed in this document. The system 180 includes a fingerprint sensor control circuit 184, and a digital processor 186 which may include one or more processors for processing fingerprint patterns and determining whether an input fingerprint pattern is one for an authorized user. The fingerprint sensing system 180 uses the fingerprint sensor 181 to obtain a fingerprint and compares the obtained fingerprint to a stored fingerprint to enable or disable functionality in a device or system 188 that is secured by the fingerprint sensing system 180. In operation, the access to the device 188 is controlled by the fingerprint processing processor 186 based on whether the captured user fingerprint is from an authorized user. As illustrated, the fingerprint sensor 181 may include multiple fingerprint sensing pixels such as pixels 182A-182E that collectively represent at least a portion of a fingerprint. For example, the fingerprint sensing system 180 may be implemented at an ATM as the system 188 to determine the fingerprint of a customer requesting to access funds or other transactions. Based on a comparison of the customer's fingerprint obtained from the fingerprint sensor 181 to one or more stored fingerprints, the fingerprint sensing system 180 may, upon a positive identification, cause the ATM system 188 to grant the requested access to the user account, or, upon a negative identification, may deny the access. For another example, the device or system 188 may be a smartphone or a portable device and the fingerprint sensing system 180 is a module integrated to the device 188. For another example, the device or system 188 may be a gate or secured entrance to a facility or home that uses the fingerprint sensor 181 to grant or deny entrance. For yet another example, the device or system 188 may be an automobile or other vehicle that uses the fingerprint sensor 181 to link to the start of the engine and to identify whether a person is authorized to operate the automobile or vehicle.

The sensor device 181 in FIG. 1 can be an optical sensor module that is separated from a display panel as a separate module but is placed under the display panel for using a portion of the display surface for optical sensing of fingerprints and additional optical sensing functions. Examples of this design are illustrated in FIGS. 2A through 2D.

Figure 2A:
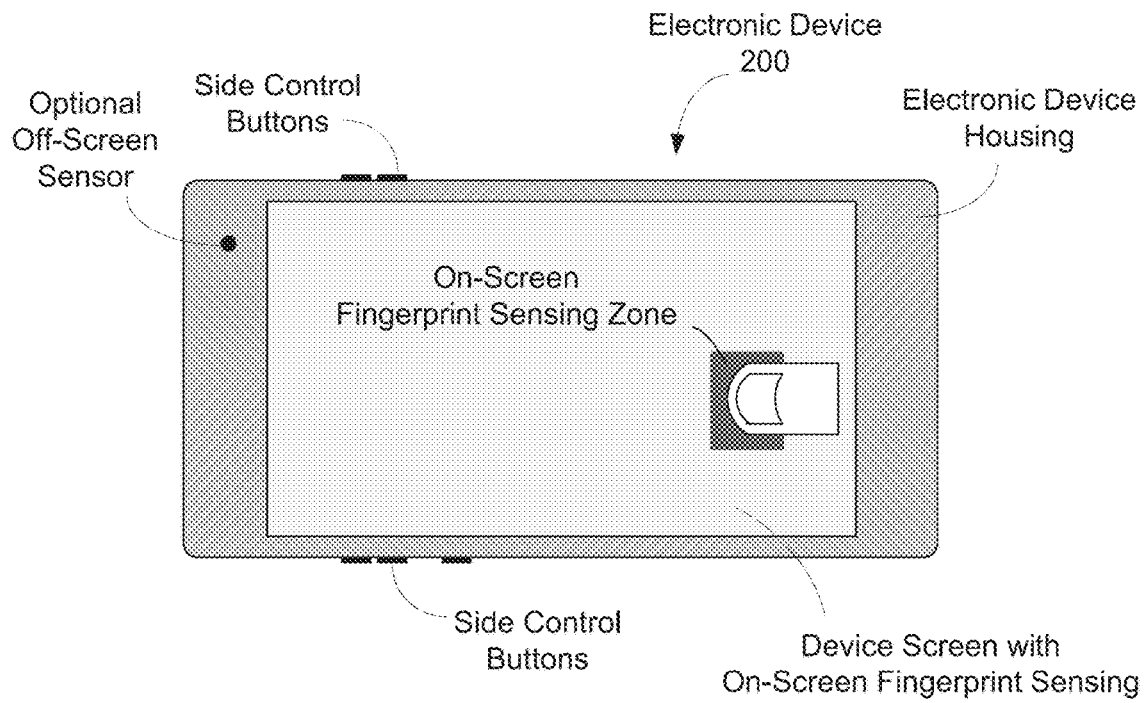
FIGS. 2A and 2B illustrate one exemplary implementation of an electronic device 200 having a touch sensing display screen assembly and an optical sensor module positioned underneath the touch sensing display screen assembly.
Figure 2B:
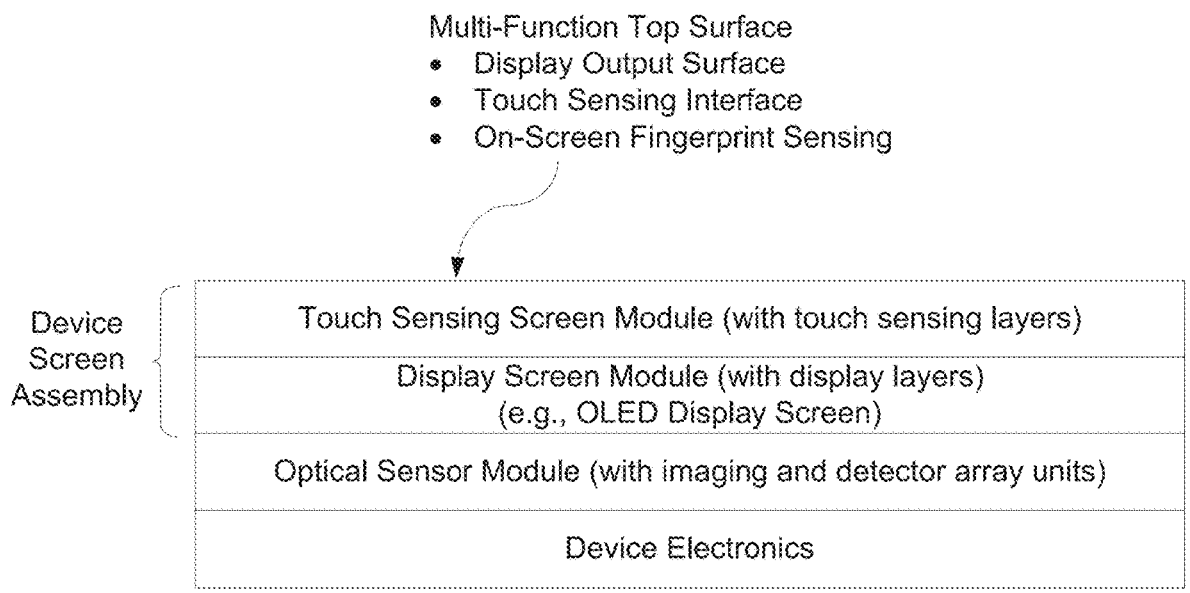

As a specific example, FIGS. 2A and 2B illustrate one exemplary implementation of an electronic device 200 having a touch sensing display screen assembly and an optical sensor module positioned underneath the touch sensing display screen assembly. In this particular example, the display technology can be implemented by an OLED display screen or another display screen having light emitting display pixels without using backlight. The electronic device 200 can be a portable device such as a smartphone or a tablet and can be the device 188 as shown in FIG. 1.

FIG. 2A shows the front side of the device 200 which may resemble some features in some existing smartphones or tablets. The device screen is on the front side of the device 200 occupying either entirety, a majority or a significant portion of the front side space and the fingerprint sensing function is provided on the device screen, e.g., one or more sensing areas for receiving a finger on the device screen. As an example, FIG. 2A shows a fingerprint sensing zone in the device screen for a finger to touch which may be illuminated as a visibly identifiable zone or area for a user to place a finger for fingerprint sensing. Such a fingerprint sensing zone can function like the rest of the device screen for displaying images. As illustrated, the device housing of the device 200 may have, in various implementations, side facets that support side control buttons that are common in various smartphones on the market today. Also, one or more optional sensors may be provided on the front side of the device 200 outside the device screen as illustrated by one example on the left upper corner of the device housing in FIG. 2A.

FIG. 2B shows an example of the structural construction of the modules in the device 200 relevant to the optical fingerprint sensing disclosed in this document. The device screen assembly shown in FIG. 2B includes, e.g., the touch sensing screen module with touch sensing layers on the top, and a display screen module with display layers located underneath the touch sensing screen module. An optical sensor module is coupled to, and located underneath, the display screen assembly module to receive and capture the returned light from the top surface of the touch sensing screen module and to guide and image the returned light onto an optical sensor array of optical sensing pixels or photodetectors which convert the optical image in the returned light into pixel signals for further processing. Underneath the optical sensor module is the device electronics structure containing certain electronic circuits for the optical sensor module and other parts in the device 200. The device electronics may be arranged inside the device housing and may include a part that is under the optical sensor module as shown in FIG. 2B.

In implementations, the top surface of the device screen assembly can be a surface of an optically transparent layer serving as a user touch sensing surface to provide multiple functions, such as (1) a display output surface through which the light carrying the display images passes through to reach a viewer's eyes, (2) a touch sensing interface to receive a user's touches for the touch sensing operations by the touch sensing screen module, and (3) an optical interface for on-screen fingerprint sensing (and possibly one or more other optical sensing functions). This optically transparent layer can be a rigid layer such as a glass or crystal layer or a flexible layer.

One example of a display screen having light emitting display pixels without using backlight is an OLED display having an array of individual emitting pixels, and a thin film transistor (TFT) structure or substrate which may include arrays of small holes and may be optically transparent and a cover substrate to protect the OLED pixels. Referring to FIG. 2B, the optical sensor module in this example is placed under the OLED display panel to capture the returned light from the top touch sensing surface and to acquire high resolution images of fingerprint patterns when user's finger is in touch with a sensing area on the top surface. In other implementations, the disclosed under-screen optical sensor module for fingerprint sensing may be implemented on a device without the touch sensing feature. In addition, a suitable display panel may be in various screen designs different from OLED displays.

FIGS. 2C and 2D illustrate an example of a device that implements the optical sensor module in FIGS. 2A and 2B. FIG. 2C shows a cross sectional view of a portion of the device containing the under-screen optical sensor module. FIG. 2D shows, on the left, a view of the front side of the device with the touch sensing display indicating a fingerprint sensing area on the lower part of the display screen, and on the right, a perspective view of a part of the device containing the optical sensor module that is under the device display screen assembly. FIG. 2D also shows an example of the layout of the flexible tape with circuit elements.

In the design examples in FIGS. 2A, 2B, 2C and 2D, the optical fingerprint sensor design is different from some other fingerprint sensor designs using a separate fingerprint sensor structure from the display screen with a physical demarcation between the display screen and the fingerprint sensor (e.g., a button like structure in an opening of the top glass cover in some mobile phone designs) on the surface of the mobile device. In the illustrated designs here, the optical fingerprint sensor for detecting fingerprint sensing and other optical signals are located under the top cover glass or layer (e.g., FIG. 2C) so that the top surface of the cover glass serves as the top surface of the mobile device as a contiguous and uniform glass surface across both the display screen layers and the optical detector sensor that are vertically stacked and vertically overlap. This design for integrating optical fingerprint sensing and the touch sensitive display screen under a common and uniform surface provides benefits, including improved device integration, enhanced device packaging, enhanced device resistance to exterior elements, failure and wear and tear, and enhanced user experience over the ownership period of the device.

Figure 2E:
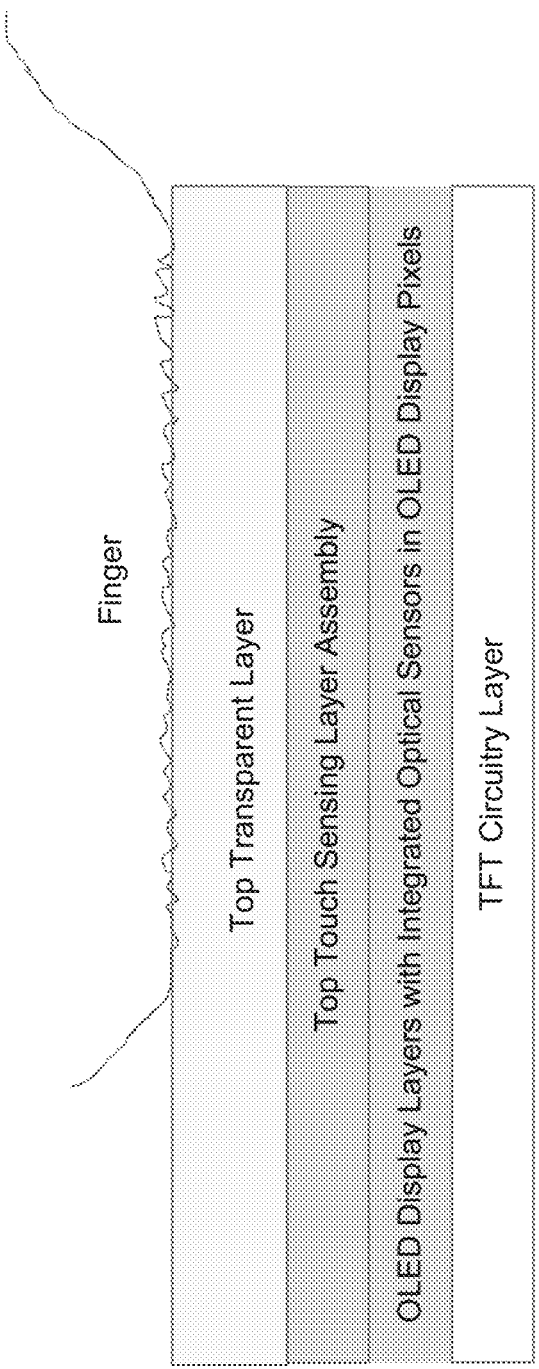
FIGS. 2E, 2F and 2G show examples of interleaving optical sensors with OLED pixels in the OLED display panel for optical sensing.
Figure 2F:
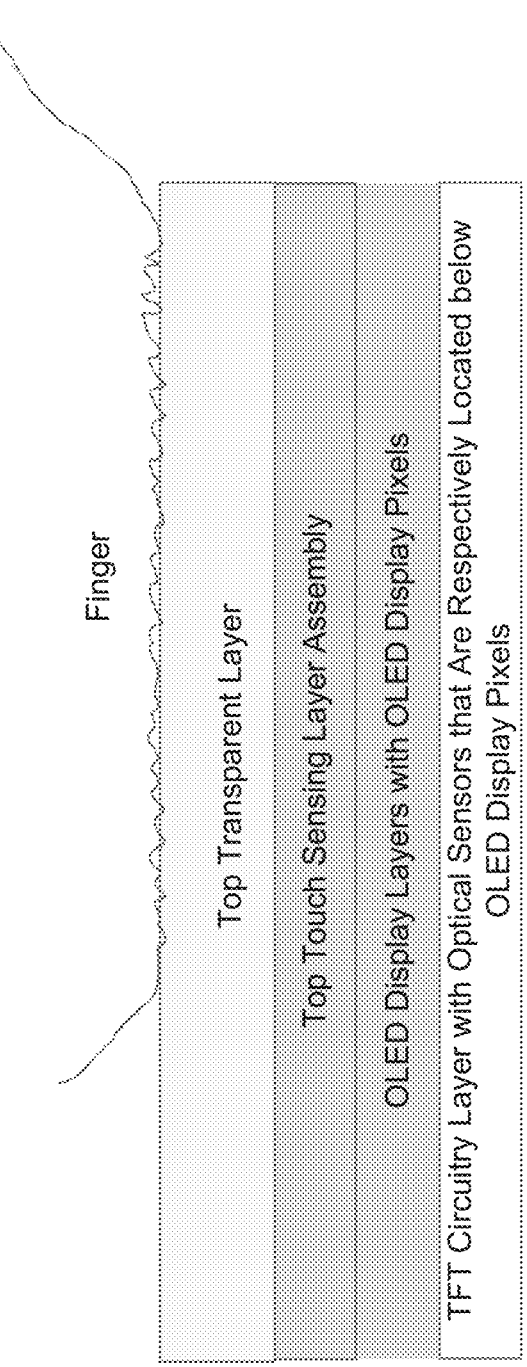
Figure 2G:
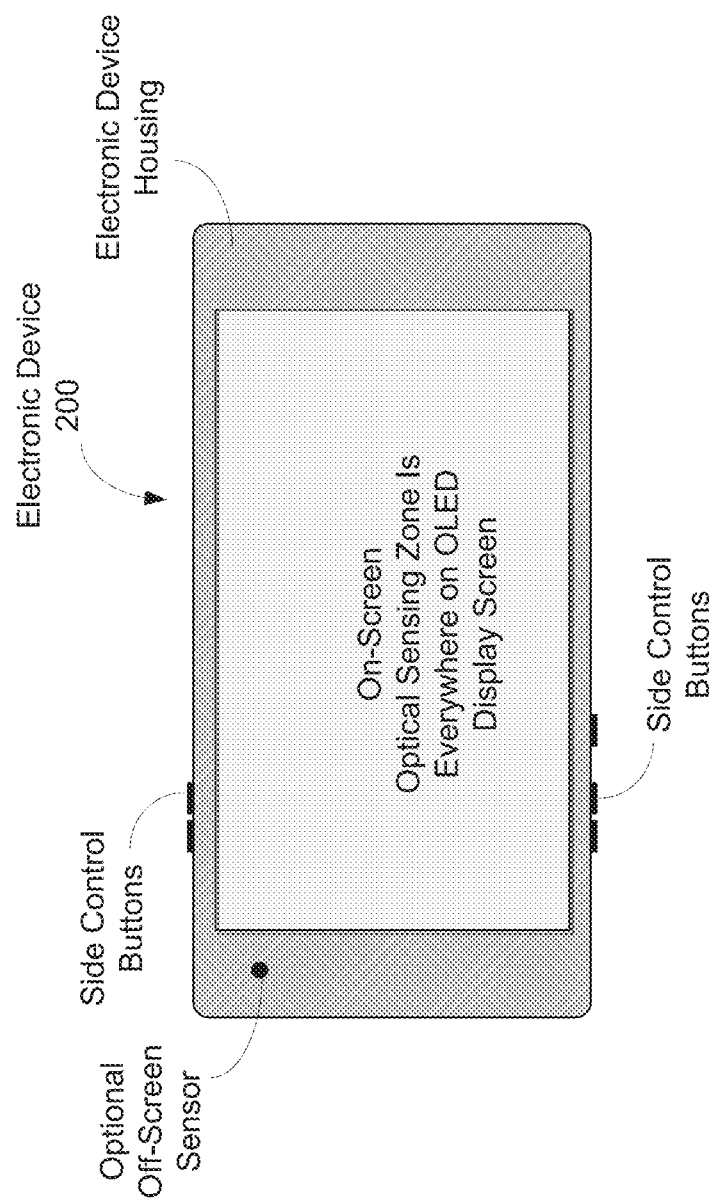

In other designs, the sensor device 181 in FIG. 1 can be an optical sensor module that is integrated to the display panel to utilize the entire display surface as an optical sensing surface for sensing a fingerprint or other patterns (e.g., palm patterns or facial patterns) where the optical sensors of the optical sensor array are spatially interleaved with the display pixels of the display panel so that the entire display surface can be used as an optical sensing surface for sensing a fingerprint or other patterns (e.g., palm patterns or facial patterns) while also serving as a display panel for displaying images, graphics, text and video contents. FIGS. 2E, 2F and 2G show examples of such designs and FIGS. 51 through 58 provide additional implementation examples.

In FIG. 2E, the optical sensors or photodetectors of the optical sensor array can be integrated with the light emitting pixels of an organic light emitting diode display (OLED) panel so that a unit color pixel having OLED pixels of different emitting colors includes at least one optical sensor. Implementations, the optical sensors (e.g., photodiodes) and the OLED pixels are grown over the same substrate along with other layers such as TFT circuitry layer electrically coupled to the OLED pixels and the optical sensors.

FIG. 2F shows another example in which the optical sensors or photodetectors of the optical sensor array can be formed outside the OLED pixel layer of the OLED display panel but are directly formed in a thin film transistor (TFT) layer on the same substrate for forming the OLED display pixel layer as a display size photodetector array to use the entire OLED display panel surface as an optical sensing surface.

In addition to the examples in FIGS. 2E and 2F, the optical sensors or photodetectors of the optical sensor array can be formed in a separate substrate from the OLED substrate for forming the OLED pixels as a display size photodetector array to use the entire OLED display panel surface as an optical sensing surface. In such implementations, the optical sensors of the optical sensor array on the separate substrate are arranged to spatially correspond to the OLED pixels on the OLED substrate so that once the OLED structure and the optical sensor module structured are integrated or engaged, the optical sensors of the optical sensor module and the OLED pixels of the OLED structure are spatially overlapped and interleaved so that the optical sensors are distributed over the entire OLED pixel array for optical sensing.

FIG. 2G shows an example that the entire OLED display panel can be operated as an optical sensing surface due to the presence of optical sensors that are spatially distributed and interleaved with the OLED pixels. In comparison with the example in FIG. 2A where a smaller optical sensor array is placed underneath the display panel to use a small area of the display panel surface as an optical sensing surface, the full display size optical sensing area in FIG. 2G provides a large optical sensing surface for not only sending fingerprints but other larger patterns such as palm prints or facial patterns.

Figure 3:
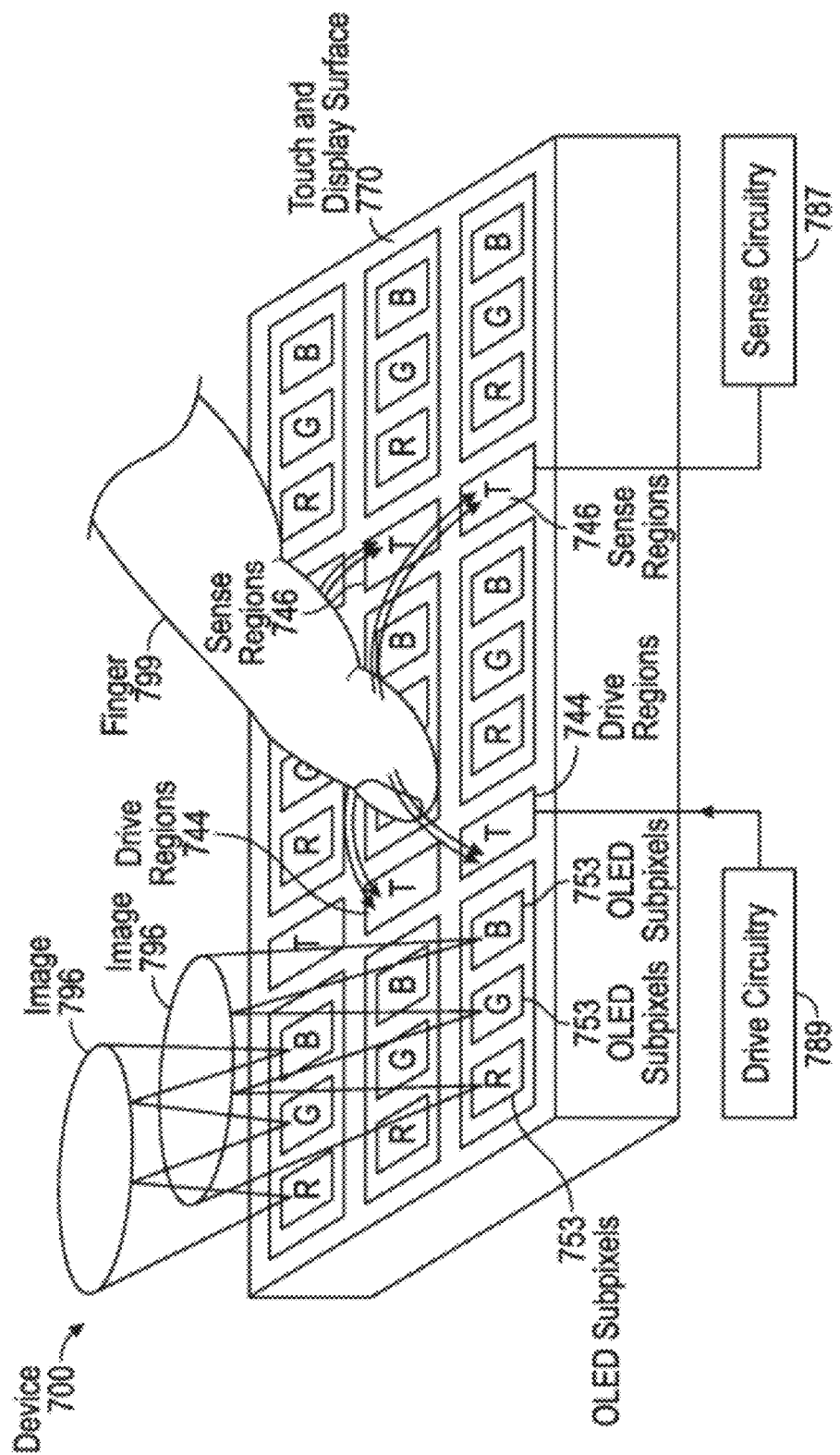
FIG. 3 illustrates one example of an OLED display and touch sensing assembly suitable for implementing the disclosed optical fingerprint sensing technology.

Various OLED display designs and touch sensing designs can be used for the device screen assembly above the optical sensor module in FIGS. 2A, 2B, 2C and 2D. FIG. 3 illustrates one example of an OLED display and touch sensing assembly, which is FIG. 7B of U.S. Patent Publication No. US 2015/0331508 A1 published on Nov. 19, 2015, a patent application entitled "Integrated Silicon-OLED Display and Touch Sensor Panel" by Apple, Inc., which is incorporated by reference as part of the disclosure of this patent document. OLEDs can be implemented in various types or configurations, including, but not limited to, passive-matrix OLEDs (PMOLEDs), active-matrix OLEDs (AMOLEDs), transparent OLEDs, cathode-common OLEDs, anode-common OLEDs, White OLEDs (WOLEDs), and RGB-OLEDs. The different types of OLEDs can have different uses, configurations, and advantages. In the example of a system having an integrated Silicon-OLED display and touch sensor panel, the system can include a Silicon substrate, an array of transistors, one or more metallization layers, one or more vias, an OLED stack, color filters, touch sensors, and additional components and circuitry. Additional components and circuitry can include an electrostatic discharge device, a light shielding, a switching matrix, one or more photodiodes, a near-infrared detector and near-infrared color filters. The integrated Silicon-OLED display and touch sensor panel can be further configured for near-field imaging, optically-assisted touch, and fingerprint detection. In some examples, a plurality of touch sensors and/or display pixels can be grouped into clusters, and the clusters can be coupled to a switching matrix for dynamic change of touch and/or display granularity. In the OLED example in FIG. 3 and other implementations, touch sensors and touch sensing circuitry can include, for example, touch signal lines, such as drive lines and sense lines, grounding regions, and other circuitry. One way to reduce the size of an integrated touch screen can be to include multi-function circuit elements that can form part of the display circuitry designed to operate as circuitry of the display system to generate an image on the display. The multi-function circuit elements can also form part of the touch sensing circuitry of a touch sensing system that can sense one or more touches on or near the display. The multi-function circuit elements can be, for example, capacitors in display pixels of an LCD that can be configured to operate as storage capacitors/electrodes, common electrodes, conductive wires/pathways, etc., of the display circuitry in the display system, and that can also be configured to operate as circuit elements of the touch sensing circuitry. The OLED display example in FIG. 3 can be implemented to include multi-touch functionality to an OLED display without the need of a separate multi-touch panel or layer overlaying the OLED display. The OLED display, display circuitry, touch sensors, and touch circuitry can be formed on a Silicon substrate. By fabricating the integrated OLED display and touch sensor panel on a Silicon substrate, extremely high pixels per inch (PPI) can be achieved. Other arrangements different from FIG. 3 for the OLED and touch sensing structures are also possible. For example, the touch sensing layers can be an assembly that is located on top of the OLED display assembly.

Referring back to FIGS. 2A and 2B, the illustrated under-screen optical sensor module for on-screen fingerprint sensing may be implemented in various configurations. In one implementation, a device based on the above design can be structured to include a device screen a that provides touch sensing operations and includes a display panel structure having light emitting display pixels each operable to emit light for forming a display image, a top transparent layer formed over the device screen as an interface for being touched by a user for the touch sensing operations and for transmitting the light from the display structure to display images to a user, and an optical sensor module located below the display panel structure to receive light that is emitted by at least a portion of the light emitting display pixels of the display structure and is returned from the top transparent layer to detect a fingerprint.

This device can be further configured with various features. For example, a device electronic control module can be included in the device to grant a user's access to the device if a detected fingerprint matches a fingerprint an authorized user. In addition, the optical sensor module is configured to, in addition to detecting fingerprints, also detect a biometric parameter different form a fingerprint by optical sensing to indicate whether a touch at the top transparent layer associated with a detected fingerprint is from a live person, and the device electronic control module is configured to grant a user's access to the device if both (1) a detected fingerprint matches a fingerprint an authorized user and (2) the detected biometric parameter indicates the detected fingerprint is from a live person. The biometric parameter can include, e.g., whether the finger contains a blood flow, or a heartbeat of a person.

For example, the device can include a device electronic control module coupled to the display panel structure to supply power to the light emitting display pixels and to control image display by the display panel structure, and, in a fingerprint sensing operation, the device electronic control module operates to turn off the light emitting display pixels in one frame to and turn on the light emitting display pixels in a next frame to allow the optical sensor array to capture two fingerprint images with and without the illumination by the light emitting display pixels to reduce background light in fingerprint sensing.

For another example, a device electronic control module may be coupled to the display panel structure to supply power to the light emitting display pixels and to turn off power to the light emitting display pixels in a sleep mode, and the device electronic control module may be configured to wake up the display panel structure from the sleep mode when the optical sensor module detects the presence of a person's skin at the designated fingerprint sensing region of the top transparent layer. More specifically, in some implementations, the device electronic control module can be configured to operate one or more selected light emitting display pixels to intermittently emit light, while turning off power to other light emitting display pixels, when the display panel structure is in the sleep mode, to direct the intermittently emitted light to the designated fingerprint sensing region of the top transparent layer for monitoring whether there is a person's skin in contact with the designated fingerprint sensing region for waking up the device from the sleep mode. Also, the display panel structure may be designed to include one or more LED lights in addition to the light emitting display pixels, and the device electronic control module may be configured to operate the one or more LED lights to intermittently emit light, while turning off power to light emitting display pixels when the display panel structure is in the sleep mode, to direct the intermittently emitted light to the designated fingerprint sensing region of the top transparent layer for monitoring whether there is a person's skin in contact with the designated fingerprint sensing region for waking up the device from the sleep mode.

For another example, the device can include a device electronic control module coupled to the optical sensor module to receive information on multiple detected fingerprints obtained from sensing a touch of a finger and the device electronic control module is operated to measure a change in the multiple detected fingerprints and determines a touch force that causes the measured change. For instance, the change may include a change in the fingerprint image due to the touch force, a change in the touch area due to the touch force, or a change in spacing of fingerprint ridges.

For another example, the top transparent layer can include a designated fingerprint sensing region for a user to touch with a finger for fingerprint sensing and the optical sensor module below the display panel structure can include a transparent block in contact with the display panel substrate to receive light that is emitted from the display panel structure and returned from the top transparent layer, an optical sensor array that receives the light and an optical imaging module that images the received light in the transparent block onto the optical sensor array. The optical sensor module can be positioned relative to the designated fingerprint sensing region and structured to selectively receive returned light via total internal reflection at the top surface of the top transparent layer when in contact with a person's skin while not receiving the returned light from the designated fingerprint sensing region in absence of a contact by a person's skin.

For yet another example, the optical sensor module can be structured to include an optical wedge located below the display panel structure to modify a total reflection condition on a bottom surface of the display panel structure that interfaces with the optical wedge to permit extraction of light out of the display panel structure through the bottom surface, an optical sensor array that receives the light from the optical wedge extracted from the display panel structure, and an optical imaging module located between the optical wedge and the optical sensor array to image the light from the optical wedge onto the optical sensor array.

Specific examples of under-screen optical sensor modules for on-screen fingerprint sensing are provided below.

Figure 4A:
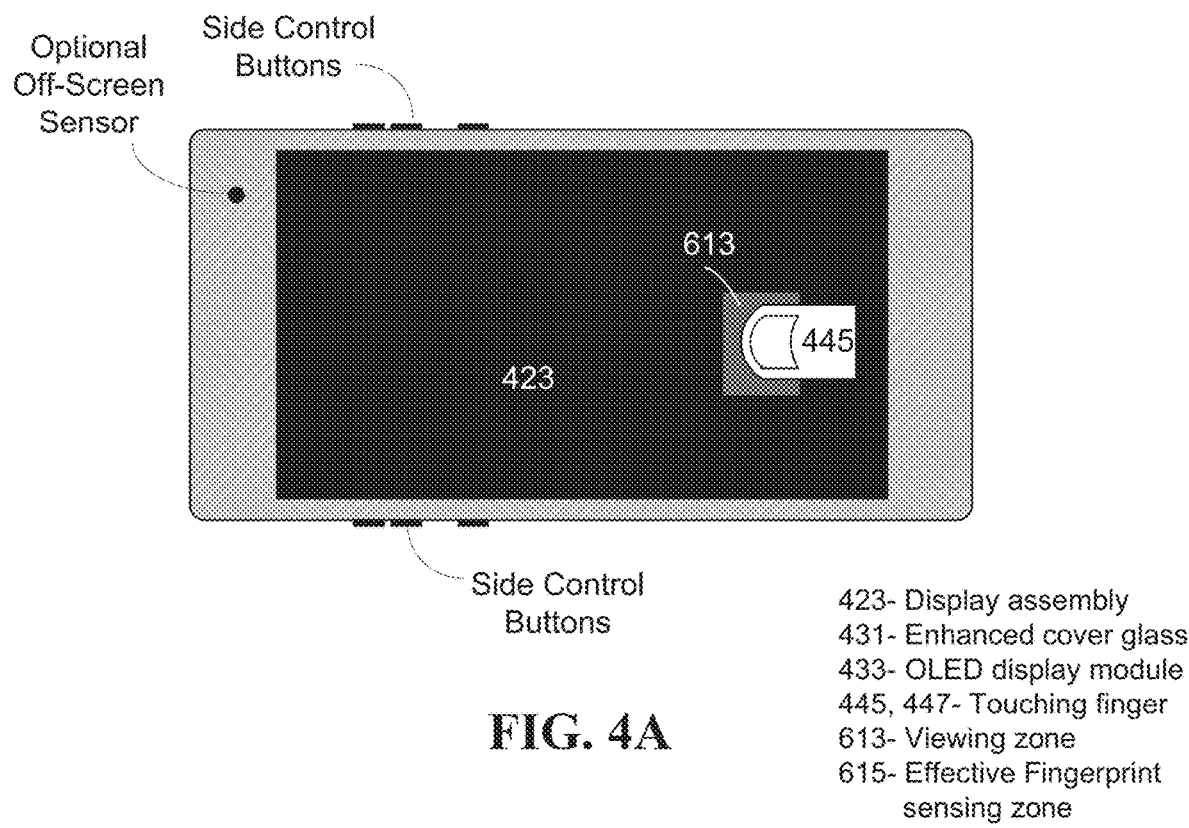
FIGS. 4A and 4B show an example of one implementation of an optical sensor module under the display screen assembly for implementing the design in FIGS. 2A and 2B.
Figure 4B:
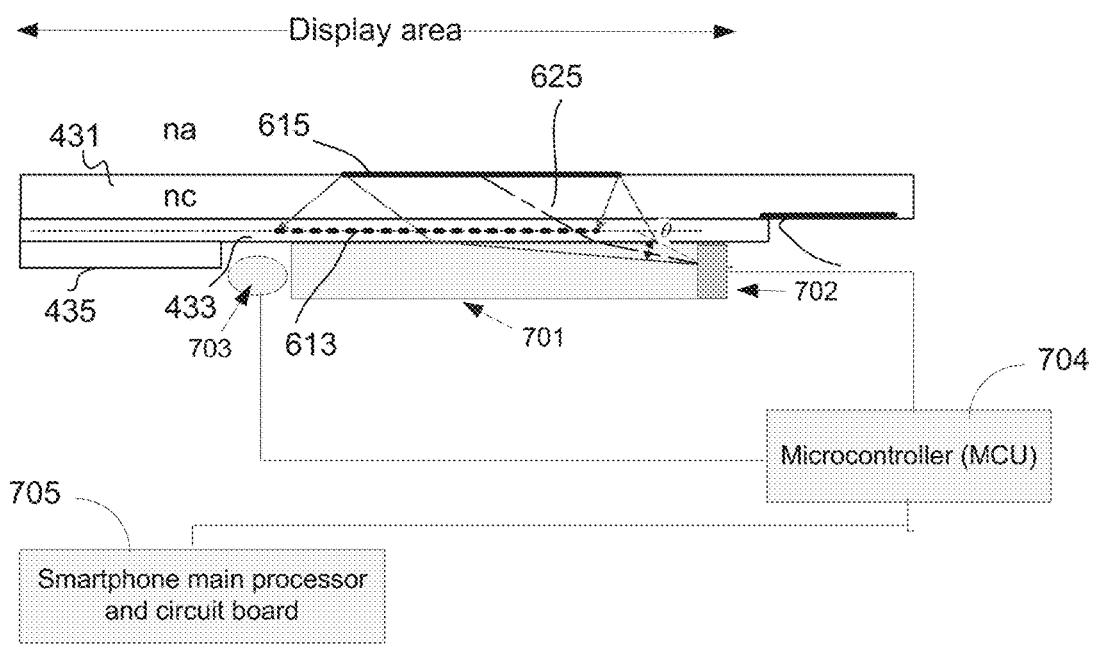

FIG. 4A and FIG. 4B show an example of one implementation of an optical sensor module under the display screen assembly for implementing the design in FIGS. 2A and 2B. The device in FIGS. 4A-4B includes a display assembly 423 with a top transparent layer 431 formed over the device screen assembly 423 as an interface for being touched by a user for the touch sensing operations and for transmitting the light from the display structure to display images to a user. This top transparent layer 431 can be a cover glass or a crystal material in some implementations. The device screen assembly 423 can include an OLED display module 433 under the top transparent layer 431. The OLED display module 433 includes, among others, OLED layers including an array of OLED pixels that emit light for displaying images. The OLED layers have electrodes and wiring structure optically acting as an array of holes and light scattering objects. The array of holes in the OLED layers allows transmission of light from the top transparent layer 431 through the OLED layers to reach the optical sensor module under the OLED layers and the light scattering caused by the OLED layers affects the optical detection by the under-screen optical sensor module for fingerprint sensing. A device circuit module 435 may be provided under the OLED display panel to control operations of the device and perform functions for the user to operate the device.

The optical sensor module in this particular implementation example is placed under OLED display module 433. The OLED pixels in a fingerprint illumination zone 613 can be controlled to emit light to illuminate the fingerprint sensing zone 615 on the top transparent layer 431 within the device screen area for a user to place a finger therein for fingerprint identification. As illustrated, a finger 445 is placed in the illuminated fingerprint sensing zone 615 as the effective sensing zone for fingerprint sensing. A portion of the reflected or scattered light in the zone 615 illuminated by the OLED pixels in the fingerprint illumination zone 613 is directed into the optical sensor module underneath the OLED display module 433 and a photodetector sensing array inside the optical sensor module receives such light and captures the fingerprint pattern information carried by the received light.

In this design of using the OLED pixels in the fingerprint illumination zone 613 within the OLED display panel to provide the illumination light for optical fingerprint sensing, the OLED pixels in the fingerprint illumination zone 613 can be controlled to turn on intermittently with a relatively low cycle to reduce the optical power used for the optical sensing operations. For example, while the rest of the OLED pixels in the OLED panel are turned off (e.g., in a sleep mode), the OLED pixels in the fingerprint illumination zone 613 can be turned on intermittently to emit illumination light for optical sensing operations, including performing optical fingerprint sensing and waking up the OLED panel. The fingerprint sensing operation can be implemented in a 2-step process in some implementations: first, a few of the OLED pixels in the fingerprint illumination zone 613 within the OLED display panel are turned on in a flashing mode without turning on other OLED pixels in the fingerprint illumination zone 613 to use the flashing light to sense whether a finger touches the sensing zone 615 and, once a touch in the zone 615 is detected, the OLED pixels in the fingerprint illumination zone 613 are turned on to activate the optical sensing module to perform the fingerprint sensing. Also, upon activating the optical sensing module to perform the fingerprint sensing, the OLED pixels in the fingerprint illumination zone 613 may be operated at a brightness level to improve the optical detection performance for fingerprint sensing, e.g., at a higher brightness level than their bright level in displaying images.

In the example in FIG. 4B, the under-screen optical sensor module includes a transparent block 701 that is coupled to the display panel to receive the returned light from the top surface of the device assembly that is initially emitted by the OLED pixels in the fingerprint sensing zone 613, and an optical imaging block 702 that performs the optical imaging and imaging capturing. Light from OLED pixels in the fingerprint illumination zone 613, after reaching the cover top surface, e.g., the cover top surface at the sensing area 615 where a user finger touches, is reflected or scattered back from the cover top surface. When fingerprint ridges in close contact of the cover top surface in the sensing area 615, the light reflection under the fingerprint ridges is different, due to the presence of the skin or tissue of the finger in contact at that location, from the light reflection at another location under the fingerprint valley, where the skin or tissue of the finger is absent. This difference in light reflection conditions at the locations of the ridges and valleys in the touched finger area on the cover top surface forms an image representing an image or spatial distribution of the ridges and valleys of the touched section of the finger. The reflection light is directed back towards the OLED pixels, and, after passing through the small holes of the OLED display module 433, reaches the interface with the low index optically transparent block 701 of the optical sensor module. The low index optically transparent block 701 is constructed to have a refractive index less than a refractive index of the OLED display panel so that the returned light can be extracted out of the OLED display panel into the optically transparent block 701. Once the returned light is received inside the optically transparent block 701, such received light enters the optical imaging unit as part of the imaging sensing block 702 and is imaged onto the photodetector sensing array or optical sensing array inside the block 702. The light reflection differences between fingerprint ridges and valleys create the contrast of the fingerprint image. As shown in FIG. 4B is a control circuit 704 (e.g., a microcontroller or MCU) which is coupled to the imaging sensing block 702 and to other circuitry such as the device main processor 705 on a main circuit board.

In this particular example, the optical light path design is such the light ray enters the cover top surface within the total reflect angles on the top surface between the substrate and air interface will get collected most effectively by the imaging optics and imaging sensor array in the block 702. In this design the image of the fingerprint ridge/valley area exhibits a maximum contrast. Such an imaging system may have undesired optical distortions that would adversely affect the fingerprint sensing. Accordingly, the acquired image may be further corrected by a distortion correction during the imaging reconstruction in processing the output signals of the optical sensor array in the block 702 based on the optical distortion profile along the light paths of the returned light at the optical sensor array. The distortion correction coefficients can be generated by images captured at each photodetector pixel by scanning a test image pattern one line pixel at a time, through the whole sensing area in both X direction lines and Y direction lines. This correction process can also use images from tuning each individual pixel on one at a time, and scanning through the whole image area of the photodetector array. This correction coefficients only need to be generated one time after assembly of the sensor.

The background light from environment (e.g., sun light or room light) may enter the image sensor through OLED panel top surface, through TFT substrate holes in the OLED display assembly 433. Such background light can create a background baseline in the interested images from fingers and is undesirable. Different methods can be used to reduce this baseline intensity. One example is to tune on and off the OLED pixels in the fingerprint illumination zone 613 at a certain frequency F and the image sensor accordingly acquires the received images at the same frequency by phase synchronizing the pixel driving pulse and image sensor frame. Under this operation, only one of the image phases has the lights emitted from pixels. By subtracting even and odd frames, it is possible to obtain an image which most consists of light emitted from the modulated OLED pixels in the fingerprint illumination zone 613. Based on this design, each display scan frame generates a frame of fingerprint signals. If two sequential frames of signals by turning on the OLED pixels in the fingerprint illumination zone 613 in one frame and off in the other frame are subtracted, the ambient background light influence can be minimized or substantially eliminated. In implementations, the fingerprint sensing frame rate can be one half of the display frame rate.

A portion of the light from the OLED pixels in the fingerprint illumination zone 613 may also go through the cover top surface, and enter the finger tissues. This part of light power is scattered around and a part of this scattered light may go through the small holes on the OLED panel substrate, and is eventually collected by the imaging sensor array in the optical sensor module. The light intensity of this scattered light depends on the finger's skin color, the blood concentration in the finger tissue and this information carried by this scattered light on the finger is useful for fingerprint sensing and can be detected as part of the fingerprint sensing operation. For example, by integrating the intensity of a region of user's finger image, it is possible to observe the blood concentration increase/decrease depends on the phase of the user's heart-beat. This signature can be used to determine the user's heart beat rate, to determine if the user's finger is a live finger, or to provide a spoof device with a fabricated fingerprint pattern.

Referring to the OLED display example in FIG. 3, an OLED display usually has different color pixels, e.g., adjacent red, green and blue pixels form one color OLED pixels. By controlling which color of pixels within each color pixel to turn on and recording corresponding measured intensity, the user's skin color may be determined. As an example, when a user registers a finger for fingerprint authentication operation, the optical fingerprint sensor also measures intensity of the scatter light from finger at color A, and B, as intensity Ia, Ib. The ratio of Ia/Ib could be recorded to compare with later measurement when user's finger is placed on the sensing area to measure fingerprint. This method can help reject the spoof device which may not match user's skin color.

In some implementations, to provide a fingerprint sensing operation using the above described optical sensor module when the OLED display panel is not turn on, one or more extra LED light sources 703 designated for providing fingerprint sensing illumination can be placed on the side of the transparent block 701 as shown in FIG. 4B. This designated LED light 703 can be controlled by the same electronics 704 (e.g., MCU) for controlling the image sensor array in the block 702. The designated LED light 703 can be pulsed for a short time, at a low duty cycle, to emit light intermittently and to provide pulse light for image sensing. The image sensor array can be operated to monitor the light pattern reflected off the OLED panel cover substrate at the same pulse duty cycle. If there is a human finger touching the sensing area 615 on the screen, the image that is captured at the imaging sensing array in the block 702 can be used to detect the touching event. The control electronics or MCU 704 connected to the image sensor array in the block 702 can be operated to determine if the touch is by a human finger touch. If it is confirmed that it is a human finger touch event, the MCU 704 can be operated to wake up the smartphone system, turn on the OLED display panel (or at least the off the OLED pixels in the fingerprint illumination zone 613 for performing the optical fingerprint sensing), and use the normal mode to acquire a full fingerprint image. The image sensor array in the block 702 will send the acquired fingerprint image to the smartphone main processor 705 which can be operated to match the captured fingerprint image to the registered fingerprint database. If there is a match, the smartphone will unlock the phone, and start the normal operation. If the captured image is not matched, the smartphone will feedback to user that the authentication is failed. User may try again, or input passcode.

In the example in FIG. 4B, the under-screen optical sensor module uses the optically transparent block 701 and the imaging sensing block 702 with the photodetector sensing array to optically image the fingerprint pattern of a touching finger in contact with the top surface of the display screen onto the photodetector sensing array. The optical imaging axis or detection axis 625 from the sensing zone 615 to the photodetector array in the block 702 is illustrated in FIG. 4B. The optically transparent block 701 and the front end of the imaging sensing block 702 before the photodetector sensing array forma a bulk imaging module to achieve proper imaging for the optical fingerprint sensing. Due to the optical distortions in this imaging process, a distortion correction can be used, as explained above, to achieve the desired imaging operation.

Two-Dimensional Optical Reflective Pattern from a Finger

When probe light is directed to a finger, a portion of the probe light can be reflected, diffracted or scattered at the finger skin surface to produce reflected, diffracted or scattered probe light without entering the internal side of the finger. This portion of the probe light without entering the finger can carry a 2-dimensional optical reflective pattern across the reflected probe light beam caused by the external ridges and valleys of the finger and can be detected to obtain the fingerprint pattern of the external ridges and valleys. This is explained with reference to the examples in FIGS. 5A and 5B in this subsection.

In addition, a portion of the probe light may enter the finger and is scattered by the internal tissues in the finger. Depending on the optical wavelength of the probe light inside the finger, the internal tissues in the finger be optically absorptive and thus can be severally attenuated except for probe light in an optical transmission spectral range roughly from 590 nm and 950 nm. The probe light that can transmit through the finger tissues carries an optical transmissive pattern across the beam and this transmitted probe light beam can carry both a 2-dimensional pattern of the ridges and valleys and an additional topographical information of the internal issues associated with the ridges and valleys due to the internal path through such internal tissues before exiting the finger skin. This optical transmissive pattern is explained with reference to examples in FIGS. 5C and 5D in the next subsection.

In the optical sensing by the under-screen optical sensor module in FIGS. 4A-4B and other designs disclosed herein, the optical signal from the sensing zone 615 on the top transparent layer 431 to the under-screen optical sensor module include different light components.

Figure 5A:
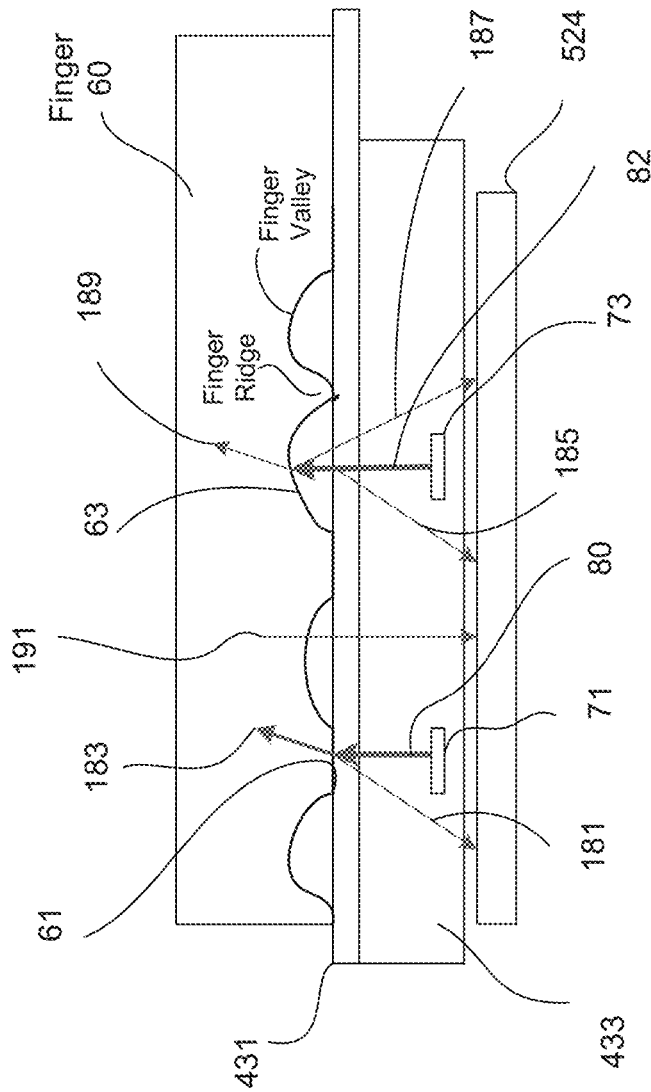
FIGS. 5A and 5B illustrate signal generation for the returned light from the sensing zone on the top sensing surface under two different optical conditions to obtain optical reflective patterns representing external fingerprint patterns formed on the outer skin of a finger and the operation of the under-screen optical sensor module.
Figure 5B:
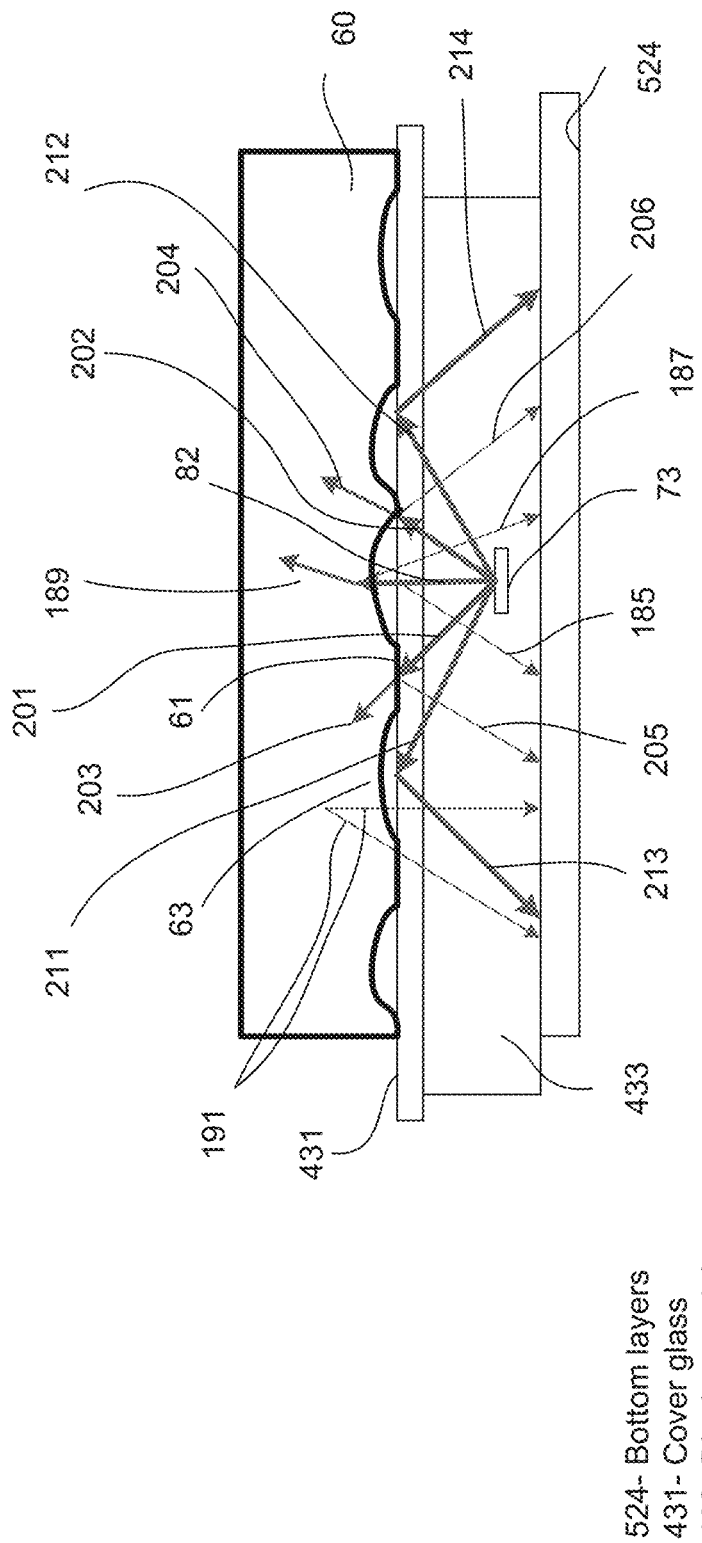

FIGS. 5A and 5B illustrate signal generation for the returned light from the sensing zone 615 for OLED-emitted light or other illumination light at different incident angle ranges under two different optical conditions to facilitate the understanding of the operation of the under-screen optical sensor module.

FIG. 5A shows optical paths of selected OLED-emitted light rays from OLED pixels in the OLED display module 433 that are incident to and transmit through the top transparent layer 431 at small incident angles at the top surface of the transparent layer 431 without the total internal reflection. Such OLED-emitted light rays at small incident angles generates different returned light signals including light signals that carry fingerprint pattern information to the under-screen optical sensor module. Specifically, two OLED pixels 71 and 73 at two different locations are shown to emit OLED output light beams 80 and 82 that are directed to the top transparent layer 431 in a direction that is either perpendicular to the top transparent layer 431 or at relatively small incident angles without experiencing the total reflection at the interfaces of the top transparent layer 431. In the particular example illustrated in FIG. 5A, a finger 60 is in contact with the sensing zone 615 on the e top transparent layer 431 and a finger ridge 61 is located above the OLED pixel 71 and a finger valley 63 is located above the OLED pixel 73. As illustrated, the OLED light beam 80 from the OLED pixel 71 toward the finger ridge 61 reaches the finger ridge 61 in contact with the top transparent layer 431 after transmitting through the top transparent layer 431 to generate a transmitted light beam 183 in the finger tissue and another scattered light beam 181 back towards the OLED display module 433. The OLED light beam 82 from the OLED pixel 73 reaches the finger valley 63 located above the top transparent layer 431 after transmitting through the top transparent layer 431 to generate the reflected light beam 185 from the interface with the top transparent layer 431 back towards the OLED display module 433, a second light beam 189 that enters the finger tissue and a third light beam 187 reflected by the finger valley surface.

In the example in FIG. 5A, it is assumed that the finger skin's equivalent index of refraction is about 1.44 at the optical wavelength of 550 nm and the cover glass index of refraction is about 1.51 for the top transparent layer 431. It is also assumed that the finger is clean and dry so that the void between adjacent finger valley and ridge is air. Under those assumptions, the display OLED pixel 71 is turned on at the finger skin ridge location 61 to produce the beam 80. The finger ridge-cover glass interface reflects part of the beam 80 as reflected light 181 to bottom layers 524 below the OLED display module 433. The reflectance is low and is about 0.1%. The majority of the light beam 80 (around 99%) becomes the transmitted beam 183 that transmits into the finger tissue 60 which causes scattering of the light 183 to contribute to the returned scattered light 191 towards the OLED display module 433 and the bottom layers 524.

The OLED-emitted beam 82 from the OLED pixel 73 towards the external valley 63 first passes the interface of the top transparent layer 431 and the air gap due to the presence of the external valley 63 to produce the reflected beam 185 and the remaining portion of the light beam 82 is incident onto the valley 62 to produce the transmitted light beam 189 inside the finger and a reflected beam 187. Similar to the transmitted beam 183 at the finger ridge 61, the transmitted light beam 189 from the OLED pixel 73 in the finger tissue is scattered by the finger tissues and a portion of this scattered light also contributes to the returned scattered light 191 that is directed to towards the OLED display module 433 and the under layers 524. Under the assumptions stated above, about 3.5% of the beam 82 from the display OLED group 73 at the finger skin valley location 63 is reflected by the cover glass surface as the reflected light 185 to the bottom layers 524, and the finger valley surface reflects about 3.3% of the incident light power of the remainder of the beam 82 as the reflected light 187 to bottom layers 524. The total reflection represented by the two reflected beams 185 and 187 is about 6.8% and is much stronger than the reflection 181 at about 0.1% at a finger ridge 61. Therefore, the light reflections 181 and 185/187 from various interface or surfaces at finger valleys 63 and finger ridges 61 of a touching finger are different and form an optical reflective pattern in which the reflection ratio difference carries the fingerprint map information and can be measured to extract the fingerprint pattern of the portion that is in contact with the top transparent layer 431 and is illuminated the OLED light or other illumination light such as extra illumination light sources.

At each finger valley 63, the majority of the beam 82 towards the finger valley 63 (more than 90%) is transmitted into the finger tissues 60 as the transmitted light 189. Part of the light power in the transmitted light 189 is scattered by internal tissues of the finger to contribute to the scattered light 191 towards and into the bottom layers 524. Therefore, the scattered light 191 towards and into the bottom layers 524 includes contributions from both the transmitted light 189 at finger valleys 63 and transmitted light 183 at finger ridges 61.

The example in FIG. 5A shows incident OLED-emitted light to the top transparent layer 431 at small incident angles without the total internal reflection in the top transparent layer 431. For OLED-emitted light incident to the top transparent layer 431 at relatively large incident angles at or greater than the critical angle for the total internal reflection, another higher-contrast optical reflective pattern can be generated to capture the 2-dimensional fingerprint pattern of the external ridges and valleys of a finger. FIG. 5B shows examples of selected OLED-emitted light rays from an OLED pixel 73 in the OLED display module 433 located under a finger valley 63 where some of the illustrated light rays are under a total reflection condition at the interface with the top transparent layer 431 at locations adjacent to the particular finger valley 73. Those illustrated examples of incident light rays generate different returned light signals including light signals that carry fingerprint pattern information to the under-screen optical sensor module. It is assumed that the cover glass 431 and the OLED display module 433 are glued together without any air gap in between so that an OLED light beam emitted by an OLED pixel 73 with a large incident angle to the cover glass 431 at or greater than the critical angle will be totally reflected at the cover glass-air interface. When the display OLED pixel 73 is turned on, the divergent light beams emitted by the OLED pixel 73 can be divided into three groups: (1) central beams 82 with small incident angles to the cover glass 431 without the total reflection, (2) high contrast beams 201, 202, 211, 212 that are totally reflected at the cover glass 431 when nothing touches the cover glass surface and can be coupled into finger tissues when a finger touches the cover glass 431, and (3) escaping beams having very large incident angles that are totally reflected at the cover glass 431 even at a location where the finger is in contact.

For the central light beams 82, as explained in FIG. 5A, the cover glass surface reflects about 0.1%~3.5% to produce the reflected light beam 185 that is transmitted into bottom layers 524, the finger skin reflects about 0.1%~3.3% at the air-finger valley interface to produce a second reflected light beam 187 that is also transmitted into bottom layers 524. As explained above with reference to FIG. 5A, the reflection difference in the reflected rays at small incident angles varies spatially and is dependent on whether the light beams 82 or light beams 80 meet with finger skin valley 63 or ridge 61. The rest of the such incident light rays with small incident angles becomes the transmitted light beams 189 and 183 that are coupled into the finger tissues 60.

FIG. 5B shows high contrast light beams 201 and 202 as examples. The cover glass surface reflects nearly 100% as reflected light beams 205 and 206 respectively if nothing touches the cover glass surface at their respective incident positions. When the finger skin ridges touch the cover glass surface and at the incident positions of the illustrated OLED-emitted light beams 201 and 202, there is no longer the condition for the total internal reflection and thus most of the light power is coupled into the finger tissues 60 as transmitted light beams 203 and 204. For such beams with large incident angles, this change between being under the total internal reflection condition in absence of a finger skin and being out of the total internal reflection condition with a significantly reduced reflection when a finger skin touches is used to produce a contrast pattern in the reflection.

FIG. 5B further shows additional high contrast light beams 211 and 212 as examples for which the cover glass surface reflects nearly 100% to produce corresponding reflected light beams 213 and 214 respectively under the total internal reflection condition if nothing touches the cover glass surface. For example, when the finger touches the cover glass surface and the finger skin valleys happen to be at the incident positions of the light beams 211 and 212, no light power is coupled into finger tissues 60 due to the total internal reflection. If, by contrast, finger ridges happen to be at the incident positions of the light beams 211 and 212, the light power that is coupled into finger tissues 60 increases due to the lack of the total internal reflection caused by the contact of the finger skin.

Similar to the situation in FIG. 5A, light beams (e.g., transmitted beams 203 and 204) that are coupled into finger tissues 60 will experience random scattering by the figure tissues to form the scattered light 191 that propagates towards the bottom layers 524.

The illumination for the examples shown in FIG. 5B can be caused by illumination by the OLED-emitted light or illumination light from extra illumination light sources. In high contrast light beams illuminated area, finger skin ridges and valleys cause different optical reflections and the reflection difference pattern carries the fingerprint pattern information. The high contrast fingerprint signals can be achieved by comparing the difference.

Therefore, as shown in FIGS. 5A and 5B, incident illumination light rays from either OLED-emitted light or extra illumination light sources can produce two types of optical reflection patterns representing the same 2-dimensional fingerprint pattern of a finger: a low contrast optical reflective pattern formed by incident illumination light rays at small incident angles without the total internal reflection and a high contrast optical reflective pattern formed by incident illumination light rays at large incident angles based on a total internal reflection.

Two-Dimensional and Three-Dimensional Optical Transmissive Pattern from a Finger In both FIGS. 5A and 5B, a portion of the incident illumination light rays from either OLED-emitted light or extra illumination light passes through the top transparent layer 431 and enters the finger to cause the scattered light 191 that propagates through the internal tissues of the finger and to penetrate through the finger skin to enter the top transparent layer 431 towards the bottom layers 524. As explained below, such scattered light 191, once transmitting through the internal tissues and the finger skin, carries an optical transmissive pattern of the finger that contains both (1) a 2-dimensional spatial pattern of external ridges and valleys of a fingerprint (2) an internal fingerprint pattern associated with internal finger tissue structures that give rise to the external ridges and valleys of a finger due to the propagation of the scattered light from the internal side of the finger towards the finger skin and transmits the finger skin. Accordingly, the scattered light 191 from the finger can be measured by the optical sensor array and the measurements can be processed for fingerprint sensing. Notably, the internal fingerprint pattern associated with internal finger tissue structures that give rise to the external ridges and valleys of a finger is not substantially affected by the sensing surface condition of the top surface of the top transparent layer 431 or the skin conditions of the finger (e.g., dirty, wet/dry or aged finger patterns) and may still provide sufficient information for fingerprint sensing when the external fingerprint pattern on the external finger skin has a reduced ridge-valley contrast, is somewhat damaged or otherwise is not suitable for providing sufficient fingerprint information in the optical reflective pattern. While the external fingerprint pattern may be duplicated by using artificial materials for invading the fingerprint sensing, the internal fingerprint pattern of a user's finger imprinted in the optical transmissive pattern is extremely difficult to replicate and thus can be used as an anti-spoofing mechanism in the fingerprint sensing.

Figure 5C:
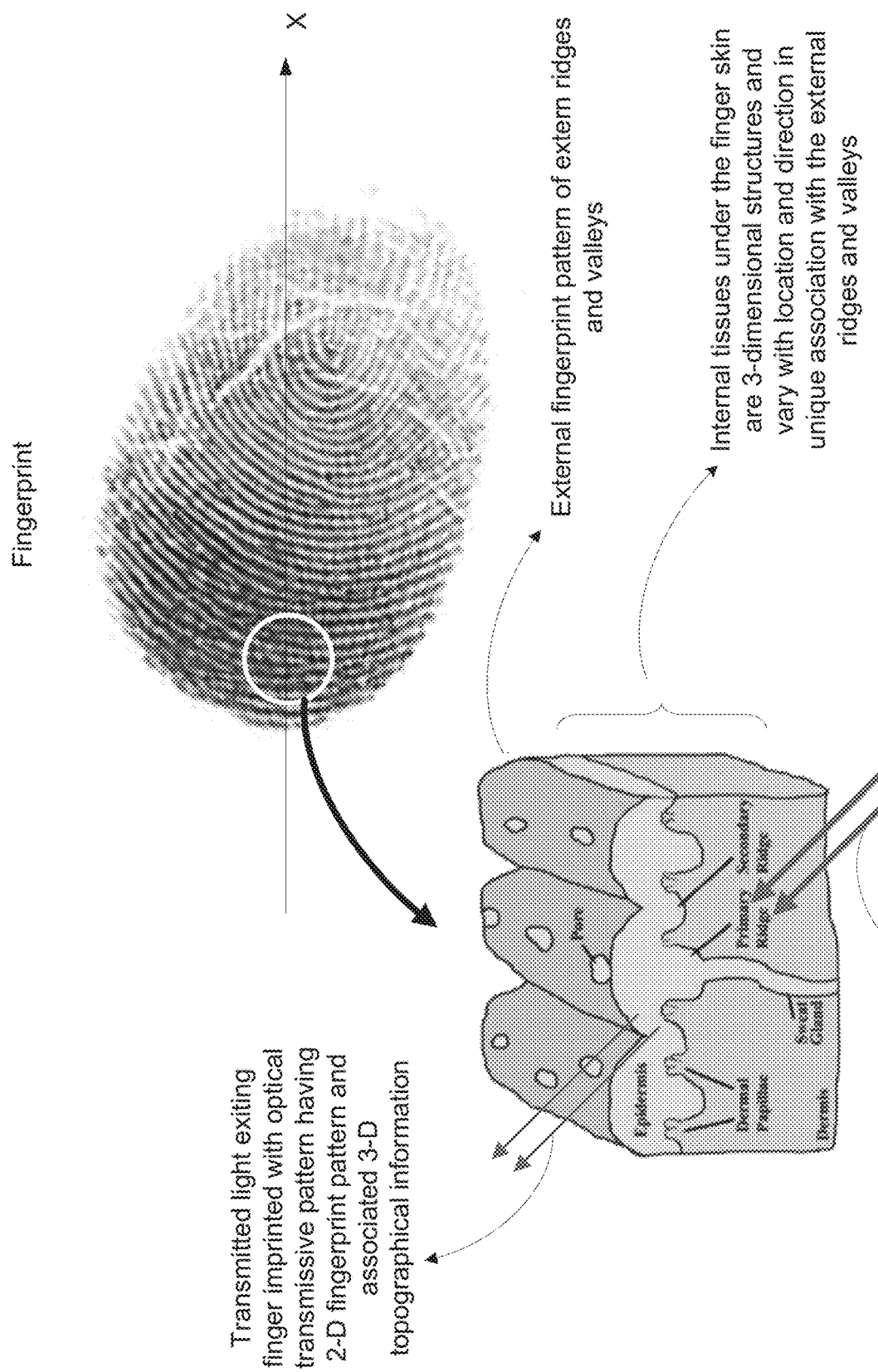
FIGS. 5C and 5D illustrate signal generation for the returned light from the sensing zone on the top sensing surface to obtain optical reflective patterns representing internal finger tissues associated with the external fingerprint patterns formed on the outer skin of a finger and the operation of the under-screen optical sensor module.

FIG. 5C shows an example of an external fingerprint pattern formed by external ridges and valleys of a person's finger and the internal finger issues that are under the skin and are uniquely associated with the external ridges and valleys. See, e.g., Chapter 2 of "The Fingerprint Sourcebook" by Holder et al. (U.S. Department of Justice, Office of Justice Programs, National Institute of Justice, Washington, D.C., 2011). As illustrated in FIG. 5C, the internal tissues include the papillary layer under the finger skin that has topographical features from which external ridges and valleys are formed as an expression of the underlying topographical features. In addition, the internal tissues also contain additional structures that are not identically replicated on the external ridges and valleys such as the internal primary and secondary ridges, the sweat glands connected to the primary ridges and other internal structures. As illustrated in FIG. 5C, when probe light propagates from the internal side of the finger outward to the finger skin, the probe light interacts with the internal tissues under the finger skin to carry not only the 2-dimensional fingerprint pattern of the papillary layer that is identical to the external fingerprint pattern formed by the external ridges and valleys but also additional topographical information from the internal tissue structures that is not carried by the external ridges and valleys. Such additional topographical information from the internal tissue structures cannot be obtained from the optical reflective pattern obtained from the optical reflection off the external finger skin. The additional topographical information from the internal tissue structures below the finger skin is valuable information for fingerprint sensing and is 3-dimensional since the internal tissue structures vary with both the lateral position under the skin and the depth from the skin surface (topographical information). Such additional topographical information from the internal tissue structures of a finger can be used, for example, to distinguish a natural finger from an artificial object manufactured with similar or identical external fingerprint pattern as the natural finger.

Referring to FIG. 5C, different illumination probe light beams go through different parts of the under-skin internal tissue structures and thus are imprinted with different 3-D topographical information associated with the different optical paths in different directions of such illumination probe light beams. Imaging processing techniques can be used to process the optical transmissive patterns carried by such different illumination probe light beams to extract the topographical features associated with the under-skin internal tissue structures. The extracted topographical features can be synthesized to construct a 3-D representation or rendition of the under-skin internal tissue structures associated with the fingerprint pattern and this constructed 3-D representation of the under-skin internal tissue structures associated with the fingerprint pattern can be used as a unique and additional identification for the fingerprint pattern and can be used to distinguish a true fingerprint pattern from a real finger of a user from a fabricated fingerprint pattern that would invariably lack of the underlying internal tissue structures of the real finger. In particular, as the number of the different illumination probe light beams in the different directions increases, the more detailed topographical information on the under-skin internal tissue structures can be captured by the optical sensor module. In using the fingerprint for a secured access to the device, the fingerprint identification process can be designed to combine the identification of the 2-D fingerprint pattern and the additional examination of the extracted 3-D representation or rendition of the under-skin internal tissue structures associated with the fingerprint pattern to determine whether or not to grant the access. The extracted topographical features and the constructed 3-D representation or rendition of the under-skin internal tissue structures associated with the fingerprint pattern can be an anti-spoofing mechanism and can used alone or in combination with other anti-spoofing techniques to enhance the security and accuracy of the fingerprint sensing.

One way for the disclosed optical fingerprint sensing technology to capture additional topographical information from the internal tissue structures of a finger is by directing different illumination probe light beams at different directions to detect the different optical shadowing patterns produced by the internal tissue structures under the finger skin that are superimposed over the 2-dimensional fingerprint pattern that is common to all images obtained from the illumination by the different illumination probe light beams at different directions.

Figure 5D:
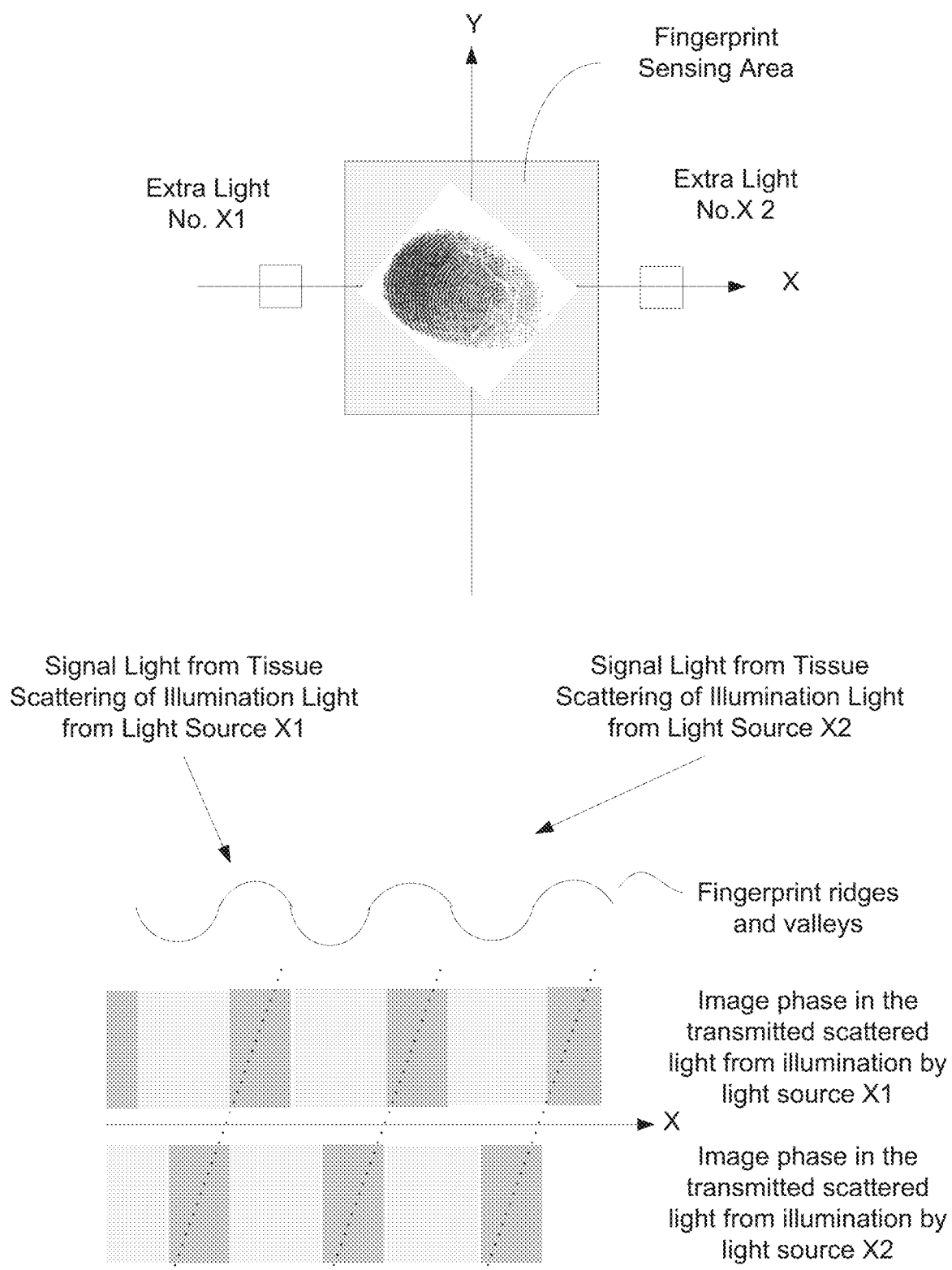

FIG. 5D shows that two extra illumination light sources X1 and X2 are placed on two opposite sides of the fingerprint sensing area on the top transparent layer 431 along the X direction so that they can direct two different illumination probe beams to the finger in opposite directions. The images from both illumination probe beams carry the same 2-D fingerprint pattern but different image shadowing patterns due to their different illumination directions with respect to the internal tissue structures under the finger skin. Specifically, the first extra illumination light source X1 is placed on the left side of the fingerprint sensing area along the X direction so that the first illumination probe beam from the first extra illumination light source X1 is from the left to the right in FIG. 5D. This illumination by the first extra illumination light source X1 causes a shadowing pattern in the first fingerprint image at the under-OLED optical sensor array due to the interaction with the internal tissue structures under the finger skin and this shadowing pattern is shifted spatially towards the right in the X direction. The illumination by the second extra illumination light source X2 on the right side causes a shadowing pattern in the second fingerprint image at the under-OLED optical sensor array due to the interaction with the internal tissue structures under the finger skin and this shadowing pattern is shifted spatially towards the left in the X direction. In implementation of this technique, additional extra illumination light sources may be added, e.g., in the Y direction or in other directions.

In this example, the first illumination probe beam in the first illumination direction from the first extra illumination light source X1 leads to generation of the first scattered probe light by scattering of tissues inside the finger that propagates the internal tissues associated with ridges and valleys of the finger to carry both (1) a first 2-dimensional transmissive pattern representing a fingerprint pattern formed by bridges and valleys of the finger, and (2) a first fingerprint topographical pattern that is associated with the illumination of internal tissues of ridges and valleys of the finger in the first illumination direction and is embedded within the first 2-dimensional transmissive pattern. Similarly, the second illumination probe beam in the second illumination direction from the second extra illumination light source X2 leads to generation of the first scattered probe light by scattering of tissues inside the finger that propagates the internal tissues associated with ridges and valleys of the finger to carry both (1) a second 2-dimensional transmissive pattern representing the fingerprint pattern formed by bridges and valleys of the finger, and (2) a second fingerprint topographical pattern that is associated with the illumination of internal tissues of ridges and valleys of the finger in the second illumination direction and is embedded within the second 2-dimensional transmissive pattern. The two extra illumination light sources X1 and X2 are turned on sequentially at different times so that the optical sensor array can be operated to detect transmitted part of the first scattered probe light that passes through the top transparent layer and the display panel to reach the optical sensor array so as to capture both the first 2-dimensional transmissive pattern, and the first fingerprint topographical pattern and then the second 2-dimensional transmissive pattern and the second fingerprint topographical pattern. The shadowing patterns shown in FIG. 5D are embedded in the captured 2-D fingerprint patterns and are one form of the fingerprint topographical pattern that is associated with the illumination of internal tissues of ridges and valleys of the finger at a particular direction.

In various implementations, two or more extra illumination light sources can be located outside the optical sensor module at different locations to produce different illumination probe beams to illuminate the designated fingerprint sensing area on the top transparent layer in different illumination directions. Since this technique is based on the ability for the probe light to transmit through the finger tissues, each extra illumination light source should be structured to produce probe light in an optical spectral range with respect to which tissues of a human finger exhibit optical transmission to allow probe light to enter a user finger to produce scattered probe light by scattering of tissues inside the finger that propagates towards and passes the top transparent layer to carry both (1) fingerprint pattern information and (2) different fingerprint topographical information associated with the different illumination directions, respectively, caused by transmission through internal tissues of ridges and valleys of the finger. A probe illumination control circuit can be coupled to control the extra illumination light sources to sequentially turn on and off in generating the different illumination probe beams at different times, one beam at a time, so that the optical sensor module located below the display panel is operable to sequentially detect the scattered probe light from the different illumination probe beams to capture both (1) the fingerprint pattern information and (2) the different fingerprint topographical information associated with the different illumination directions, respectively.

In addition to using light sources that are independent of the OLED pixels as the extra illumination light sources located outside the optical sensor module at different locations to produce the different illumination probe beams in different illumination directions, such two or more extra illumination light sources use two or more different OLED pixels at selected different locations with respect to the optical sensor module and outside OLED display area on top of the optical sensor module to produce the different illumination probe beams to illuminate the designated fingerprint sensing area on the top transparent layer in different illumination directions. This can be done by turning on such OLED pixels at different times while turning off all other OLED pixels to obtain the directional illumination at two or more different directions to measure the spatially shifted shadowing patterns caused by the internal tissue structures of the finger.

One notable feature of the disclosed technique in FIG. 5D is the simplicity of the illumination arrangement, the optical detection and the signal processing which can lead to compact optical sensor packaging for mobile and other applications that desire compact sensing device packaging, and real-time processing since the detection and the subsequent processing are simple operations that can be achieved at high speed without complex signal processing. Various optical imaging techniques for capturing 3-D images require complex optical imaging systems and complex and time-consuming signal processing, such as optical coherence tomography (OCT) imaging based on complex OCT data processing such as fast Fourier transform (FFT) and others that are not suitable for 3-D optical fingerprint sensing in smartphones and other mobile devices.

In the examples above, the illumination light for obtaining an optical transmissive pattern of a finger can be from the OLED pixels of the OLED display or extra illumination light sources that are separate from the OLED display. In addition, a portion of the environmental or background light that is within the optical transmission spectral band of a finger (e.g., optical wavelengths between 650 nm and 950 nm) and penetrates through a finger may also be directed into the under-OLED optical sensor array to measure an optical transmissive pattern associated with a fingerprint pattern of the finger. Depending on the intensity of the environmental or background light (e.g., the natural daylight or sunlight), optical attenuation may be provided in the optical path to the optical sensor module to avoid detection saturation at the optical sensor array. In using a portion of the environmental or background light for obtaining the optical transmissive pattern of a finger in optical sensing, proper spatial filtering can be implemented to block the environmental light that does transmits through the finger from entering the optical sensor module since such environmental light does not carry internal fingerprint pattern and can adversely flood the optical detectors in the optical sensor module.

Therefore, the disclosed optical fingerprint sensing can use transmitted light through a finger to capture an optical transmissive pattern of the finger with information on the internal fingerprint pattern associated with the external ridges and valleys of a finger under the finger skin. The transmission of the light is through the finger tissues and the stratum corneum of the finger skin and thus is imprinted with the fingerprint information by the internal structural variations inside the finger skin caused by the fingerprint ridge area and valley area and such internal structural variations manifest light signals with different brightness patterns in different illumination directions caused by the finger tissue absorption, refraction, and reflection, by finger skin structure shading, and/or by optical reflectance difference at the finger skin. This optical transmissive pattern is substantially immune from the contact conditions between the finger and the top touch surface of the device (e.g., dirty contact surface) and the conditions of the external finger skin condition (e.g., dirty, dry or wet fingers, or reduced external variations between ridges and valleys in fingers of certain users such as aged users), In various implementations of the under-screen optical sensor module technology for fingerprint sensing disclosed herein, the optical imaging of the illuminated touched portion of a finger to the optical sensor array in the under-screen optical sensor module can be achieved without using an imaging module such as a lens by imaging the returned light from the touched portion of the finger under optical illumination. One technical challenge for optical fingerprint sensing without an imaging module is how to control the spreading of the returned light that may spatially scramble returned light from different locations on the touched portion of the finger at the optical sensor array so that the spatial information of different locations may be lost when such returned light reaches the optical sensor array. This challenge can be addressed by using optical collimators or an array of pinholes to replace the optical imaging module in the under-screen optical sensor module for detecting a fingerprint by optical sensing. A device for implementing such optical fingerprint sending can include a device screen that provides touch sensing operations and includes a display panel structure having light emitting display pixels, each pixel operable to emit light for forming a portion of a display image; a top transparent layer formed over the device screen as an interface for being touched by a user for the touch sensing operations and for transmitting the light from the display structure to display images to a user; and an optical sensor module located below the display panel structure to receive light that is emitted by at least a portion of the light emitting display pixels of the display structure and is returned from the top transparent layer to detect a fingerprint, the optical sensor module including an optical sensor array that receives the returned light and an array of optical collimators or pinholes located in a path of the returned light to the optical sensor array. The array of optical collimators are used to collect the returned light from the display panel structure and to separate light from different locations in the top transparent layer while directing the collected returned light to the optical sensor array.

The imaging by using collimators relies on using different collimators at different locations to spatially separate light from different regions of a fingerprint to different optical detectors in the optical detector array. The thickness or length of each collimator along the collimator can be designed to control the narrow field of optical view of each collimator, e.g., the light from only a small area on the illuminated finger is captured by each collimator and is projected onto a few adjacent optical detectors in the optical detector array. As an example, the thickness or length of each collimator along the collimator can be designed to be large, e.g., a few hundred microns, so that the field of optical view of each collimator may allow the collimator to deliver imaging light to a small area on the optical detector array, e.g., one optical detector or a few adjacent optical detectors in the optical detector array (e.g., an area of tens of microns on each side on the optical detector array in some cases).

The following sections explain how an array of optical collimators or pinholes can be used for under-screen optical fingerprint sensing by the examples for using optical collimators in optical fingerprint sensing in hybrid sensing pixels each having a capacitive sensor for capturing fingerprint information and an optical sensor for capturing fingerprint information.

Figure 6A:
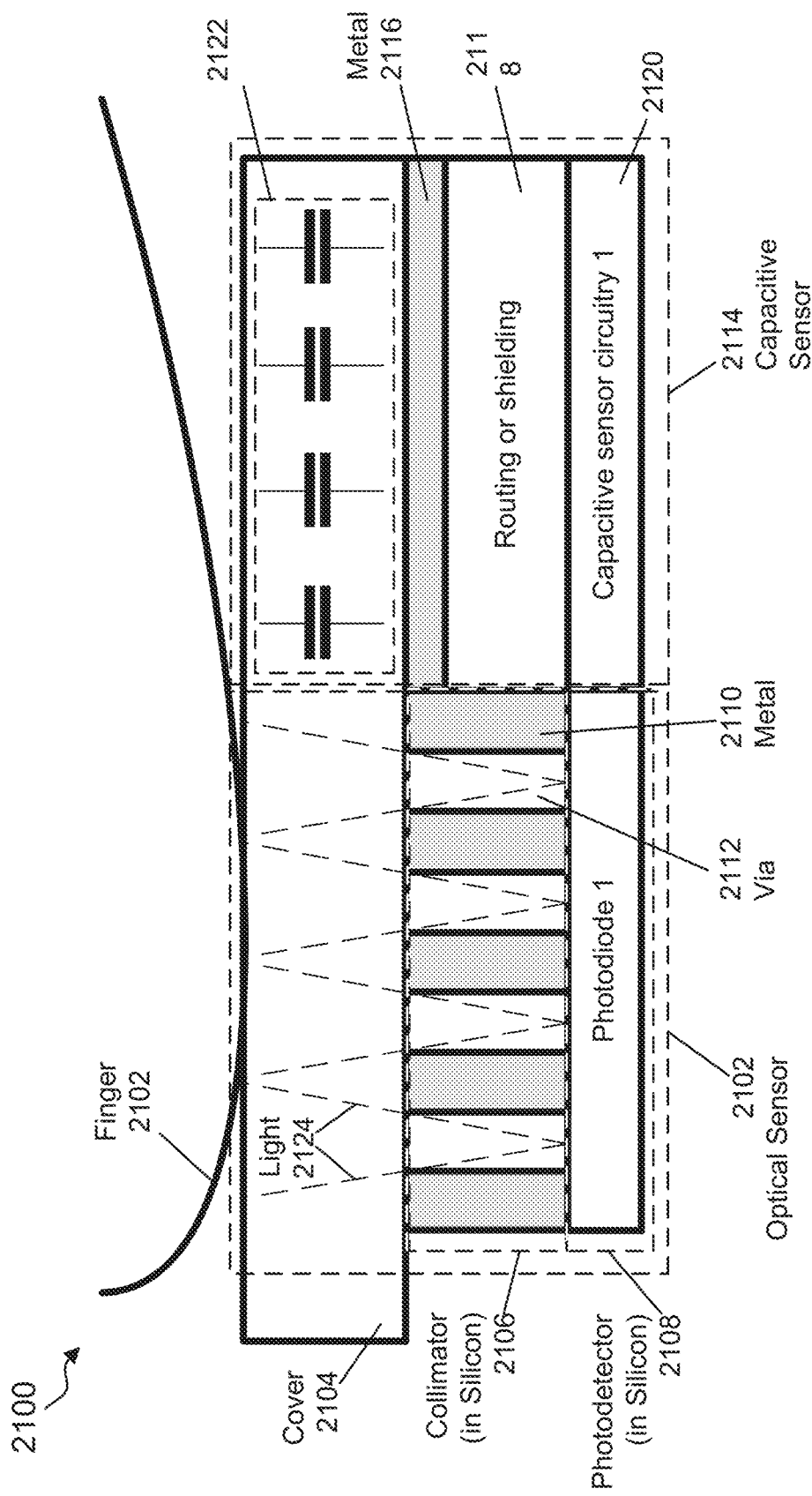
FIGS. 6A and 6B illustrate two examples of hybrid sensing pixel designs that combine capacitive sensing and optical sensing within the same sensing pixel according to some embodiments.
Figure 6B:
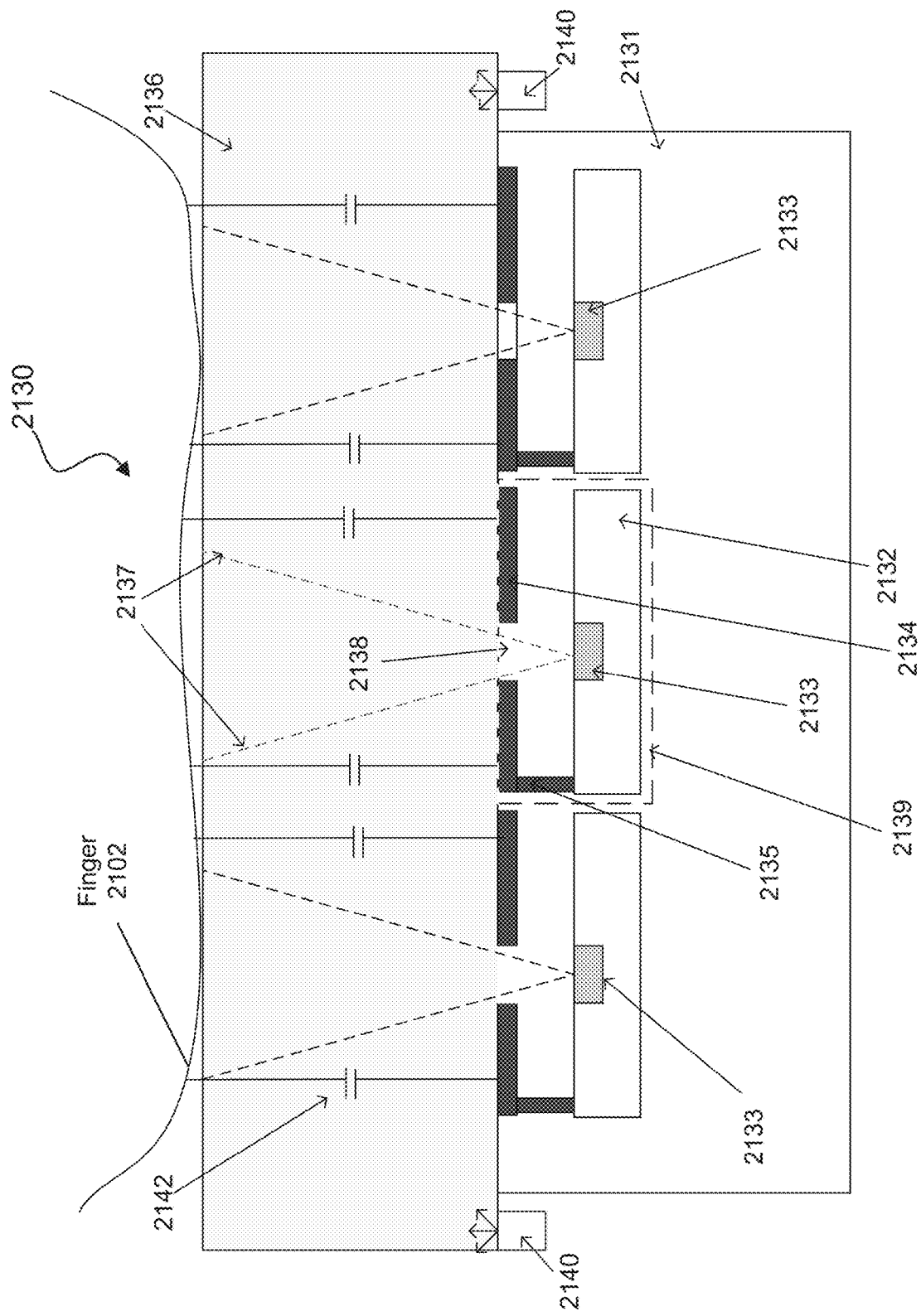

FIGS. 6A and 6B show two examples of hybrid sensing pixel designs that combine capacitive sensing and optical sensing within the same sensing pixel according to some embodiments.

FIG. 6A shows an example of a fingerprint sensor device 2100 that incorporates a capacitive sensor in addition to an optical sensor for each sensor pixel of an array of sensor pixels in capturing fingerprint information. By combining both capacitive sensors and optical sensors, fingerprint images obtained with the optical sensors can be used to better resolve the 3D fingerprint structure obtained with the capacitive sensors. For illustrative purposes, the structure shown in FIG. 6A represents one sensor pixel in an array of sensor pixels and each sensor pixel includes an optical sensor 2102 and a capacitive sensor 2114 that are disposed next to each other within the same pixel.

The optical sensor 2102 includes a photodetector 2108 and a collimator 2106 disposed over the photodetector 2108 to narrow or focus reflected light 2124 from finger 2102 toward the photodetector 2108. One or more light sources, such as LEDs (not shown) can be disposed around the collimator 2106 to emit light, which is reflected off the finger as reflected light 2124 and is directed or focused toward the corresponding photodetector 2108 to capture a part of the fingerprint image of the finger 2102. The collimator 2106 can be implemented using an optical fiber bundle or one or more metal layer(s) with holes or openings. This use of multiple optical collimators above the optical detector array may be used as a lensless optical design for capturing the fingerprint image with a desired spatial resolution for reliable optical fingerprints sensing. FIG. 6A shows the collimator 2106 implemented using one or more metal layers 2110 with holes or openings 2112. The collimator 2106 in the layer between the top structure or layer 2104 and the photodetectors 2108 in FIG. 6A includes multiple individual optical collimators formed by optical fibers or by holes or openings in one or more layers (e.g., silicon or metal) and each of such individual optical collimators receives light ray 2124 in a direction along the longitudinal direction of each optical collimator or within a small angle range that can be captured by the top opening of each opening or hole and by the tubular structure as shown so that light rays incident in large angles from the longitudinal direction of each optical collimator are rejected by each collimator from reaching the optical photodiode on the other end of the optical collimator.

In the capacitive sensing part of each sensing pixel, the capacitive sensor 2114 includes a capacitive sensor plate 2116 that is electromagnetically coupled to a portion of a finger that is either nearby or in contact with the sensing pixel to perform the capacitive sensing. More specifically, the capacitive sensor plate 2116 and the finger 2102 interact as two plates of one or more capacitive elements 2122 when the finger 2102 is in contact with or substantially near the optional cover 2104 or a cover on a mobile device that implements the fingerprint sensor device 2100. The number of capacitive sensor plates 2116 can vary based on the design of the capacitive sensor 2114. The capacitive sensor plate 2116 can be implemented using one or more metal layers. The capacitive sensor plate 2116 is communicatively coupled to capacitive sensor circuitry 2120 so that the capacitive sensor circuitry 2120 can process the signals from the capacitive sensor plate 2116 to obtain data representing the 3D fingerprint structure. A routing or shielding material can be disposed between the capacitive sensor plate 2116 and the capacitive sensor circuitry to electrically shield the metal plate 2116. The capacitive sensor circuitry 2120 can be communicatively coupled to both the capacitive sensor plate 2116 and the photodetector 2108 to process both the signal from the capacitive sensor plate 2116 and the signal from the photodetector 2108. In FIG. 6A, the capacitive sensor and the optical sensor within each hybrid sensing pixel are adjacent to and displaced from each other without being spatially overlapped.

In implementations, the optical sensing features in the hybrid sensor design in FIG. 6A such as the optical collimator design can be used in a under-screen optical sensor module. Therefore, the optical sensing with the optical collimator feature in FIG. 6A may be implemented in a mobile device or an electronic device is capable of detecting a fingerprint by optical sensing to include a display screen structure; a top transparent layer formed over the display screen structure as an interface for being touched by a user and for transmitting the light from the display screen structure to display images to a user; and an optical sensor module located below the display screen structure to receive light that is returned from the top transparent layer to detect a fingerprint. The optical sensor module includes an optical sensor array of photodetectors that receive the returned light and an array of optical collimators to collect the returned light from the top transparent layer via the display screen structure and to separate light from different locations in the top transparent layer while directing the collected returned light through the optical collimators to the photodetectors of the optical sensor array.

FIG. 6B illustrates another example of a fingerprint sensor device 2130 that structurally integrates an optical sensor and a capacitive sensor in each hybrid sensor pixel in a spatially overlap configuration in an array of sensor pixels to reduce the footprint of each hybrid sensing pixel. The fingerprint sensor device 2130 includes a semiconductor substrate 2131, such as silicon. Over the substrate 2131, multiple sensing elements or sensing pixels 2139 are disposed. Each sensing element or sensing pixel 2139 includes active electronics circuitry area 2132 including CMOS switches, amplifier, resistors and capacitors for processing sensor signals. Each sensing pixel or sensing element 2139 includes a photodetector 2133 disposed or embedded in the active electronics circuitry area 2132. A capacitive sensor plate or a top electrode 2134 of the capacitive sensor for capacitive sensing is disposed over a photodetector 2133 and includes a hole or opening 2138 on the sensor plate 2134 to function also as a collimator of light for directing light onto the photodetector 2133. A via 2135 filled with conductive material is disposed to electrically connect the top electrode 2134 to the active circuit elements 2132. By adjusting the opening or the hole and the distance of the top electrode 2134 with the photodetector 2133, the light collecting angle 2137 of the photodetector (e.g., photodiode) 2133 can be adjusted. The fingerprint sensor device 2130 is covered by a protective cover 2136, which includes hard materials, such as sapphire, glass etc. Photodetector 2133 light collection angle 2137 can be designed to preserve the spatial resolution of the image collected by the photodiode arrays. A light source 2140, such as an LED, is placed under the cover, on the side of fingerprint sensor device 2130 to emit light, which is reflected off the finger and directed toward the photodetector 2133 to capture the fingerprint image. When a finger touches or comes substantially near the protective cover, the finger and the sensing top electrode 2134 in combination form a capacitive coupling (e.g., capacitor 2142) between the human body and sensing top electrode 2134. The fingerprint sensor device 2130 that includes both optical and capacitive sensors can acquire images of both a light reflection image of fingerprint and also a capacitive coupling image. The sensing top electrode 2134 serves dual purpose: 1) for capacitive sensing, and 2) as a collimator (by fabricating one or more holes on the sensing top electrode 2134) to direct, narrow or focus reflected light from the finger toward the photodetector 2133. Reusing the sensing top electrode 2134 eliminates the need for additional metal layer or optical fiber bundle, and thus reduces each pixel size and accordingly the overall size of the fingerprint sensor device 2130.

In FIG. 6B, the optical sensing design uses the holes or openings 2138 formed between the top layer 2136 and the bottom array of photodetectors 2133 as an optical collimators to select only light rays within certain angles 2137 to preserve the spatial resolution of the image collected by the photodetectors 2133 in the photodetector array as illustrated. Similar to the fiber or other tubular shaped optical collimators in FIG. 6A, the holes or openings 2138 formed between the top layer 2136 and the bottom array of photodetectors 2133 constitute optical collimators to collect the returned light from the top transparent layer via the display screen structure and to separate light from different locations in the top transparent layer while directing the collected returned light through the optical collimators to the photodetectors 2133.

Figure 7:
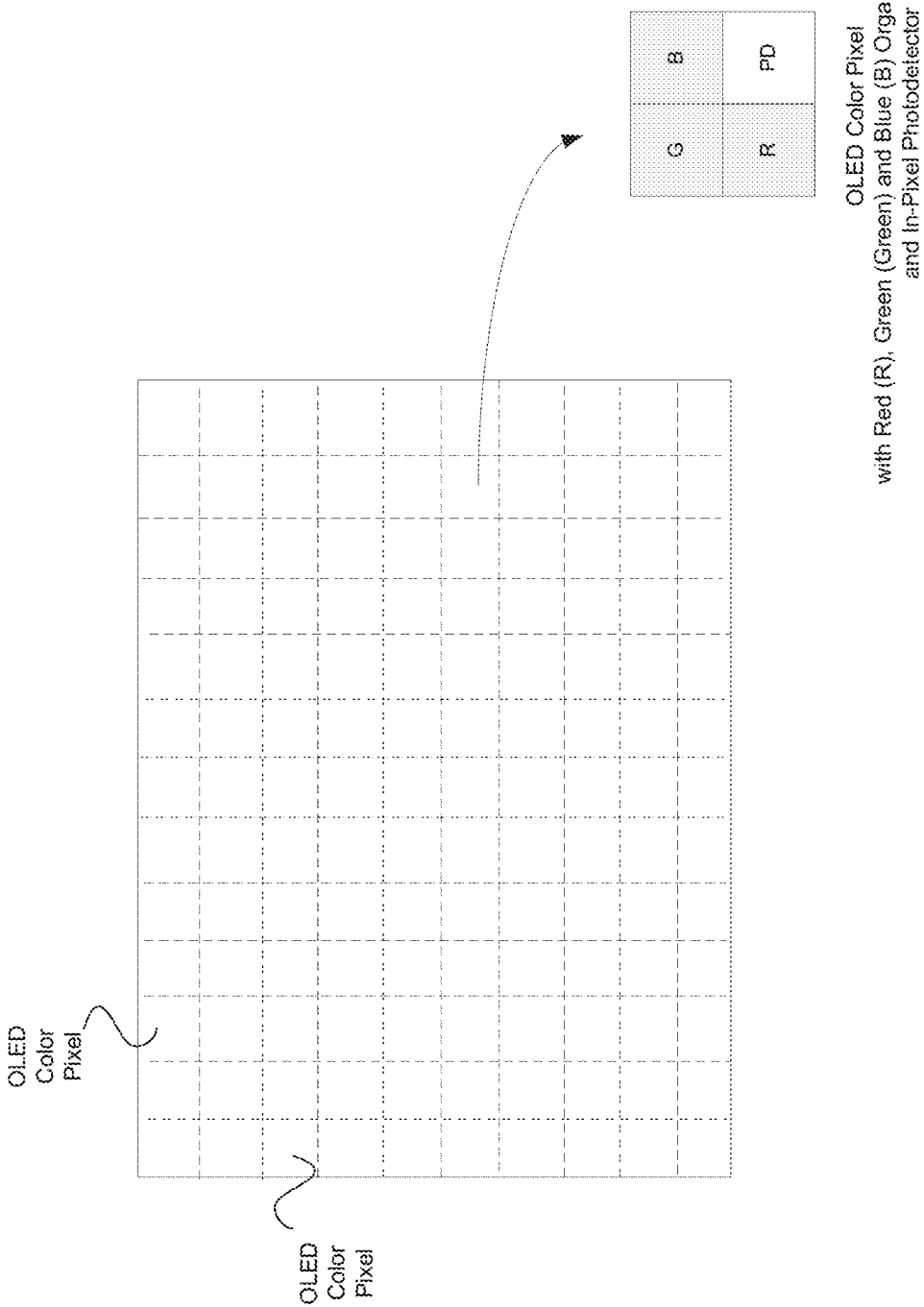
FIG. 7 shows an example of an OLED display panel integrated with spatially distributed optical sensors throughout the OLED display panel according to some embodiments.

FIG. 7 shows an example of an OLED display panel integrated with spatially distributed optical sensors throughout the OLED display panel in which the optical sensors are spatially interleaved with OLED pixels so that each OLED color pixel with different colored OLED pixels (e.g., OLED pixels emitting red, green and blue light) includes one optical sensor so that all OLED color pixels are embedded with their own optical sensors to allow full display panel size optical sensing, as initially explained in the examples in FIGS. 2E, 2F and 2G. Hence, each OLED color pixel includes an in-pixel photodetector (PD) when viewed from a direction perpendicular to the OLED display panel. The optical imaging spatial resolution of this optical sensing design is the same as the spatial display resolution defined by the individual OLED color pixel having different OLED pixels emitting different colors.

Figure 8A:
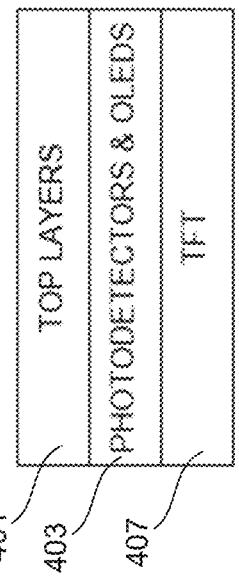
FIG. 8A-8C illustrate an example that implements the OLED-PD structure shown in FIG. 2E according to some embodiments.
Figure 8B:
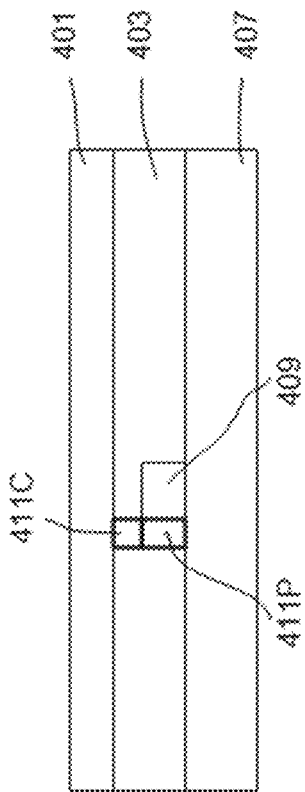
Figure 8C:
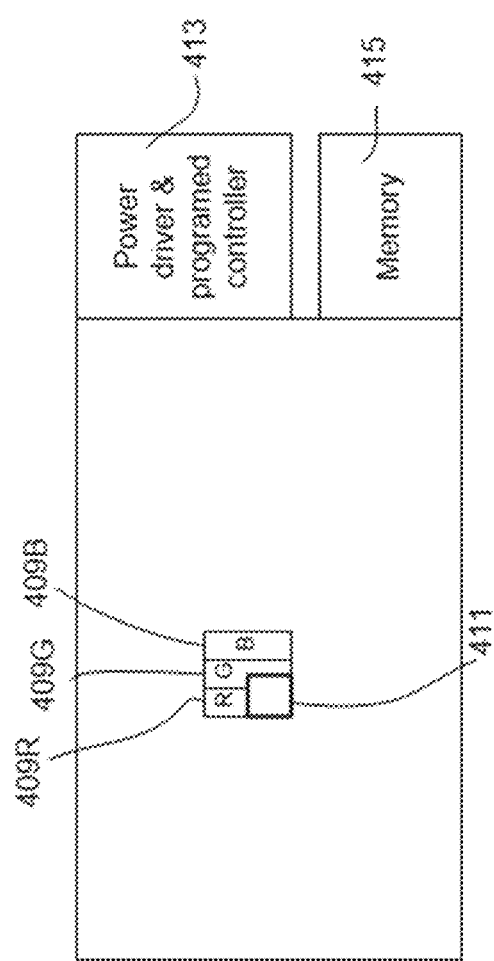

FIG. 8A-8C show an example that implements the OLED-PD structure shown in FIG. 2E. FIG. 8A shows that OLED display top layers 401 (e.g., sealing layers), a OLED pixel layer 403 with distributed photodetectors (PDs) and an TFT circuitry layer 407 are grown or fabricated over the same substrate. FIG. 8B shows a more detailed view of the OLED pixel structure 409 with different OLED pixels (e.g., 409R, 409B and 409G) emitting different colors and PD structure 411 for one OLED color pixel. Notably, the illustrated example includes an optical collimation structure 411C located above a PD 411P with each OLED color pixel to limit the angular range of incident light that can be collected by the PD 411P so that incident light at large incident angles are rejected by the optical collimation structure 411C from being received by the underlying PD 411P, thus enhancing the spatial resolution of each PD 411P and the imaging resolution of the image captured by the array of the optical sensors. The optical collimation structure 411C may include an optical collimation lens, a spatial aperture, a pinhole, a tubular collimator, or other structures, including a lens-pinhole combination assembly disclosed in this document.

FIG. 8C shows a top view of an example OLED color pixel with different OLED pixels (e.g., 409R, 409B and 409G) emitting different colors and PD structure 411 as shown in FIG. 52B. The OLEDs and the photodetectors 411 are connected to a power driver and programmed controller module 413. A memory module 415 is coupled to receive the detected signals from the photodetectors 411 embedded in corresponding OLED color pixels.

FIGS. 9A-9C show an example that implements the OLED-PD structure shown in FIG. 2F in which photodetectors 417 of the optical sensor array are formed outside the OLED pixel layer 403 of the OLED display panel but are directly formed in a thin film transistor (TFT) layer 407 on the same substrate for forming the OLED display pixel layer 403 as a display size photodetector array to use the entire OLED display panel surface as an optical sensing surface. FIG. 9A shows the layer structure and FIG. 9B shows the pixel construction and the PD construction. Similar to the design in FIGS. 8A-8C, an optical collimation structure 417C is provided and located above a PD 417P within the TFT layer 407 to limit the angular range of incident light that can be collected by the PD 417P so that incident light at large incident angles are rejected by the optical collimation structure 417C from being received by the underlying PD 417P. FIG. 9C shows a top view of an example OLED color pixel with different OLED pixels (e.g., 409R, 409B and 409G) emitting different colors and PD structure 417 as shown in FIG. 53B. The OLEDs and the photodetectors 417 are connected to a power driver and programmed controller module 413. A memory module 415 is coupled to receive the detected signals from the photodetectors 417 that spatially overlap with corresponding OLED color pixels.

FIGS. 10A-10C show an example that implements the OLED-PD structure in which photodetectors 419 of the optical sensor array are formed in a separate layer 421 outside the OLED pixel layer 403 and the TFT layer 407. The separate layer 421 can be formed on a separate substrate different from a substrate for fabricating the layers 407 and 403 in some implementations. FIG. 10A shows the layer structure and FIG. 10B shows the pixel construction and the PD construction. An optical collimation structure 419C is provided and located above a PD 419P to limit the angular range of incident light that can be collected by the PD 419P so that incident light at large incident angles are rejected by the optical collimation structure 419C from being received by the underlying PD 419P. FIG. 10C shows a top view of an example OLED color pixel with different OLED pixels (e.g., 409R, 409B and 409G) emitting different colors and PD structure 419 as shown in FIG. 10B.

Display Assembly with Peripheral Light Sources

Figure 11A:
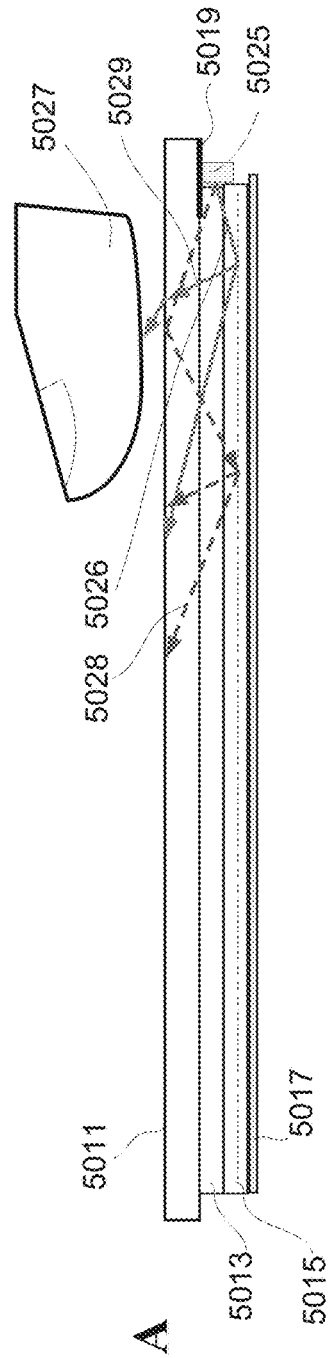
FIG. 11A shows a schematic cross-sectional view of a display screen of an electronic device including an OLED-PD structure and peripheral light sources according to some embodiments.

FIG. 11A shows a schematic cross-sectional view of a display screen of an electronic device including an OLED-PD structure 5015 and peripheral light sources 5025 according to some embodiments. FIG. 11C shows a schematic plan view of the electronic device illustrated in FIG. 11A according to some embodiments.

The electronic device may be a smart phone, a tablet computer, a laptop computer, and the like. The display screen may include a cover glass 5011, and a touch sensing layer 5013 disposed under the cover glass 5011. There may be a dark coating 5019 applied to the backside of the cover glass 5011 at the border of the display screen. The touch sensing layer 5013 has edge sides (referred herein as "edges") at the periphery of display screen. For example, the touch sensing layer 5013 has two short edges 5014a and two long edges 5014b along a rectangular border of the display screen. The display screen further includes an OLED-PD structure 5015 disposed under the touch sensing layer 5013. The display screen may also include other material layers 5017 disposed under the OLED-PD structure 5015. For example, the other material layers 5017 may include a protection layer.

Figure 11B:
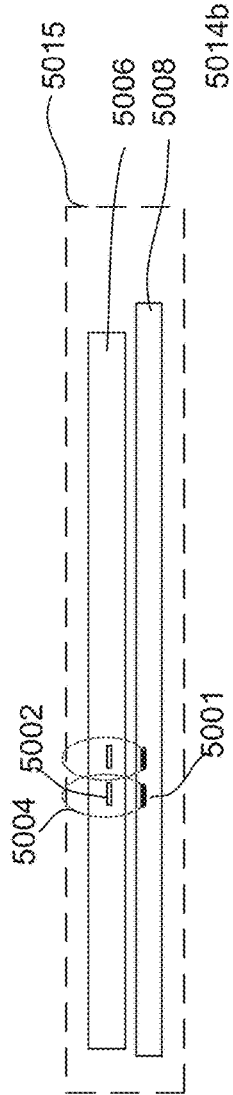
FIG. 11B shows a schematic cross-sectional view of an illumination layer inside the OLED-PD structure shown in FIG. 11A according to some embodiments.
Figure 11C:
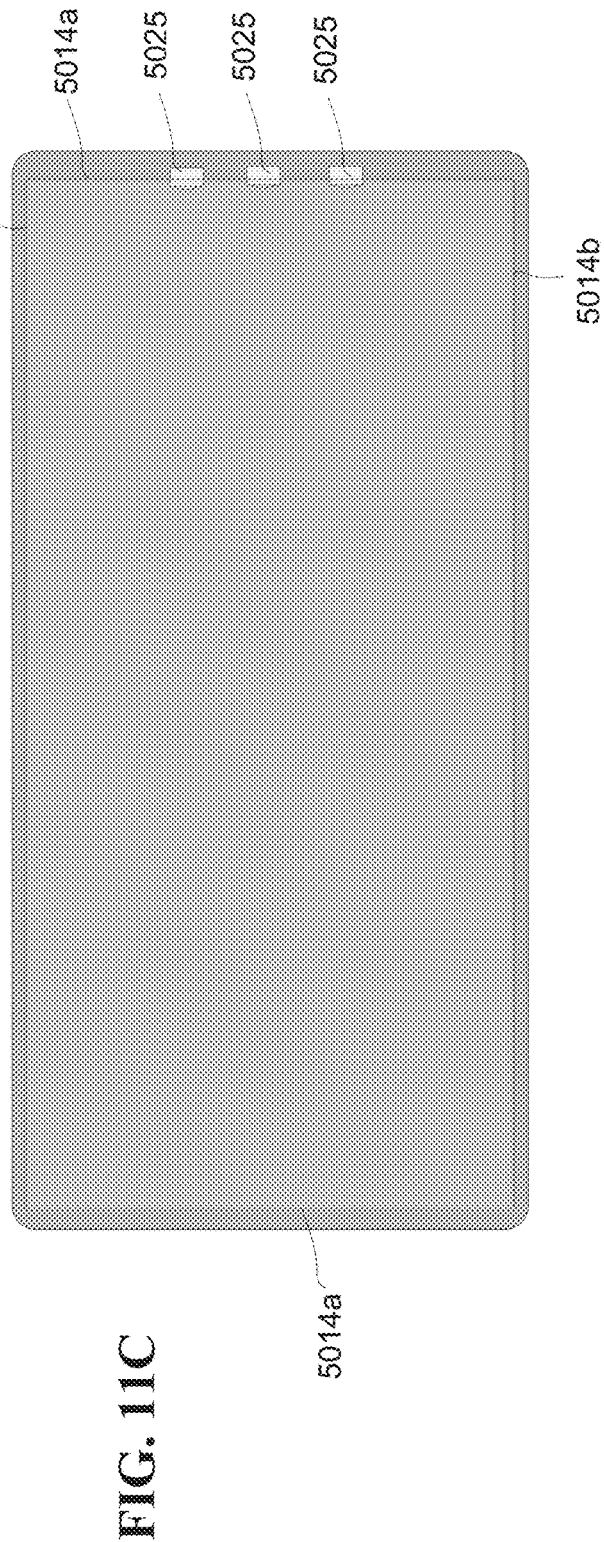
FIG. 11C shows a schematic plan view of the electronic device shown in FIG. 11A according to some embodiments.

FIG. 11B shows a schematic cross-sectional view of the OLED-PD structure 5015 according to some embodiments. The OLED-PD structure 5015 includes an OLED layer 5006 and a photodetector layer 5008 disposed under the OLED layer 5006. The OLED layer 5006 includes OLED groups 5002 arranged as an array (only two OLED groups 5002 are shown in FIG. 11B to simplify the illustration). The photodetector layer 5008 includes photodetectors 5001 arranged as an array (only two photodetectors 5001 are shown in FIG. 11B to simplify the illustration). Each photodetector 5001 is disposed directly under a respective OLED group 5002. The array of photodetectors 5001 in the photodetector layer 5008 may capture a fingerprint (or a palmprint) image of a finger 5027 (or a palm) placed on or adjacent the cover glass 5011.

It may be desirable to have an illumination light source to illuminate the finger 5027 (or a palm), so that high quality fingerprints or palmprints may be captured. OLED display screens may present particular challenges to light source configurations for providing illumination for optical fingerprint sensing. For example, if light beams emitted by illumination light sources shine on the OLEDs 5002 from the bottom side of OLED layer 5006, the OLEDs 5002 may be damaged.

To prevent damages to the OLEDs 5002 in the OLED layer 5006, one or more light sources 5025 are provided at an edge of the touch sensing layer 5013 above the OLED-PD structure 5015, as illustrated in FIGS. 11A and 11C, according to some embodiments. The light sources 5025 may be micro-sized light sources. They may be positioned at any edge of the touch sensing layer 5013. For example, they may be positioned at a short edge of the touch sensing layer 5013, as illustrated in FIG. 11C. They may also be positioned at a long edge of the touch sensing layer 5013, or at both a short edge and a long edge of the touch sensing layer 5013. The light sources 5025 may be positioned under the dark coating 5019 at the border of the display screen, so that they may not be visible.

Referring to FIG. 11A, light emitted by the light sources 5025 may be coupled into the touch sensing layer 5013 from the edge. Some light rays 5026 coupled into the touch sensing layer 5013 may be transmitted into the OLED-PD structure 5015 and be scattered and/or diffracted by the microstructures (e.g., the TFTs) in the OLED-PD structure 5015. The scattered light 5029 may be refracted through the top surface of the cover glass 5011 to illuminate the finger 5027 (or a palm). Some light rays (e.g., the light ray indicated by the dashed arrow) coupled into the touch sensing layer 5013 may be transmitted into the cover glass 5011, which may be subsequently reflected by the top surface of the cover glass 5011 (e.g., when the angle of incidence satisfies the condition for total internal reflection) toward the OLED-PD structure 5015. The reflected light rays may be scattered and/or diffracted by the microstructures in the OLED-PD structure 5015. The scattered light rays 5028 may be transmitted through the cover glass 5011 to illuminate the finger 5027.

In this configuration, light beams emitted by the light sources 5025 are not directly incident on the OLEDs in the OLED layer 5006 from below; instead, they are incident on the OLED layer 5006 from the top, and only after being refracted and/or reflected by the touch sensing layer 5013 and the cover glass 5011. Thus, probabilities of damaging the OLEDs in the OLED layer 5006 may be eliminated or reduced. The collimated detection of a photodetector 5001 may have an angular sensitivity profile 5004 such that detection sensitivity may be the highest when light is incident on the photodetector 5001 directly from above.

According to various embodiments, the light sources 5025 may be light-emitting diodes (LEDs), laser diodes (LDs), vertical-cavity surface-emitting lasers (VCSELs), and the like. The light sources 5025 may be configured to emit light in an ultraviolet wavelength range, a visible wavelength range, a near infrared (NIR) wavelength range, and the like. In some embodiments, the dark coating 5019 may be made to be partially transparent for the wavelength range of the light sources 5025, so that light emitted by the light sources 5025 may be transmitted through the dark coating 5019 and be projected to the finger 5027 or palm.

Besides preventing potential damages to the OLED layer 5006, the peripheral arrangement of the illumination light sources 5025 may provide several other advantageous. For example, the optical fingerprint sensing may be operated with the OLEDs in the OLED layer 5006 are turned off. The OLEDs may be turned off when optical fingerprint sensing is triggered to perform security check. Thus, fingerprint (or palmprint) images may be captured while a finger 5027 (or a plam) is illuminated only by the light sources 5025. As illustrated in FIG. 11A, the light rays from the light sources 5025 may be incident on the finger 5027 at relatively large angles of incidence. As such, the captured fingerprint (or palmprint) images may exhibit shades in the valley positions of the skin on the finger 5027 or palm. Thus, the quality and reliability of fingerprint identification may be improved. This may be especially advantageous in cases in which the finger 5027 or palm being authenticated is dry.

In addition, when the display OLEDs are turned off, the microstructures of the display, such as the TFTs in the OLED-PD structure 5015 and the sensing circuits in the touch sensing layer 5013 may not be seen in the captured fingerprint (or palmprint) images. This may prevent or reduce artifacts in the fingerprints (or palmprints). Thus, more accurate and reliable authentication may be achieved.

Also, some people may not have clear corneum fingerprint or palmprint due to shallow finger ridge-valley features, but may have corium fingerprint or palmprint. According to some embodiments, the light sources 5025 may be configured to emit light in visible or NIR wavelengths, which may penetrate into the finger/palm tissues. Thus, images of corium fingerprint or palmprint may be obtained. As deeper tissues under the skin may be more difficult to imitate using fake materials, the optical fingerprint sensing may also have anti-spoofing capabilities.

Figure 12A:
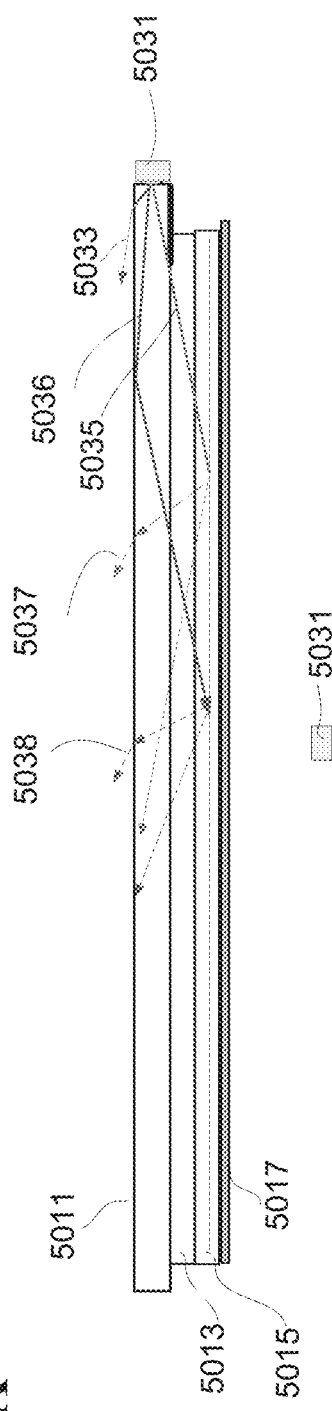
FIG. 12A shows a schematic cross-sectional view of a display screen of an electronic device including a OLED-PD structure and peripheral light sources according to some embodiments.
Figure 12B:
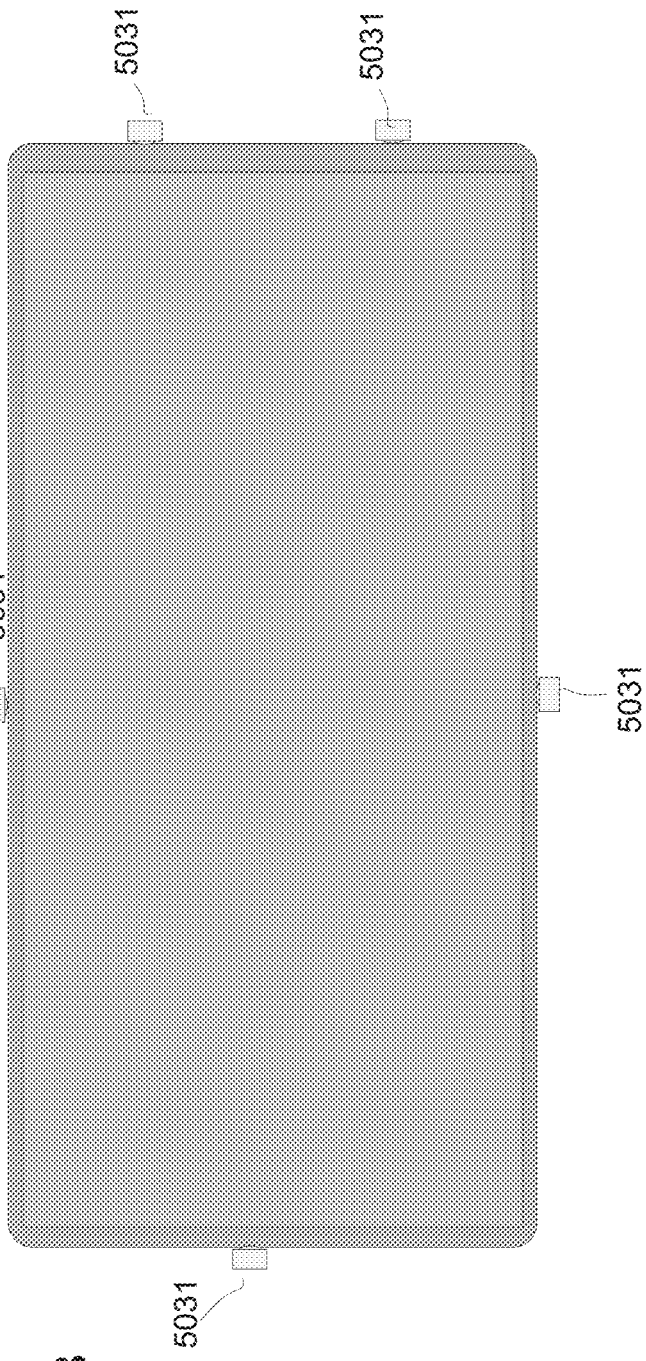
FIG. 12B shows a schematic plan view of the electronic device shown in FIG. 12A according to some embodiments.

FIG. 12A shows a schematic cross-sectional view of a display screen of an electronic device including a OLED-PD structure 5015 and peripheral light sources 5031 according to some embodiments. FIG. 12B shows a schematic plan view of the electronic device according to some embodiments. The display screen may include a cover glass 5011, a touch sensing layer 5013 disposed under the cover glass 5011, and a OLED-PD structure 5015 disposed under the touch sensor layer 5013, similar to the display screen illustrated in FIGS. 11A-11C. The electronic device includes one or more light sources 5031 positioned at an edge of the cover glass 5011. In some embodiments, the cover glass 5011 may include indentations at the edge of the cover glass 5011 for receiving the one or more light sources 5031.

As illustrated in FIG. 12A, light emitted by the one or more light sources 5031 may be coupled into the cover glass 5011 through the edge. Some light rays coupled into the cover glass 5011 may be refracted out of the top surface of the cover glass 5011, for example when the angle of incidence of the light rays does not satisfy the condition for total internal reflection. The refracted light rays 5033 may illuminate a finger or palm placed on or adjacent the cover glass 5011 (e.g., as the finger 5027 illustrated in FIG. 11A).

Some light rays coupled into the cover glass 5011 (e.g., the light ray 5035) may be refracted out of the bottom surface of the cover glass 5011, which may be transmitted through the touch sensor layer 5013 and subsequently be scattered or diffracted by the microstructures in the OLED-PD structure 5015. The scattered or diffracted light rays may be transmitted through the touch sensor layer 5013 and the cover glass 5011. The transmitted light rays 5037 may illuminate the finger or palm as well.

Some light rays coupled into the cover glass 5011 (e.g., the light ray 5036) may be reflected by the top surface of the cover glass 5011 (e.g., when the angle of incidence of the light ray 5036 satisfies the condition for total internal reflection). The reflected light rays may be directed toward the OLED-PD structure 5015, and may be scattered or diffracted by the microstructures in the OLED-PD structure 5015. The scattered or diffracted light rays may be transmitted through the touch sensor layer 5013 and the cover glass 5011. The transmitted rays 5038 may also illuminate the finger or palm.

Because the light rays 5033, 5037, and 5038 illuminating the finger (or palm) propagate in a direction that is nearly perpendicular to the optical axis of the photodetectors 5001 in the OLED-PD structure 5015 (which is perpendicular to the surface of the cover glass 5011), the background of the fingerprint (or palmprint) image may appear dark. When a finger (or palm) is touching the top surface of the cover glass 5011, the ridge area of the fingerprint (or palmprint) may result in bright image lines, while the valley area of the fingerprint (or palmprint) may result in dark image lines.

In this configuration, light beams emitted by the light sources 5031 are not directly incident on the OLEDs in the OLED-PD structure 5015 from the bottom; instead, they are incident on the OLED-PD structure 5015 from the top, and only after being refracted and/or reflected by the touch sensing layer 5013 and the cover glass 5011. Thus, probabilities of damaging the OLEDs in the OLED-PD structure 5015 may be eliminated or reduced.

Figure 13A:
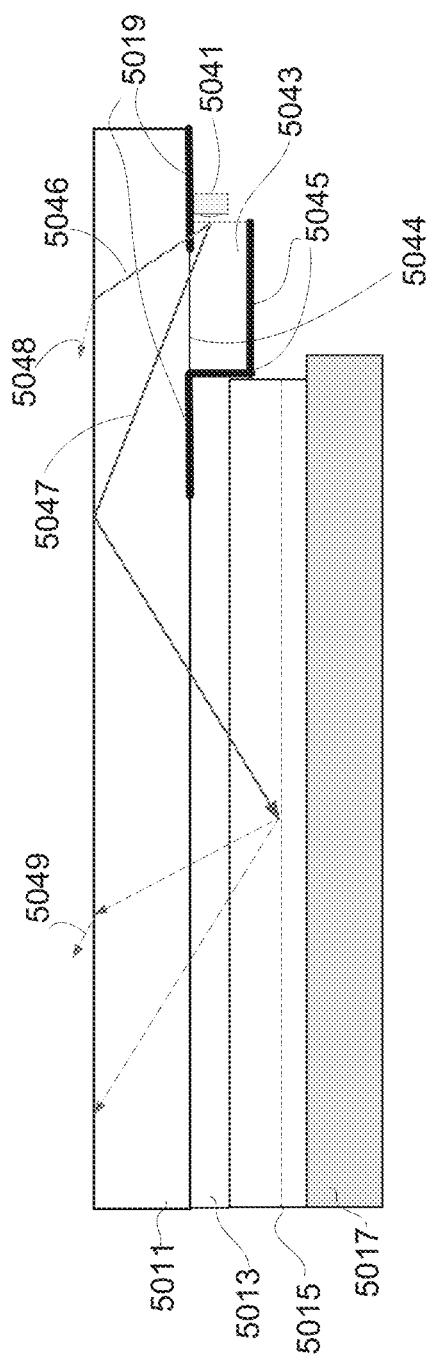
FIG. 13A shows a partial schematic cross-sectional view of a display screen of an electronic device according to some embodiments.
Figure 13B:
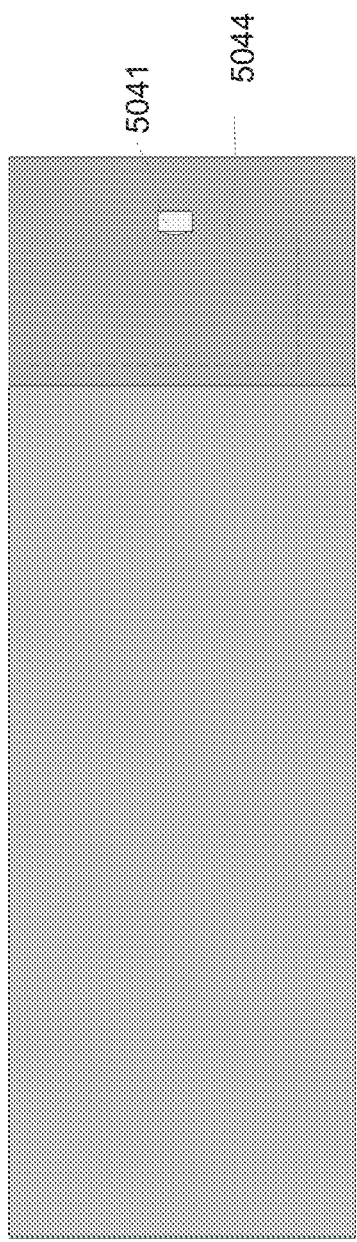
FIG. 13B shows a partial schematic plan view of the electronic device shown in FIG. 13A according to some embodiments.

FIG. 13A shows a partial schematic cross-sectional view of a display screen of an electronic device according to some embodiments. The electronic device includes an OLED-PD structure 5015, similar to the OLED-PD structure 5015 shown in FIGS. 11A-11B. FIG. 13B shows a partial schematic plan view of the electronic device according to some embodiments. The display screen may include a cover glass 5011, a touch sensing layer 5013 disposed under the cover glass 5011, and the OLED-PD structure 5015 disposed under the touch sensor layer 5013, similar to the display screen illustrated in FIGS. 11A-11C.

The electronic device includes one or more light sources 5041 (only one light source 5041 is shown in FIGS. 13A-13B) positioned under the cover glass 5011 at a border of the display screen. The display screen may include a dark coating 5019 applied to the bottom surface of the cover glass 5011 at the border. The one or more light sources 5041 may be positioned under the dark coating 5019, so that they may not be visible.

The electronic device also includes a light coupler 5043 positioned under the cover glass 5011 adjacent the one or more light sources 5041. The light coupler 5043 may be configured to couple light emitted by the one or more light sources 5041 into the cover glass 5011. In some embodiments, the light coupler 5043 may have an index of refraction that is nearly the same or similar to the index of refraction of the cover glass 5011. Thus, light rays emitted from the light source 5041 may not undergo refraction at the interface between the cover glass 5011 and the light coupler 5043.

In some embodiments, the dark coating 5019 includes one or more window areas 5044 adjacent the light sources 5041. The dark coating is removed in the window areas 5044, so as to let light emitted from the one or more light sources 5041 be transmitted therethrough. In some other embodiments, the dark coating 5019 may be partially transparent for the wavelength range of the one or more light sources 5041. In some embodiments, the electronic device includes another dark coating 5045 under the light coupler 5043 and on a side wall of the light coupler 5043. Thus, the border of the display screen may appear dark even in the window areas 5044.

As illustrated in FIG. 13A, light emitted by the one or more light sources 5041 may be coupled into the light coupler 5043, and be transmitted through the top surface of the light coupler 5043 into the cover glass 5011. Some light rays transmitted into the cover glass 5011 (e.g., the light rays 5046) may be refracted out of the top surface of the cover glass 5011 (e.g., when the angle of incidence of the light rays 5046 does not satisfy the condition for total internal reflection). The refracted light rays 5048 may illuminate a finger or palm placed on or adjacent the cover glass 5011 (e.g., as the finger 5027 illustrated in FIG. 11A). Some light rays transmitted into the cover glass 5011 (e.g., the light ray 5047) may be reflected by the top surface of the cover glass 5011 (e.g., when the angle of incidence of the light rays 5047 satisfies the condition for total internal reflection). The reflected light rays 5042 may be incident on and be scattered or diffracted by the microstructures in the OLED-PD structure 5015. The scattered or diffracted light rays 5049 may be transmitted through the touch sensor layer 5013 and the cover glass 5011. The transmitted light rays 5049 may illuminate the finger or palm as well.

Because the light rays 5048 and 5049 illuminating the finger (or palm) propagate in a direction that is nearly perpendicular to the optical axis of the photodetectors 5001, which is substantially perpendicular to the surface of the cover glass 5011, the background of the fingerprint (or palmprint) image may appear dark. When a finger (or palm) touches the top surface of the cover glass 5011, the ridge area of the fingerprint (or palmprint) may result in bright image lines, while the valley area of the fingerprint (or palmprint) may result in dark image lines.

In this configuration, light beams emitted by the light sources 5041 are not directly incident on the OLED-PD structure 5015 from the bottom; instead, they are incident on the OLED-PD structure 5015 from the top, and only after being refracted and/or reflected by the touch sensing layer 5013 and the cover glass 5011. Thus, probabilities of damaging the OLED-PD structure 5015 may be eliminated or reduced.

Figure 14A:
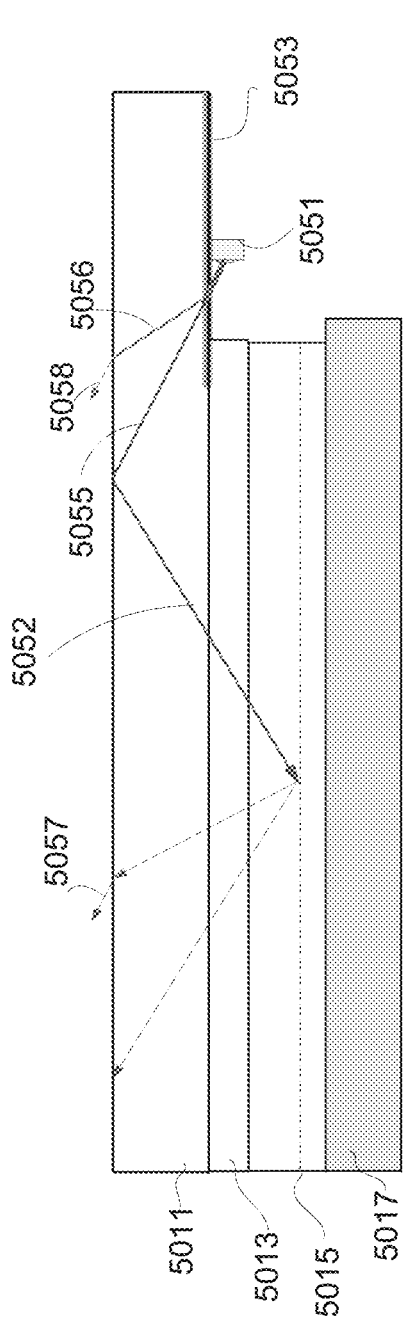
FIG. 14A shows a partial schematic cross-sectional view of a display screen of an electronic device according to some embodiments.
Figure 14B:
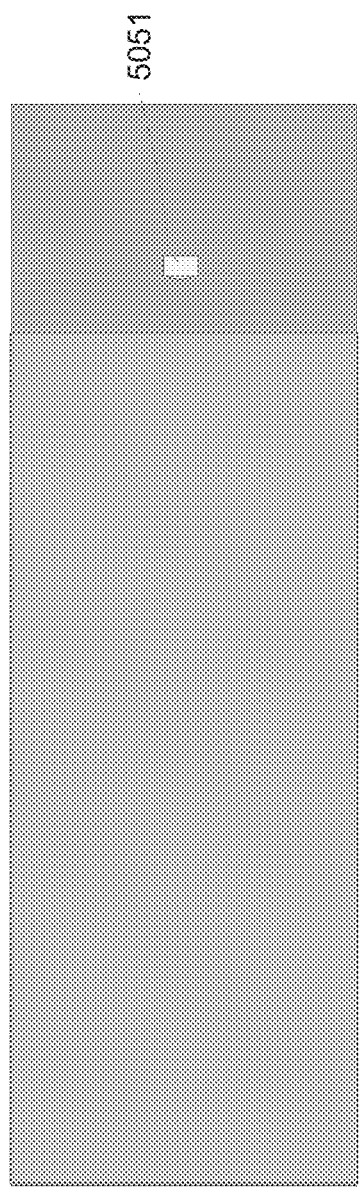
FIG. 14B shows a partial schematic plan view of the electronic device shown in FIG. 14A according to some embodiments.

FIG. 14A shows a partial schematic cross-sectional view of a display screen of an electronic device according to some embodiments. FIG. 14B shows a partial schematic plan view of the electronic device according to some embodiments. The display screen may include a cover glass 5011, a touch sensing layer 5013 disposed under the cover glass 5011, and a OLED-PD structure 5015 disposed under the touch sensor layer 5013, similar to the display screen illustrated in FIGS. 11A-11B.

The electronic device includes a partially transparent dark coating 5053 at the bottom surface of the cover glass 5011 at the border of the display screen. The partially transparent dark coating 5053 may be transparent or partially transparent to the wavelength range of the one or more light sources 5051, and block light in the visible wavelengths. The partially transparent dark coating 5053 may have a rough texture such that the partially transparent dark coating 5053 may scatter light incident thereon. The electronic device includes one or more light sources 5051 (only one light source 5051 is illustrated in FIGS. 14A-14B) positioned under the partially transparent dark coating 5053, so that they may be invisible.

As illustrated in FIG. 14A, light emitted by the one or more light sources 5051 may be coupled into the cover glass 5011 through the partially transparent dark coating 5053. Some light rays (e.g., the light rays 5056) may be refracted into the cover glass 5011, which may be subsequently refracted out of the top surface of the cover glass 5011 (e.g., when the angle of incidence of the light rays 5056 does not satisfy the condition for total internal reflection). The refracted light rays 5058 may illuminate a finger or palm placed adjacent the cover glass 5011 (e.g., as the finger 5027 illustrated in FIG. 11A). Some light rays (e.g., the light ray 5055) may be scattered into the cover glass 5011 by the partially transparent dark coating 5053, and may be subsequently reflected by the top surface of the cover glass 5011 (e.g., when the angle of incidence of the light rays 5055 satisfies the condition for total internal reflection). The reflected light rays 5052 may be incident on and be scattered or diffracted by the microstructures in the OLED-PD structure 5015. The scattered or diffracted light rays may be transmitted through the touch sensor layer 5013 and the cover glass 5011. The transmitted light rays 5057 may illuminate the finger or palm.

Because the light rays 5057 and 5058 illuminating the finger (or palm) propagate in a direction that is nearly perpendicular to the optical axis of the photodetectors 5001, which is substantially perpendicular to the surface of the cover glass 5011, the background of the fingerprint (or palmprint) image may appear dark. When a finger (or palm) is touching the top surface of the cover glass 5011, the ridge area of the fingerprint (or palmprint) may result in bright image lines, while the valley area of the fingerprint (or palmprint) may result in dark image lines.

In this configuration, light beams emitted by the light sources 5051 are not directly incident on the OLED-PD structure 5015 from the bottom; instead, they are incident on the OLED-PD structure 5015 from the top, and only after being refracted and/or reflected by the touch sensing layer 5013 and the cover glass 5011. Thus, probabilities of damaging the OLED-PD structure 5015 may be eliminated or reduced.

FIG. 15A shows a partial schematic cross-sectional view of a display screen of an electronic device according to some embodiments. The electronic device may be equipped with an optical ID sensing module (not shown), similar to the optical ID sensing module 5023 illustrated in FIGS. 11A-11C. FIG. 15B shows a partial schematic plan view of the electronic device according to some embodiments. The display screen may include a cover glass 5011, a touch sensing layer 5013 disposed under the cover glass 5011, and a OLED-PD structure 5015 disposed under the touch sensor layer 5013, similar to the display screen illustrated in FIGS. 11A-11C.

The electronic device includes a dark coating 5019 at the bottom surface of the cover glass 5011 at a border of the display screen. The electronic device includes one or more light sources 5061 (only one light source 5061 is shown in FIGS. 15A-15B) positioned under the dark coating 5019, so that they may be invisible. The touch sensor layer 5013 may be thick enough that the one or more light sources 5061 may be positioned against an edge of the touch sensor layer 5013.

As illustrated in FIG. 15A, light emitted by the one or more light sources 5061 may be coupled into the touch sensor layer 5013. Some light rays coupled into the touch sensor layer 5013 may be transmitted into the cover glass 5011. The transmitted light rays 5063 may be reflected by the top surface of the cover glass 5011, for example when the angle of incidence of the transmitted light rays 5063 satisfies the condition for total internal reflection. The reflected light rays 5068 may be directed toward the OLED-PD structure 5015, which may subsequently be scattered or diffracted by the microstructures in the OLED-PD structure 5015. The scattered or diffracted light rays 5067 may be transmitted through the touch sensor layer 5013 and the cover glass 5011. The transmitted rays 5065 may illuminate the finger or palm.

Some light rays coupled into the touch sensor layer 5013 may be transmitted through the dark coating 5019 into the cover glass 5011 (e.g., the dark coating 5019 may be transparent or partially transparent in the wavelength range of the one or more light sources 5061). The transmitted light rays 5064 may be refracted out of the top surface of the cover glass 5011, for example when the angle of incidence of the light rays 5064 does not satisfy the condition for total internal reflection. The transmitted light rays 5066 may illuminate a finger or palm placed adjacent the cover glass 5011 (e.g., as the finger 5027 illustrated in FIG. 32A).

Because the light rays 5065 and 5066 illuminating the finger (or palm) propagate in a direction that is nearly perpendicular to the optical axis of the photodetectors 5001, which is substantially perpendicular to the surface of the cover glass 5011, the background of the fingerprint (or palmprint) image may appear dark. When a finger (or palm) is touching the top surface of the cover glass 5011, the ridge area of the fingerprint (or palmprint) may result in bright image lines, while the valley area of the fingerprint (or palmprint) may result in dark image lines.

FIG. 16A shows a partial schematic cross-sectional view of a display screen of an electronic device according to some embodiments. FIG. 16B shows a partial schematic plan view of the electronic device according to some embodiments. The display screen may include a cover glass 5011, a touch sensing layer 5013 disposed under the cover glass 5011, and a OLED-PD structure 5015 disposed under the touch sensor layer 5013, similar to the display screen illustrated in FIGS. 11A-11C.

The electronic device includes a dark coating 5019 at the bottom surface of the cover glass 5011 at a border of the display screen. The dark coating 5019 does not extend to the very edge of the bottom surface of the cover glass 5011, or has a window adjacent the edge. The electronic device includes one or more light sources 5071 (only one light source 5071 is illustrated in FIGS. 16A-16B) positioned under the window of the dark coating 5019 adjacent the edge of the cover glass 5011. Light emitted by the one or more light sources 5071 may be transmitted through the window into the cover glass 5011.

As illustrated in FIG. 16A, the edge of the cover glass 5011 adjacent the one or more light sources 5071 has a slanted surface 5077. Light rays transmitted into the cover glass 5011 may be reflected by the slanted surface 5077. The reflected light rays (e.g., the light rays 5074 and 5075) may propagate forward toward the opposite edge of the cover glass 5011. In some embodiments, the slanted surface 5077 may form an angle θ with respect to the top surface 5072 of the cover glass 5011. The angle θ may range from about 100 degrees to about 175 degrees, according to some embodiments. The light rays transmitted into the cover glass 5011 may undergo total internal reflection at the slanted surface 5077. In some embodiments, a high reflection film may be applied to the slanted surface 5077.

Some reflected light rays (e.g., the light ray 5074) may be refracted out of the top surface of the cover glass 5011 (e.g., when the angle of incidence of the light ray 5074 does not satisfy the condition for total internal reflection). The refracted light ray 5076 may illuminate a finger placed adjacent the top surface of the cover glass 5011. Some reflected light rays (e.g., the light ray 5075) may be reflected by the top surface of the cover glass 5011 (e.g., when the angle of incidence of the light ray 5075 satisfies the condition for total internal reflection). The reflected light rays 5073 may be directed toward the OLED-PD structure 5015, which may be scattered or diffracted by the microstructures in the OLED-PD structure 5015. The scattered or diffracted light rays 5075 may be transmitted through the touch sensor layer 5013 and the cover glass 5011. The transmitted light rays 5078 may illuminate the finger or palm.

Because the light rays 5076 and 5078 illuminating the finger (or palm) propagate in a direction that is nearly perpendicular to the optical axis of the optical ID sensing module (not shown), which is substantially perpendicular to the surface of the cover glass 5011, the background of the fingerprint (or palmprint) image may appear dark. When a finger (or palm) is touching the top surface of the cover glass 5011, the ridge area of the fingerprint (or palmprint) may result in bright image lines, while the valley area of the fingerprint (or palmprint) may result in dark image lines.

Figure 17:
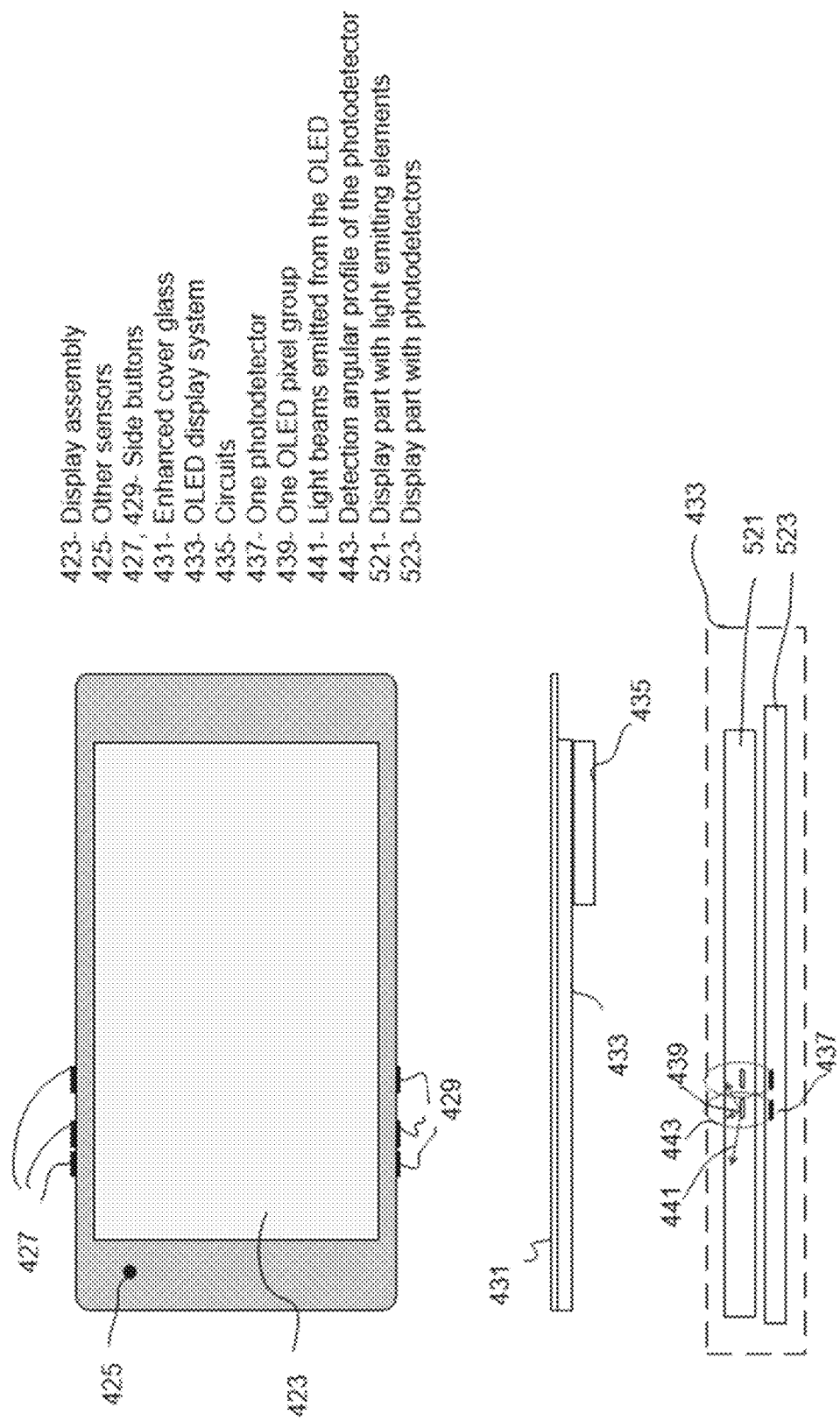
FIG. 17 shows an example of an OLED display system that is further integrated with an enhanced cover glass, some other sensors, and side buttons to form the display assembly according to some embodiments.

FIG. 17 shows an example of an OLED display system 433 that is further integrated with an enhanced cover glass 431, some other sensors 425, and side buttons 427 and 429 to form the display assembly. A processing circuit 435 is provided to manage the functions or operations for the user to operate the terminal. The OLED display system 433 can be divided into two parts: one part having the light emitting elements forming OLED color pixels 439, and the other part having photodetectors. The OLED pixel group 439 emits light beams 441 in all directions and the collimated detection of a photodetector 437 has an angular sensitivity profile 443 that generally exhibits a high detection sensitivity when light comes from the top directions.

Figure 18:
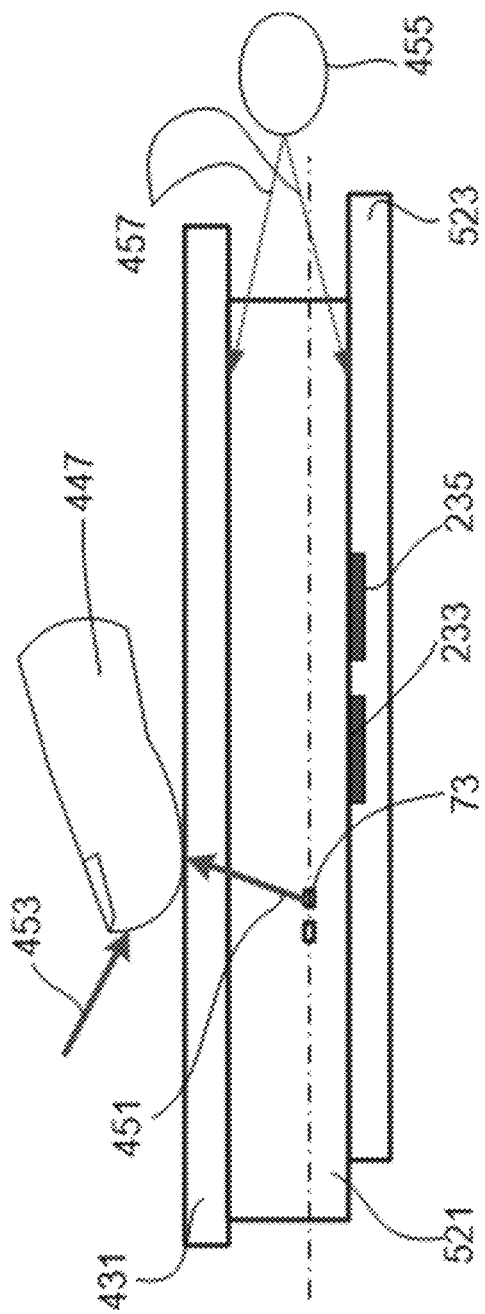
FIG. 18 shows an example of an OLED display system with integrated optical sensors that are spatially distributed in OLED color pixels throughout the display panel according to some embodiments.

FIG. 18 shows an example of an OLED display system with integrated optical sensors that are spatially distributed in OLED color pixels throughout the display panel so that the photodetectors collected provide high resolution touch sensing. In this example, one or more extra illumination light sources 455 are provided to emit illumination light (e.g., IR light) for optical sensing.

In operation, a finger 447 is illuminated by background light 453 coming from the surroundings and display light 451 from OLED pixels. The finger scattered light is received by some of the photodetectors, such as 233 and 235. The background light 453 may come from other light sources such as from the sun, or come from other places of the same display. When the finger 447 touches the display screen, the finger scatters partial of the light from the local OLEDs. This can increase the brightness of the local positions. This brightness change is correlated with the local display frame alternation. When the finger 447 touches the display screen, the finger 447 absorbs partial of the background light. This can reduce the brightness of the background. This brightness change is weakly correlated with the local display frame alternation.

If images captured at different frames are compared, the comparison shows the difference so that the touching induced dynamic influences can be sensed. Because the photodetectors are distributed with similar resolution of the display pixels, the optical touch sensing features very high resolution. This optical touch sensing can also wake up a sleeping display.

In a situation where both the background and the display are fully dark, one or more extra light sources 455, such as some infrared LEDs, can be used to provide illumination for optical sensing. The extra light sources 455 may be installed along the edge of the display and the light beams 457 is scattered by the OLEDs electrode structures, the cover glass surfaces, and the bottom absorbing materials so that the illumination is effective for whole display. The extra light sources 455 can be used to wake up a sleeping display when both the background the display are dark. The extra light sources can also be directly used for the touch sensing. The optical touch sensing process is also effective in the cases that the finger is covered by a fabric material such as a glove, or other material other than finger is touching the display when the function is activated.

This display technology is open to be integrated with a regular touch sensor panel, such as a capacitive touch sensor panel, to realize touch sensing function.

In addition to optical sensing of a pattern of an object such as a fingerprint, the spatially distributed photodetectors that are interleaved with OLED pixels can be used to provide high resolution touch force sensing. When the touch force changes, there are several related changes that can be detected so as to calculate the touch force: cover glass and display module deforming, touching finger contacting area change, and fingerprint deforming. Because the optical touch sensing has a high imaging resolution, the touching finger contact area change and fingerprint deforming can be detected through comparing between a sequence of frames of signals. Upon calibration, the touching force change can be determined. See FIG. 33 and related description on touch force sensing. This optical sensing based touch force sensing may be combined with other touching force sensors, such as distributed capacitive touch force sensor, PZT touch force sensor etc. The presence of such other non-optical force sensors can be used to detect a hard device to touch the display screen.

Figure 19:
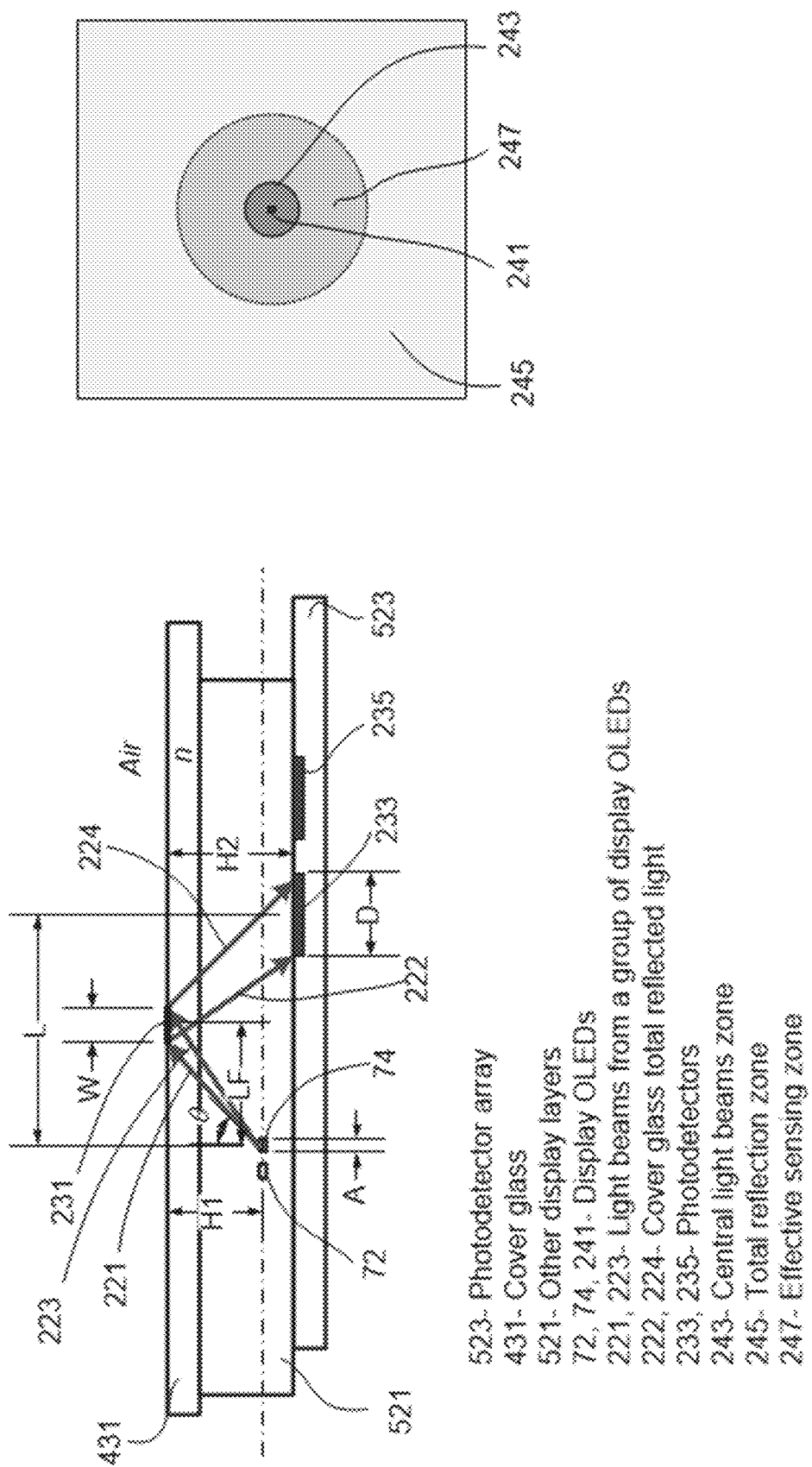
FIG. 19 shows an example of an OLED display with spatially distributed photodetectors that are interleaved with OLED pixels to illustrate the optical sensing zone according to some embodiments.

FIG. 19 shows an example of an OLED display with spatially distributed photodetectors that are interleaved with OLED pixels to illustrate the optical sensing zone. In this example, the cover glass 431 and other display layers 521 may be bonded together (e.g., with glue) so that total reflection can happen at the cover glass surface. When the emitting OLEDs 74 and the receiving photodetectors 233 are set at their locations with known H1, H2, and L, the coordinate LF of the corresponding total reflection zone 231 can be calculated. When the size A of the emitting OLEDs 74 and the size D of the processing photodetectors 233 are known, the size W of the corresponding total reflection zone 231 can also be calculated. Generally W is smaller than D if the emitting OLEDs size is small enough. Enlarging the size A of the emitting OLEDs 74 and the size of a receiving photodetector can cause the resolution to be reduced. Based on the geometric optics, if the emitting OLEDs 74 or the size of one photodetector is enlarged 1 unit, the resolution of the detection will be reduced half unit.

Assuming the environment is air which refraction index is nearly 1, and the cover glass' refraction index is n, the minimum total reflection incident angle θ can be calculated: $\theta = \sin^{-1}(1/n)$. As a result, the central light beams zone 243 can be calculated. The rest positions are located in the total reflection zone 245. For example, if n=1.51, and H1=0.6 mm, for a point light source, the diameter of the central light beams zone is about 1.06 mm. If H2 is given, we can calculate the closest photodetector distance Lmin. For example, H2=0.6 mm, the Lmin is about 1.06 mm.

Because the finger skin's refractive index (typically 1.43~1.44) is normally lower than the cover glass' refractive index n, when the tilt angle θ is too large, the finger skin can't couple the light out. The furthest photodetector distance Lmax can be estimated. For example, H2=0.6 mm, and finger RI is 1.44, the Lmax is about 3.80 mm. Namely, the effective sensing zone 247 diameter is about 3.80 mm. After taking away the central light beam zone, the total effective sensing area is about 10.47 mm². Therefore, to detect 100 mm² fingerprint, about 10 groups of OLEDs should be used. If the local frame rate is 100 fps and each frame only one group of OLEDs is lit on, 0.1 second is enough to detect a fingerprint.

For 50 micron sensing resolution, if one photodetector is as small as 10 micron, each group of OLED can be of 0.1×0.1 mm². The total emitting light power can be temporary high (e.g. 0.1 mW). This will greatly improve the SNR for the detection. The high resolution fingerprint sensing can also be used to sense the palm print or palm vein print.

Figure 20B:
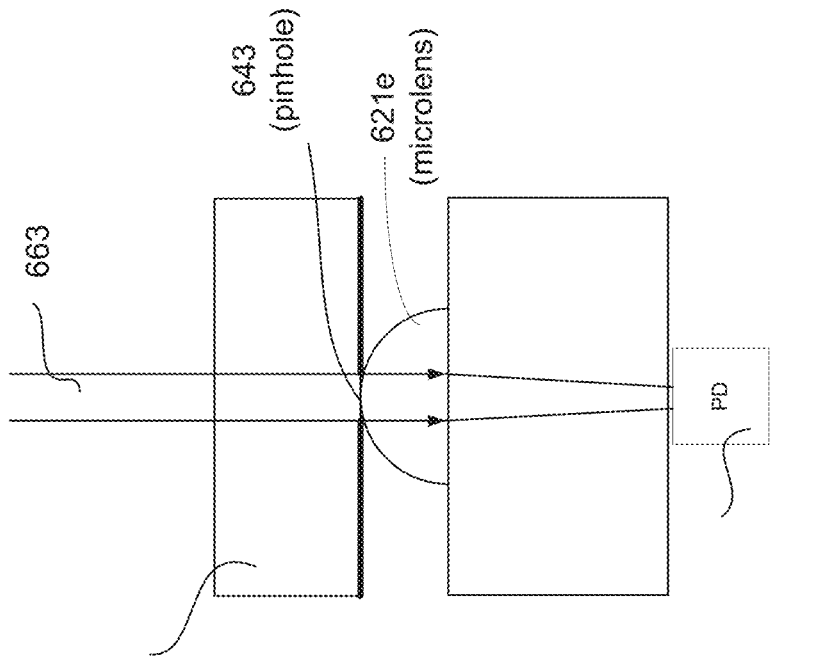
FIGS. 20A and 20B show two examples for using a pinhole-lens assembly as the optical collimation structure illustrated in FIGS. 8A-8C, 9A-9C, and 10A-10C according to some embodiments.
Figure 20A:
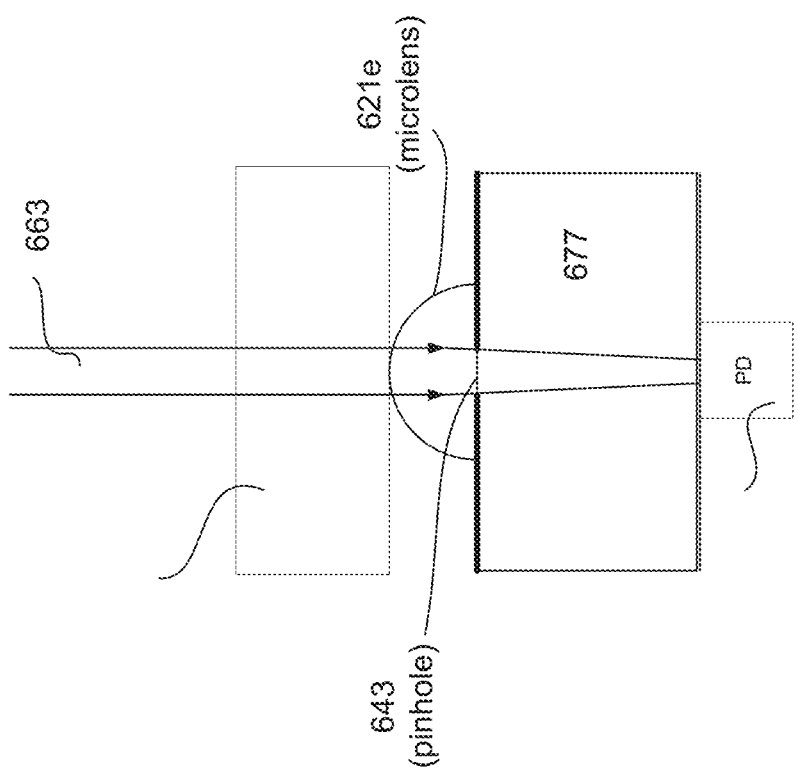

As explained above, the use of a pinhole-lens assembly can enhance the optical imaging based on the disclosed optical sensing technology. FIGS. 20A and 20B show two examples for using a pinhole-lens assembly as the optical collimation structure 411C, 417C and 419C in FIGS. 8A-8C, 9A-9C, and 10A-10C.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A recitation of "a", "an" or "the" is intended to mean "one or more" unless specifically indicated to the contrary.

Ranges may be expressed herein as from "about" one specified value, and/or to "about" another specified value. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. When such a range is expressed, another embodiment includes from the one specific value and/or to the other specified value. Similarly, when values are expressed as approximations, by use of the antecedent "about," it will be understood that the specified value forms another embodiment. It will be further understood that the endpoints of each of the ranges are included with the range.

All patents, patent applications, publications, and descriptions mentioned here are incorporated by reference in their entirety for all purposes. None is admitted to be prior art.

What is claimed is:

1. An electronic device comprising:
    a display screen comprising:
        a cover glass having a top surface and a bottom surface; and
        a display illumination layer disposed under the cover glass, the display illumination layer including an array of light-emitting elements that forms an array of pixels of the display screen, wherein the display illumination layer comprises an edge side;
    a light source disposed adjacent the cover glass and at the edge side of the display illumination layer, the light source configured to emit a light beam to be coupled into the cover glass, a portion of the light beam being transmitted through the top surface of the cover glass to illuminate a hand of a user placed adjacent the top surface of the cover glass; and
    an optical ID sensing module comprising:
        an array of photodetectors disposed under the array of light-emitting elements and spatially distributed across the array of pixels of the display screen, the array of photodetectors configured to detect light reflected or scattered by the hand illuminated by the light source; and
        electronic circuitry coupled to the array of photodetectors and configured to capture a fingerprint image or a palmprint image of the hand.

2. The electronic device of claim 1, wherein the cover glass has an edge, the light source is disposed against the edge of the cover glass, and the light beam emitted by the light source is coupled into the cover glass through the edge of the cover glass.

3. The electronic device of claim 1, wherein the light source is disposed under the bottom surface of the cover glass, and the light beam emitted by the light source is coupled into the cover glass through the bottom surface of the cover glass.

4. The electronic device of claim 3, further comprising:
a dark coating applied to a border of the bottom surface of the cover glass;
wherein the light source is disposed under the dark coating, and is configured to emit the light beam in a first wavelength range; and
wherein the dark coating is at least partially transparent in the first wavelength range.

5. The electronic device of claim 4, the first wavelength range includes a near infrared (NIR) wavelength range, or an ultraviolet (UV) wavelength range.

6. The electronic device of claim 1, wherein the cover glass has a slanted surface at an edge thereof, and wherein the light source is disposed under the bottom surface of the cover glass adjacent the edge, the slanted surface configured to reflect the light beam emitted by the light source and coupled into the cover glass.

7. The electronic device of claim 6, further comprising a high-reflection coating applied to the slanted surface of the cover glass.

8. The electronic device of claim 6, wherein the slanted surface forms an angle with respect to the top surface of the cover glass, the angle ranging from about 100 degrees to about 175 degrees.

9. The electronic device of claim 6, further comprising a dark coating applied to an area of the bottom surface of the cover glass that is adjacent the edge, the dark coating exposing the light source.

10. The electronic device of claim 1, wherein the light source comprises a light-emitting diode (LED), a laser diode (LD), or a vertical-cavity surface-emitting lasers (VCSEL).

11. The electronic device of claim 1, wherein the light source is configured to emit the light beam in a near infrared (NIR) wavelength range, an ultraviolet (UV) wavelength range, or a visible wavelength range.

12. The electronic device of claim 1, wherein the array of light-emitting elements comprises a plurality of organic light-emitting diodes (OLEDs).

13. The electronic device of claim 1, wherein the display screen further comprises a touch sensing layer disposed between the cover glass and the display illumination layer.

14. The electronic device of claim 1, wherein the array of photodetectors and the array of light-emitting elements are formed in a common layer.

15. The electronic device of claim 1, wherein the display illumination layer comprises a first layer and a second layer under the first layer, wherein the array of light-emitting elements is disposed in the first layer, the display illumination layer further comprises:
an array of thin film transistors (TFTs) disposed in the second layer, wherein the array of photodetectors is disposed in the second layer.

16. The electronic device of claim 1, further comprising:
a processor communicatively coupled to the optical ID sensing module, the display screen, and the light source, the processor configured to:
detect a trigger event for operating the optical ID sensing module; and
in response to detecting the trigger event:
turn off the array of light-emitting elements in the display illumination layer;
turn on the light source; and
cause the optical ID sensing module to capture the fingerprint image or the palmprint image of the hand illuminated by the light source.

17. An electronic device comprising:
a display screen comprising:
a cover glass;
a transparent layer disposed under the cover glass, the transparent layer having an edge side; and
an array of light-emitting elements disposed under the transparent layer, the array of light-emitting elements forming an array of pixels of the display screen;
a light source disposed at the edge side of the transparent layer, the light source configured to emit a light beam to be coupled into the transparent layer through the edge side, a portion of the light beam being transmitted through the cover glass to illuminate a hand of a user placed adjacent the cover glass; and
an optical ID sensing module comprising:
an array of photodetectors disposed under the array of light-emitting elements and spatially distributed across the array of pixels of the display screen, the array of photodetectors configured to detect light reflected or scattered by the hand illuminated by the light source; and
electronic circuitry coupled to the array of photodetectors and configured to capture a fingerprint image or a palmprint image of the hand.

18. The electronic device of claim 17, wherein the transparent layer comprises touch sensing circuitries.

19. The electronic device of claim 17, wherein the array of light-emitting elements comprises a plurality of organic light-emitting diodes (OLEDs).

20. The electronic device of claim 17, wherein the light source comprises a light-emitting diode (LED), a laser diode (LD), or a vertical-cavity surface-emitting lasers (VCSEL).

21. The electronic device of claim 17, wherein the light source is configured to emit the light beam in a near infrared (NIR) wavelength range, an ultraviolet (UV) wavelength range, or a visible wavelength range.

22. The electronic device of claim 17, wherein the display screen further comprises a dark coating applied to a back surface of the cover glass at a border of the display screen, and wherein the light source is disposed under the dark coating.

23. The electronic device of claim 17, wherein the array of photodetectors and the array of light-emitting elements are formed in a common layer.

24. The electronic device of claim 17, wherein:
the array of light-emitting elements is formed in a first layer; and
the array of photodetectors is formed in a second layer under the first layer.

25. The electronic device of claim 24, wherein the second layer includes thin film transistors (TFTs) of the display screen.

26. The electronic device of claim 17, wherein the optical ID sensing module further comprising an array of optical collimators that are spatially distributed across the array of pixels of the display screen, each optical collimator being coupled to a respective photodetector of the array of photodetectors.

27. An electronic device comprising:
a display screen comprising:
a cover glass;
a touch sensing layer disposed under the cover glass, the touch sensing layer having an edge side; and
a display illumination layer disposed under the touch sensing layer, the display illumination layer including an array of light-emitting elements that forms an array of pixels of the display screen;

a light source disposed at the edge side of the touch sensing layer, the light source configured to emit a light beam to be coupled into the touch sensing layer through the edge side, a portion of the light beam being transmitted through the cover glass to illuminate a hand of a user placed adjacent the cover glass; and an optical ID sensing module comprising:

an array of photodetectors disposed under the array of light-emitting elements and spatially distributed across the array of pixels of the display screen, the array of photodetectors configured to detect light reflected or scattered by the hand illuminated by the light source; and electronic circuitry coupled to the array of photodetectors and configured to capture a fingerprint image or a palmprint image of the hand.

28. The electronic device of claim 27, wherein the light source comprises a light-emitting diode (LED), a laser diode (LD), or a vertical-cavity surface-emitting lasers (VCSEL).

29. The electronic device of claim 27, wherein the light source is configured to emit the light beam in a near infrared (NIR) wavelength range.

30. The electronic device of claim 27, wherein the light source is configured to emit the light beam in an ultraviolet (UV) wavelength range or a visible wavelength range.

31. The electronic device of claim 27, further comprising:

a processor communicatively coupled to the optical ID sensing module, the display screen, and the light source, the processor configured to:

detect a trigger event for operating the optical ID sensing module; and in response to detecting the trigger event:

turn off the array of light-emitting elements in the display illumination layer;

turn on the light source; and cause the optical ID sensing module to capture the fingerprint image or the palmprint image of the hand illuminated by the light source.

32. The electronic device of claim 27, wherein the display screen further comprises a dark coating applied to a back surface of the cover glass at a border of the display screen, and wherein the light source is disposed under the dark coating.

33. The electronic device of claim 32, wherein the light source is configured to emit the light beam in a first wavelength range, and the dark coating is partially transparent to light in the first wavelength range.

* * * * *